(12) United States Patent
Howell et al.

(10) Patent No.: US 11,204,512 B2
(45) Date of Patent: Dec. 21, 2021

(54) EYEWEAR SUPPORTING EMBEDDED AND TETHERED ELECTRONIC COMPONENTS

(71) Applicant: IngenioSpec, LLC, San Jose, CA (US)

(72) Inventors: Thomas A. Howell, San Jose, CA (US); David Chao, Saratoga, CA (US); C. Douglass Thomas, Saratoga, CA (US); Peter P. Tong, Mountain View, CA (US)

(73) Assignee: IngenioSpec, LLC, San Jose, CA (US)

( * ) Notice: Subject to any disclaimer, the term of this patent is extended or adjusted under 35 U.S.C. 154(b) by 13 days.

(21) Appl. No.: 16/574,254

(22) Filed: Sep. 18, 2019

(65) Prior Publication Data

US 2020/0012127 A1    Jan. 9, 2020

Related U.S. Application Data

(63) Continuation of application No. 16/049,120, filed on Jul. 30, 2018, which is a continuation of application (Continued)

(51) Int. Cl.
*G02C 1/00* (2006.01)
*G02C 11/00* (2006.01)
(Continued)

(52) U.S. Cl.
CPC .............. *G02C 11/10* (2013.01); *G02C 5/001* (2013.01); *G02C 5/14* (2013.01); *G02C 11/06* (2013.01)

(58) Field of Classification Search
CPC . G02C 1/00; G02C 11/10; G02C 5/14; G02C 5/001; G02C 11/06
(Continued)

(56) References Cited

U.S. PATENT DOCUMENTS 320,558 A    6/1885 Hull
669,949 A    3/1901 Underwood
(Continued)

FOREIGN PATENT DOCUMENTS

CA    2 487 391    12/2003
CN    88203065     11/1988
(Continued)

OTHER PUBLICATIONS

Office Action for U.S. Appl. No. 16/049,120, dated Feb. 28, 2020.
(Continued)

*Primary Examiner* — Hung X Dang

(57) ABSTRACT

Techniques for providing eyewear with electrical components are disclosed. The electrical components can provide electrical technology to eyewear (e.g., eyeglasses) without having to substantially compromise aesthetic design principles of the eyewear. Often, the electrical components can be attached to the eyewear as an after-market enhancement. The electrical components can operate independently or together with other electrical components provided elsewhere. In some embodiments, tethered electrical components can be coupled to electrical components in or attached to a pair of eyeglasses. Tethered electrical components, alone or in combination with eyeglass electrical components can be used for a variety of different applications and uses.

67 Claims, 21 Drawing Sheets

Related U.S. Application Data

No. 15/375,423, filed on Dec. 12, 2016, now Pat. No. 10,061,144, which is a continuation of application No. 14/557,409, filed on Dec. 1, 2014, now Pat. No. 9,547,184, which is a continuation of application No. 13/955,336, filed on Jul. 31, 2013, now Pat. No. 8,905,542, which is a continuation of application No. 13/085,402, filed on Apr. 12, 2011, now Pat. No. 8,500,271, which is a continuation of application No. 11/183,269, filed on Jul. 15, 2005, now Pat. No. 7,922,321, which is a continuation-in-part of application No. 10/964,011, filed on Oct. 12, 2004, now Pat. No. 7,192,136.

(60) Provisional application No. 60/509,631, filed on Oct. 9, 2003, provisional application No. 60/527,565, filed on Dec. 8, 2003, provisional application No. 60/562,798, filed on Apr. 15, 2004, provisional application No. 60/583,169, filed on Jun. 26, 2004, provisional application No. 60/592,045, filed on Jul. 28, 2004, provisional application No. 60/605,191, filed on Aug. 28, 2004, provisional application No. 60/618,107, filed on Oct. 12, 2004, provisional application No. 60/620,238, filed on Oct. 18, 2004, provisional application No. 60/647,836, filed on Jan. 31, 2005, provisional application No. 60/647,826, filed on Jan. 31, 2005.

(51) Int. Cl.
*G02C 5/00* (2006.01)
*G02C 11/06* (2006.01)
*G02C 5/14* (2006.01)

(58) Field of Classification Search
USPC .... 351/158, 41, 111, 122, 49; 381/381, 380, 381/327
See application file for complete search history.

(56) References Cited

U.S. PATENT DOCUMENTS

| | | |
|---|---|---|
| 1,255,265 A | 12/1918 | Zachara |
| 1,917,745 A | 7/1933 | Weiss |
| 2,249,572 A | 7/1941 | Lieber |
| 2,638,532 A | 5/1953 | Brady |
| 2,794,085 A | 5/1957 | De Angelis |
| 2,818,511 A | 12/1957 | Ullery et al. |
| 2,830,132 A | 4/1958 | Borg |
| 2,874,230 A | 2/1959 | Carlson |
| 2,904,670 A | 9/1959 | Calmes |
| 3,060,308 A | 10/1962 | Fortuna |
| 3,597,054 A | 8/1971 | Winter |
| 3,710,115 A | 1/1973 | Jubb |
| 3,858,001 A | 12/1974 | Bonne |
| 3,883,701 A | 5/1975 | Delorenzo |
| 4,165,487 A | 8/1979 | Corderman |
| 4,254,451 A | 3/1981 | Cochran, Jr. |
| 4,283,127 A | 8/1981 | Rosenwinkel et al. |
| 4,322,585 A | 3/1982 | Liautaud |
| 4,348,664 A | 9/1982 | Boschetti et al. |
| 4,389,217 A | 6/1983 | Baughman et al. |
| 4,526,473 A | 7/1985 | Zahn, III |
| 4,535,244 A | 8/1985 | Burnham |
| 4,608,492 A | 8/1986 | Burnham |
| 4,683,587 A | 7/1987 | Silverman |
| 4,751,691 A | 6/1988 | Perera |
| 4,757,714 A | 7/1988 | Purdy et al. |
| 4,773,095 A | 9/1988 | Zwicker et al. |
| 4,806,011 A | 2/1989 | Bettinger |
| 4,822,160 A | 4/1989 | Tsai |
| 4,822,161 A | 4/1989 | Jimmy |
| 4,851,686 A | 7/1989 | Pearson |
| 4,856,086 A | 8/1989 | McCullough |
| 4,859,047 A | 8/1989 | Badewitz |
| 4,882,769 A | 11/1989 | Gallimore |
| 4,904,078 A | 2/1990 | Gorike |
| 4,942,629 A | 7/1990 | Stadlmann |
| 4,962,469 A | 10/1990 | Ono et al. |
| 4,967,268 A | 10/1990 | Lipton et al. |
| 4,985,632 A | 1/1991 | Bianco et al. |
| 5,008,548 A | 4/1991 | Gat |
| 5,015,086 A | 5/1991 | Okaue et al. |
| 5,020,150 A | 5/1991 | Shannon |
| 5,026,151 A | 6/1991 | Waltuck et al. |
| 5,036,311 A | 7/1991 | Moran et al. |
| 5,050,150 A | 9/1991 | Ikeda |
| 5,064,410 A | 11/1991 | Frenkel et al. |
| 5,093,576 A | 3/1992 | Edmond et al. |
| 5,106,179 A | 4/1992 | Kamaya et al. |
| 5,148,023 A | 9/1992 | Hayashi et al. |
| 5,151,600 A | 9/1992 | Black |
| 5,161,250 A | 11/1992 | Ianna et al. |
| 5,172,256 A | 12/1992 | Sethofer et al. |
| 5,264,877 A | 11/1993 | Hussey |
| 5,306,917 A | 4/1994 | Black et al. |
| 5,353,378 A | 10/1994 | Hoffman et al. |
| 5,359,370 A | 10/1994 | Mugnier |
| 5,359,444 A | 10/1994 | Piosenka et al. |
| 5,367,345 A | 11/1994 | da Silva |
| 5,379,464 A | 1/1995 | Schleger et al. |
| 5,382,986 A | 1/1995 | Black et al. |
| 5,394,005 A | 2/1995 | Brown et al. |
| 5,452,026 A | 9/1995 | Marcy, III |
| 5,452,480 A | 9/1995 | Ryden |
| 5,455,637 A | 10/1995 | Kallman et al. |
| 5,455,640 A | 10/1995 | Gertsikov |
| 5,457,751 A | 10/1995 | Such |
| 5,463,428 A | 10/1995 | Lipton et al. |
| 5,500,532 A | 3/1996 | Kozicki |
| D369,167 S | 4/1996 | Hanson et al. |
| 5,510,961 A | 4/1996 | Peng |
| 5,513,384 A | 4/1996 | Brennan et al. |
| 5,533,130 A | 7/1996 | Staton |
| 5,541,641 A | 7/1996 | Shimada |
| 5,581,090 A | 12/1996 | Goudjil |
| 5,585,871 A | 12/1996 | Linden |
| 5,589,398 A | 12/1996 | Krause et al. |
| 5,590,417 A | 12/1996 | Rydbeck |
| 5,606,743 A | 2/1997 | Vogt et al. |
| 5,608,808 A | 3/1997 | da Silva |
| 5,634,201 A | 5/1997 | Mooring |
| 5,671,035 A | 9/1997 | Barnes |
| 5,686,727 A | 11/1997 | Reenstra et al. |
| 5,694,475 A | 12/1997 | Boyden |
| 5,715,323 A | 2/1998 | Walker |
| 5,737,436 A | 4/1998 | Boyden et al. |
| 5,818,381 A | 10/1998 | Williams |
| 5,835,185 A | 11/1998 | Kallman et al. |
| 5,900,720 A | 5/1999 | Kallman et al. |
| 5,903,395 A | 5/1999 | Rallison et al. |
| 5,923,398 A | 7/1999 | Goldman |
| 5,941,837 A | 8/1999 | Amano et al. |
| 5,946,071 A | 8/1999 | Feldman |
| 5,949,516 A | 9/1999 | McCurdy |
| 5,966,746 A | 10/1999 | Reedy et al. |
| 5,980,037 A | 11/1999 | Conway |
| 5,988,812 A | 11/1999 | Wingate |
| 5,991,085 A | 11/1999 | Rallison et al. |
| 5,992,996 A | 11/1999 | Sawyer |
| 5,995,592 A | 11/1999 | Shirai et al. |
| 6,010,216 A | 1/2000 | Jesiek |
| 6,013,919 A | 1/2000 | Schneider et al. |
| 6,028,627 A | 2/2000 | Helmsderfer |
| 6,046,455 A | 4/2000 | Ribi et al. |
| 6,060,321 A | 5/2000 | Hovorka |
| 6,061,580 A | 5/2000 | Altschul et al. |
| 6,091,546 A | 7/2000 | Spitzer |
| 6,091,832 A | 7/2000 | Shurman et al. |
| 6,115,177 A | 9/2000 | Vossler |
| 6,132,681 A | 10/2000 | Faran et al. |

(56) References Cited

U.S. PATENT DOCUMENTS

| | | |
|---|---|---|
| 6,145,983 A | 11/2000 | Schiffer |
| 6,154,552 A | 11/2000 | Koroljow et al. |
| 6,176,576 B1 | 1/2001 | Green et al. |
| 6,225,897 B1 | 5/2001 | Doyle et al. |
| 6,231,181 B1 | 5/2001 | Swab |
| 6,236,969 B1 | 5/2001 | Ruppert et al. |
| 6,243,578 B1 | 6/2001 | Koike |
| 6,259,367 B1 | 7/2001 | Klein |
| 6,270,466 B1 | 8/2001 | Weinstein et al. |
| 6,292,213 B1 | 9/2001 | Jones |
| 6,292,685 B1 | 9/2001 | Pompei |
| 6,301,367 B1 | 10/2001 | Boyden et al. |
| 6,307,526 B1 | 10/2001 | Mann |
| 6,343,858 B1 | 2/2002 | Zelman |
| 6,349,001 B1 | 2/2002 | Spitzer |
| 6,349,422 B1 | 2/2002 | Schleger et al. |
| 6,409,335 B1 | 6/2002 | Lipawsky |
| 6,409,338 B1 | 6/2002 | Jewell |
| 6,426,719 B1 | 7/2002 | Nagareda et al. |
| 6,431,705 B1 | 8/2002 | Linden |
| 6,474,816 B2 | 11/2002 | Butler et al. |
| 6,478,736 B1 | 11/2002 | Mault |
| 6,506,142 B2 | 1/2003 | Itoh et al. |
| 6,511,175 B2 | 1/2003 | Hay et al. |
| 6,513,532 B2 | 2/2003 | Mault et al. |
| 6,517,203 B1 | 2/2003 | Blum et al. |
| 6,539,336 B1 | 3/2003 | Vock et al. |
| 6,542,081 B2 | 4/2003 | Torch |
| 6,546,101 B1 | 4/2003 | Murray et al. |
| 6,554,763 B1 | 4/2003 | Amano et al. |
| 6,582,075 B1 | 6/2003 | Swab et al. |
| 6,619,799 B1 | 9/2003 | Blum et al. |
| 6,629,076 B1 | 9/2003 | Haken |
| 6,729,726 B2 | 5/2004 | Miller et al. |
| 6,736,759 B1 | 5/2004 | Stubbs et al. |
| 6,764,194 B1 | 7/2004 | Cooper |
| 6,769,767 B2 | 8/2004 | Swab et al. |
| 6,788,309 B1 | 9/2004 | Swan et al. |
| 6,792,401 B1 | 9/2004 | Nigro et al. |
| 6,816,314 B2 | 11/2004 | Shimizu et al. |
| 6,824,265 B1 | 11/2004 | Harper |
| 6,857,741 B2 | 2/2005 | Blum et al. |
| 6,871,951 B2 | 3/2005 | Blum et al. |
| 6,879,930 B2 | 4/2005 | Sinclair et al. |
| 6,912,386 B1 | 6/2005 | Himberg et al. |
| 6,929,365 B2 | 8/2005 | Swab et al. |
| 6,932,090 B1 | 8/2005 | Reschke et al. |
| 6,947,219 B1 | 9/2005 | Ou |
| 7,004,582 B2 | 2/2006 | Jannard et al. |
| 7,013,009 B2 | 3/2006 | Warren |
| 7,023,594 B2 | 4/2006 | Blum et al. |
| 7,030,902 B2 | 4/2006 | Jacobs |
| 7,031,667 B2 | 4/2006 | Horiguchi |
| 7,033,025 B2 | 4/2006 | Winterbotham |
| 7,059,717 B2 | 6/2006 | Bloch |
| 7,073,905 B2 | 7/2006 | Da Pra' |
| 7,079,876 B2 | 7/2006 | Levy |
| 7,123,215 B2 | 10/2006 | Nakada |
| 7,192,136 B2 | 3/2007 | Howell et al. |
| 7,255,437 B2 | 8/2007 | Howell et al. |
| 7,265,358 B2 | 9/2007 | Fontaine |
| 7,274,292 B2 | 9/2007 | Velhal et al. |
| 7,289,767 B2 | 10/2007 | Lai |
| 7,312,699 B2 | 12/2007 | Chornenky |
| 7,331,666 B2 | 2/2008 | Swab et al. |
| 7,376,238 B1 | 5/2008 | Rivas et al. |
| 7,380,936 B2 | 6/2008 | Howell et al. |
| 7,401,918 B2 | 7/2008 | Howell et al. |
| 7,405,801 B2 | 7/2008 | Jacobs |
| 7,429,965 B2 | 9/2008 | Weiner |
| 7,438,409 B2 | 10/2008 | Jordan |
| 7,438,410 B1 | 10/2008 | Howell et al. |
| 7,445,332 B2 | 11/2008 | Jannard et al. |
| 7,481,531 B2 | 1/2009 | Howell et al. |
| 7,500,746 B1 | 3/2009 | Howell et al. |
| 7,500,747 B2 | 3/2009 | Howell et al. |
| 7,512,414 B2 | 3/2009 | Jannard et al. |
| 7,517,083 B2 | 4/2009 | Blum et al. |
| 7,527,374 B2 | 5/2009 | Chou |
| 7,543,934 B2 | 6/2009 | Howell et al. |
| 7,581,833 B2 | 9/2009 | Howell et al. |
| 7,621,634 B2 | 11/2009 | Howell et al. |
| 7,648,236 B1 | 1/2010 | Dobson |
| 7,677,723 B2 | 3/2010 | Howell et al. |
| 7,760,898 B2 | 7/2010 | Howell et al. |
| 7,771,046 B2 | 8/2010 | Howell et al. |
| 7,792,552 B2 | 9/2010 | Thomas et al. |
| 7,806,525 B2 | 10/2010 | Howell et al. |
| 7,922,321 B2 | 4/2011 | Howell et al. |
| 7,976,159 B2 | 7/2011 | Jacobs et al. |
| 8,109,629 B2 | 2/2012 | Howell et al. |
| 8,142,015 B2 | 3/2012 | Paolino |
| 8,174,569 B2 | 5/2012 | Tanijiri et al. |
| 8,337,013 B2 | 12/2012 | Howell et al. |
| 8,430,507 B2 | 4/2013 | Howell et al. |
| 8,434,863 B2 | 5/2013 | Howell et al. |
| 8,465,151 B2 | 6/2013 | Howell et al. |
| 8,485,661 B2 | 7/2013 | Yoo et al. |
| 8,500,271 B2 | 8/2013 | Howell et al. |
| 8,770,742 B2 | 7/2014 | Howell et al. |
| 8,905,542 B2 | 12/2014 | Howell et al. |
| 9,033,493 B2 | 5/2015 | Howell et al. |
| 9,244,292 B2 | 1/2016 | Swab et al. |
| 9,400,390 B2 | 7/2016 | Osterhout et al. |
| 9,405,135 B2 | 8/2016 | Sweis et al. |
| 9,488,520 B2 | 11/2016 | Howell et al. |
| 9,547,184 B2 | 1/2017 | Howell et al. |
| 9,690,121 B2 | 6/2017 | Howell et al. |
| 10,042,186 B2 | 8/2018 | Chao et al. |
| 10,060,790 B2 | 8/2018 | Howell et al. |
| 10,061,144 B2 | 8/2018 | Howell et al. |
| 10,310,296 B2 | 6/2019 | Howell et al. |
| 10,345,625 B2 | 7/2019 | Howell et al. |
| 10,359,311 B2 | 7/2019 | Howell et al. |
| 10,359,459 B1 | 7/2019 | Gorin |
| 10,624,790 B2 | 4/2020 | Chao et al. |
| 10,777,048 B2 | 9/2020 | Howell et al. |
| 11,042,045 B2 | 6/2021 | Chao et al. |
| 2001/0005230 A1 | 6/2001 | Ishikawa |
| 2001/0028309 A1 | 10/2001 | Torch |
| 2001/0050754 A1 | 12/2001 | Hay et al. |
| 2002/0017997 A1 | 2/2002 | Felkowitz |
| 2002/0021407 A1 | 2/2002 | Elliott |
| 2002/0081982 A1 | 6/2002 | Schwartz et al. |
| 2002/0084990 A1 | 7/2002 | Peterson, III |
| 2002/0089639 A1 | 7/2002 | Starner et al. |
| 2002/0090103 A1 | 7/2002 | Calisto, Jr. |
| 2002/0098877 A1 | 7/2002 | Glezerman |
| 2002/0101568 A1 | 8/2002 | Eberl et al. |
| 2002/0109600 A1 | 8/2002 | Mault et al. |
| 2002/0140899 A1 | 10/2002 | Blum et al. |
| 2002/0159023 A1 | 10/2002 | Swab |
| 2002/0197961 A1 | 12/2002 | Warren |
| 2003/0018274 A1 | 1/2003 | Takahashi et al. |
| 2003/0022690 A1 | 1/2003 | Beyda et al. |
| 2003/0032449 A1 | 2/2003 | Giobbi |
| 2003/0062046 A1 | 4/2003 | Wiesmann et al. |
| 2003/0065257 A1 | 4/2003 | Mault et al. |
| 2003/0067585 A1 | 4/2003 | Miller et al. |
| 2003/0068057 A1 | 4/2003 | Miller et al. |
| 2003/0083591 A1 | 5/2003 | Edwards et al. |
| 2003/0214630 A1 | 11/2003 | Winterbotham |
| 2003/0226978 A1 | 12/2003 | Ribi et al. |
| 2003/0231293 A1 | 12/2003 | Blum et al. |
| 2004/0000733 A1 | 1/2004 | Swab et al. |
| 2004/0029582 A1 | 2/2004 | Swab et al. |
| 2004/0059212 A1 | 3/2004 | Abreu |
| 2004/0063378 A1 | 4/2004 | Nelson |
| 2004/0096078 A1 | 5/2004 | Lin |
| 2004/0100384 A1 | 5/2004 | Chen et al. |
| 2004/0101178 A1 | 5/2004 | Fedorovskaya et al. |
| 2004/0128737 A1 | 7/2004 | Gesten |
| 2004/0150986 A1 | 8/2004 | Chang |
| 2004/0156012 A1 | 8/2004 | Jannard et al. |

(56) References Cited

U.S. PATENT DOCUMENTS

| | | |
|---|---|---|
| 2004/0157649 A1 | 8/2004 | Jannard et al. |
| 2004/0160571 A1 | 8/2004 | Jannard |
| 2004/0160572 A1 | 8/2004 | Jannard |
| 2004/0160573 A1 | 8/2004 | Jannard et al. |
| 2004/0197002 A1 | 10/2004 | Atsumi et al. |
| 2004/0227219 A1 | 11/2004 | Su |
| 2005/0067580 A1 | 3/2005 | Fontaine |
| 2005/0078274 A1 | 4/2005 | Howell et al. |
| 2005/0088365 A1 | 4/2005 | Yamazaki et al. |
| 2005/0201585 A1 | 9/2005 | Jannard et al. |
| 2005/0213026 A1 | 9/2005 | Da Pra' |
| 2005/0230596 A1 | 10/2005 | Howell et al. |
| 2005/0238194 A1 | 10/2005 | Chornenky |
| 2005/0239502 A1 | 10/2005 | Swab et al. |
| 2005/0248717 A1 | 11/2005 | Howell et al. |
| 2005/0248718 A1 | 11/2005 | Howell et al. |
| 2005/0248719 A1 | 11/2005 | Howell et al. |
| 2005/0264752 A1 | 12/2005 | Howell et al. |
| 2006/0001827 A1 | 1/2006 | Howell et al. |
| 2006/0003803 A1 | 1/2006 | Thomas et al. |
| 2006/0023158 A1 | 2/2006 | Howell et al. |
| 2006/0034478 A1 | 2/2006 | Davenport |
| 2006/0107822 A1 | 5/2006 | Bowen |
| 2006/0132382 A1 | 6/2006 | Jannard |
| 2007/0030442 A1 | 2/2007 | Howell et al. |
| 2007/0035830 A1 | 2/2007 | Matveev et al. |
| 2007/0046887 A1 | 3/2007 | Howell et al. |
| 2007/0055888 A1 | 3/2007 | Miller et al. |
| 2007/0098192 A1 | 5/2007 | Sipkema |
| 2007/0109491 A1 | 5/2007 | Howell et al. |
| 2007/0186330 A1 | 8/2007 | Howell et al. |
| 2007/0200927 A1 | 8/2007 | Krenik |
| 2007/0208531 A1 | 9/2007 | Darley et al. |
| 2007/0248238 A1* | 10/2007 | Abreu ............... G06F 1/163 381/381 |
| 2007/0270663 A1 | 11/2007 | Ng et al. |
| 2007/0271065 A1 | 11/2007 | Gupta et al. |
| 2007/0271116 A1 | 11/2007 | Wysocki et al. |
| 2007/0271387 A1 | 11/2007 | Lydon et al. |
| 2007/0279584 A1 | 12/2007 | Howell et al. |
| 2008/0062338 A1 | 3/2008 | Herzog et al. |
| 2008/0068559 A1 | 3/2008 | Howell et al. |
| 2008/0100792 A1 | 5/2008 | Blum et al. |
| 2008/0144854 A1 | 6/2008 | Abreu |
| 2008/0151175 A1 | 6/2008 | Gross |
| 2008/0151179 A1 | 6/2008 | Howell et al. |
| 2008/0158506 A1 | 7/2008 | Fuziak |
| 2008/0218684 A1 | 9/2008 | Howell et al. |
| 2008/0262392 A1 | 10/2008 | Ananny et al. |
| 2008/0278678 A1 | 11/2008 | Howell et al. |
| 2009/0059159 A1 | 3/2009 | Howell et al. |
| 2009/0059381 A1 | 3/2009 | Jannard |
| 2009/0073375 A1 | 3/2009 | Nakada |
| 2009/0141233 A1 | 6/2009 | Howell et al. |
| 2009/0147215 A1 | 6/2009 | Howell et al. |
| 2009/0156128 A1 | 6/2009 | Franson et al. |
| 2009/0251660 A1 | 10/2009 | Figler et al. |
| 2009/0251661 A1 | 10/2009 | Fuziak, Jr. |
| 2009/0296044 A1 | 12/2009 | Howell et al. |
| 2010/0061579 A1 | 3/2010 | Rickards et al. |
| 2010/0079356 A1 | 4/2010 | Hoellwarth |
| 2010/0110368 A1 | 5/2010 | Chaum |
| 2010/0245754 A1 | 9/2010 | Matsumoto et al. |
| 2010/0296045 A1 | 11/2010 | Agnoli et al. |
| 2010/0309426 A1 | 12/2010 | Howell et al. |
| 2011/0102734 A1 | 5/2011 | Howell et al. |
| 2011/0164122 A1 | 7/2011 | Hardacker |
| 2011/0187990 A1 | 8/2011 | Howell et al. |
| 2011/0241976 A1 | 10/2011 | Boger et al. |
| 2011/0273365 A1 | 11/2011 | West et al. |
| 2012/0033061 A1 | 2/2012 | Ko et al. |
| 2012/0050668 A1 | 3/2012 | Howell et al. |
| 2012/0133885 A1 | 5/2012 | Howell et al. |
| 2012/0176580 A1 | 7/2012 | Sonsino |
| 2013/0072828 A1 | 3/2013 | Sweis et al. |
| 2013/0077175 A1 | 3/2013 | Hotta et al. |
| 2013/0143519 A1 | 6/2013 | Doezema |
| 2013/0201440 A1 | 8/2013 | Howell et al. |
| 2013/0308089 A1 | 11/2013 | Howell et al. |
| 2014/0132913 A1 | 5/2014 | Sweis et al. |
| 2014/0176902 A1 | 6/2014 | Sweis et al. |
| 2014/0198293 A1 | 7/2014 | Sweis et al. |
| 2014/0268008 A1 | 9/2014 | Howell et al. |
| 2014/0268013 A1 | 9/2014 | Howell et al. |
| 2014/0268017 A1 | 9/2014 | Sweis et al. |
| 2014/0361185 A1 | 12/2014 | Howell et al. |
| 2015/0085245 A1 | 3/2015 | Howell et al. |
| 2015/0230988 A1 | 8/2015 | Chao et al. |
| 2015/0253590 A1 | 9/2015 | Howell et al. |
| 2016/0246075 A9 | 8/2016 | Howell et al. |
| 2016/0302992 A1 | 10/2016 | Sweis et al. |
| 2017/0068117 A9 | 3/2017 | Howell et al. |
| 2017/0074721 A1 | 3/2017 | Howell et al. |
| 2017/0090219 A1 | 3/2017 | Howell et al. |
| 2017/0131575 A1 | 5/2017 | Howell et al. |
| 2017/0146829 A1 | 5/2017 | Howell et al. |
| 2017/0303187 A1 | 10/2017 | Crouthamel et al. |
| 2018/0314079 A1 | 11/2018 | Chao et al. |
| 2018/0335650 A1 | 11/2018 | Howell et al. |
| 2018/0348050 A1 | 12/2018 | Howell et al. |
| 2019/0033623 A1 | 1/2019 | Howell et al. |
| 2019/0187492 A1 | 6/2019 | Howell et al. |
| 2019/0272800 A1 | 9/2019 | Tao et al. |
| 2019/0278110 A1 | 9/2019 | Howell et al. |
| 2019/0285913 A1 | 9/2019 | Howell et al. |
| 2019/0310132 A1 | 10/2019 | Howell et al. |
| 2019/0318589 A1 | 10/2019 | Howell et al. |
| 2019/0387351 A1 | 12/2019 | Lyren et al. |
| 2020/0218094 A1 | 7/2020 | Howell et al. |
| 2020/0364992 A1 | 11/2020 | Howell et al. |

FOREIGN PATENT DOCUMENTS

| | | |
|---|---|---|
| CN | 89214222.7 | 3/1990 |
| CN | 90208199.3 | 11/1990 |
| DE | 10123226 A1 | 11/2002 |
| EP | 1134491 A2 | 9/2001 |
| FR | 2530039 A1 | 1/1984 |
| GB | 1467982 | 3/1977 |
| JP | 58-113912 | 7/1983 |
| JP | 58-113914 | 7/1983 |
| JP | 02-181722 | 7/1990 |
| JP | 09-017204 | 1/1997 |
| JP | 10-161072 | 6/1998 |
| JP | 2000-039595 | 2/2000 |
| JP | 2002 341059 A | 11/2002 |
| JP | 2005-151292 | 6/2005 |
| TW | 484711 | 6/2001 |
| WO | WO 97/12205 A1 | 4/1997 |
| WO | WO 99/50706 A1 | 10/1999 |
| WO | WO 01/06298 A1 | 1/2001 |
| WO | WO 02/06881 A2 | 1/2002 |
| WO | WO 03/069394 A1 | 8/2003 |
| WO | WO 03/100368 A1 | 12/2003 |
| WO | WO 03/100503 A2 | 12/2003 |
| WO | WO 04/012477 A2 | 2/2004 |
| WO | WO 04/025554 A1 | 3/2004 |
| WO | WO 10/014514 A2 | 12/2010 |

OTHER PUBLICATIONS

Notice of Allowance for U.S. Appl. No. 16/049,120, dated Jun. 3, 2020.
Notice of Allowance for U.S. Appl. No. 16/049,120, dated Sep. 21, 2020.
Office Action for U.S. Appl. No. 16/127,957, dated Jun. 4, 2020.
Office Action for U.S. Appl. No. 16/127,957, dated Sep. 30, 2020.
Notice of Allowance for U.S. Appl. No. 16/127,957, dated Dec. 21, 2020.
Office Action for U.S. Appl. No. 16/183,969, dated Jun. 24, 2020.
Notice of Allowance for U.S. Appl. No. 16/182,969, dated Oct. 14, 2020.

(56) References Cited

OTHER PUBLICATIONS

Office Action for U.S. Appl. No. 16/429,181, dated Sep. 30, 2020.
Office Action for U.S. Appl. No. 16/424,018, dated Jun. 10, 2020.
Notice of Allowance for U.S. Appl. No. 16/424,018, dated Oct. 20, 2020.
Notice of Allowance for U.S. Appl. No. 11/183,269, dated Dec. 10, 2010.
Office Action for U.S. Appl. No. 11/183,269, dated May 25, 2010.
Final Office Action for U.S. Appl. No. 11/183,269, dated Feb. 17, 2010.
Office Action for U.S. Appl. No. 11/183,269, dated Jun. 23, 2009.
Office Action for U.S. Appl. No. 11/183,269, dated Dec. 4, 2008.
Final Office Action for U.S. Appl. No. 11/183,269, dated Jun. 5, 2008.
Office Action for U.S. Appl. No. 11/183,269, dated Oct. 18, 2007.
Restriction Requirement for U.S. Appl. No. 11/183,269, dated Jun. 25, 2007.
Office Action for U.S. Appl. No. 13/085,402, dated Apr. 19, 2012.
Notice of Allowance for U.S. Appl. No. 13/085,402, dated Aug. 2, 2012.
Notice of Allowance for U.S. Appl. No. 13/085,402, dated Nov. 13, 2012.
Notice of Allowance for U.S. Appl. No. 13/085,402, dated Feb. 20, 2013.
Notice of Allowance for U.S. Appl. No. 13/085,402, dated Jun. 14, 2013.
Office Action for U.S. Appl. No. 13/955,336, dated Dec. 5, 2013.
Notice of Allowance for U.S. Appl. No. 13/955,336, dated Apr. 28, 2014.
Notice of Allowance for U.S. Appl. No. 13/955,336, dated Aug. 18, 2014.
Notice of Allowance for U.S. Appl. No. 13/955,336, dated Oct. 7, 2014.
Notice of Allowance for U.S. Appl. No. 13/955,336, dated Nov. 3, 2014.
Office Action for U.S. Appl. No. 14/557,409, dated Jun. 11, 2015.
Notice of Allowance for U.S. Appl. No. 14/557,409, dated Jan. 14, 2016.
Notice of Allowance for U.S. Appl. No. 14/557,409, dated Apr. 28, 2016.
Notice of Allowance for U.S. Appl. No. 14/557,409, dated Aug. 8, 2016.
Notice of Allowance for U.S. Appl. No. 14/557,409, dated Nov. 4, 2016.
Corrected Notice of Allowance for U.S. Appl. No. 14/557,409, dated Dec. 12, 2016.
Office Action for U.S. Appl. No. 15/375,423, dated Mar. 27, 2017.
Notice of Allowance for U.S. Appl. No. 15/375,423, dated Jul. 5, 2017.
Notice of Allowance for U.S. Appl. No. 15/375,423, dated Oct. 31, 2017.
Notice of Allowance for U.S. Appl. No. 15/375,423, dated Mar. 23, 2018.
Notice of Allowance for U.S. Appl. No. 15/375,423, dated Jul. 13, 2018.
Restriction Requirement for U.S. Appl. No. 11/580,222, dated Jun. 18, 2008.
Office Action for U.S. Appl. No. 11/580,222, dated Sep. 12, 2008.
Office Action for U.S. Appl. No. 11/580,222, dated Jan. 28, 2009.
Notice of Allowance for U.S. Appl. No. 11/580,222, dated Apr. 20, 2009.
U.S. Appl. No. 12/462,286, filed Jul. 31, 2009.
Restriction Requirement for U.S. Appl. No. 12/462,286, dated Sep. 17, 2010.
Office Action for U.S. Appl. No. 12/462,286, dated Jan. 13, 2011.
Notice of Allowance for U.S. Appl. No. 12/462,286, dated Jun. 24, 2011.
Notice of Allowance for U.S. Appl. No. 12/462,286, dated Nov. 22, 2011.
Office Action for U.S. Appl. No. 13/367,346, dated May 15, 2013.
Notice of Allowance for U.S. Appl. No. 13/367,346, dated Oct. 10, 2013.
Office Action for U.S. Appl. No. 13/367,346, dated Jan. 28, 2014.
Notice of Allowance for U.S. Appl. No. 13/367,346, dated Aug. 15, 2014.
Notice of Allowance for U.S. Appl. No. 13/367,346, dated Mar. 19, 2015.
Office Action ffor U.S. Appl. No. 14/715,501, dated Sep. 23, 2015.
Office Action for U.S. Appl. No. 14/715,501, dated Mar. 25, 2016.
Office Action for U.S. Appl. No. 14/715,501, dated Oct. 17, 2016.
Office Action for U.S. Appl. No. 14/715,501, dated Jul. 20, 2017.
Office Action for U.S. Appl. No. 14/715,501, dated Jan. 8, 2018.
Notice of Allowance for U.S. Appl. No. 14/715,501, dated May 9, 2018.
Notice of Allowance for U.S. Appl. No. 14/715,501, dated Sep. 11, 2018.
U.S. Appl. No. 12/806,312, filed Aug. 10, 2010.
Office Action for U.S. Appl. No. 12/806,312, dated Apr. 20, 2012.
Office Action for U.S. Appl. No. 12/806,312, dated Sep. 25, 2012.
Notice of Allowance for U.S. Appl. No. 12/806,312, dated Dec. 14, 2012.
Notice of Allowance for U.S. Appl. No. 12/806,312, dated Mar. 29, 2013.
U.S. Appl. No. 13/831,512, filed Mar. 14, 2013.
Office Action for U.S. Appl. No. 13/831,512, dated Jun. 4, 2013.
Office Action for U.S. Appl. No. 13/831,512, dated Feb. 24, 2014.
Office Action for U.S. Appl. No. 13/831,512, dated Jul. 2, 2014.
Office Action for U.S. Appl. No. 13/831,512, dated Jan. 21, 2015.
Office Action for U.S. Appl. No. 13/831,512, dated May 29, 2015.
Office Action for U.S. Appl. No. 13/831,512, dated Feb. 24, 2016.
Notice of Allowance for U.S. Appl. No. 13/831,512, dated Aug. 1, 2016.
Notice of Allowance for U.S. Appl. No. 13/831,512, dated Oct. 25, 2016.
Notice of Allowance for U.S. Appl. No. 13/831,512, dated Jan. 30, 2017.
Notice of Allowance for U.S. Appl. No. 13/831,512, dated Feb. 21, 2017.
Office Action for U.S. Appl. No. 15/396,428, dated Feb. 16, 2018.
Office Action for U.S. Appl. No. 15/396,428, dated Jun. 21, 2018.
Office Action for U.S. Appl. No. 15/409,723, dated Apr. 23, 2018.
Office Action for U.S. Appl. No. 15/409,723, dated Oct. 31, 2018.
Notice of Allowance for U.S. Appl. No. 11/183,256, dated Jan. 13, 2009.
Office Action for U.S. Appl. No. 11/183,256, dated Sep. 12, 2008.
Notice of Allowance for U.S. Appl. No. 11/183,256, dated Jul. 8, 2008.
Office Action for U.S. Appl. No. 11/183,256, dated Jan. 25, 2008.
Restriction Requirement for U.S. Appl. No. 11/183,256, dated Oct. 17, 2007.
Restriction Requirement for U.S. Appl. No. 11/183,256, dated Jun. 28, 2007.
Notice of Allowance for U.S. Appl. No. 11/546,685, dated Feb. 17, 2010.
Notice of Allowance for U.S. Appl. No. 11/546,685, dated Sep. 18, 2009.
Office Action for U.S. Appl. No. 11/546,685, dated Mar. 5, 2009.
Restriction Requirement for U.S. Appl. No. 11/546,685, dated Jan. 27, 2009.
U.S. Appl. No. 12/803,732, filed Jul. 1, 2010.
Notice of Allowance for U.S. Appl. No. 12/803,732, dated Sep. 1, 2011.
Notice of Allowance for U.S. Appl. No. 12/803,732, dated Nov. 15, 2011.
Notice of Allowance for U.S. Appl. No. 12/803,732, dated Jan. 30, 2012.
Notice of Allowance for U.S. Appl. No. 12/803,732, dated Apr. 17, 2012.
Notice of Allowance for U.S. Appl. No. 12/803,732, dated Jul. 5, 2012.
Notice of Allowance for U.S. Appl. No. 12/803,732, dated Oct. 19, 2012.

(56) References Cited

OTHER PUBLICATIONS

Notice of Allowance for U.S. Appl. No. 12/803,732, dated Feb. 13, 2013.
Office Action for U.S. Appl. No. 13/291,020, dated Jun. 4, 2012.
Office Action for U.S. Appl. No. 13/291,020, dated Apr. 23, 2012.
Notice of Allowance for U.S. Appl. No. 13/291,020, dated Aug. 2, 2012.
Notice of Allowance for U.S. Appl. No. 13/291,020, dated Nov. 2, 2012.
Notice of Allowance for U.S. Appl. No. 13/291,020, dated Feb. 11, 2013.
U.S. Appl. No. 13/831,419, filed Mar. 14, 2013.
Office Action for U.S. Appl. No. 13/831,419, dated Apr. 27, 2015.
Office Action for U.S. Appl. No. 13/831,419, dated Aug. 12, 2015.
Notice of Allowance for U.S. Appl. No. 13/831,419, dated Jan. 28, 2016.
Office Action for U.S. Appl. No. 13/831,419, dated Apr. 28, 2016.
Office Action for U.S. Appl. No. 13/831,419, dated Nov. 17, 2016.
Office Action for U.S. Appl. No. 13/831,419, dated Feb. 1, 2017.
Notice of Allowance for U.S. Appl. No. 13/831,419, dated Jun. 6, 2017.
Office Action for U.S. Appl. No. 13/831,419, dated Oct. 20, 2017.
Office Action for U.S. Appl. No. 13/831,419, dated Jun. 8, 2018.
U.S. Appl. No. 13/831,445, filed Mar. 14, 2013.
Office Action for U.S. Appl. No. 13/831,445, dated Feb. 20, 2015.
Notice of Allowance for U.S. Appl. No. 13/831,445, dated Oct. 21, 2016.
Notice of Allowance for U.S. Appl. No. 13/831,445, dated Jan. 9, 2017.
Corrected Notice of Allowance for U.S. Appl. No. 13/831,445, dated Jan. 23, 2017.
Notice of Allowance for U.S. Appl. No. 13/831,445, dated Apr. 25, 2017.
Office Action for U.S. Appl. No. 13/831,445, dated Feb. 6, 2018.
Notice of Allowance for U.S. Appl. No. 13/831,445, dated Aug. 8, 2018.
"±1.5g Dual Axis Micromachined Accelerometer", Freescale Semiconductor, Inc., Motorola—Semiconductor Technical Data, MMA6260Q, Jun. 2004, pp. 1-7.
"APA Announces Shipment of the SunUV™ Personal UV Monitor", Press Release, Nov. 7, 2003, pp. 1-3.
"Camera Specs Take Candid Snaps", BBC News, Sep. 18, 2003, pp. 1-3.
"Cardo Wireless Attaching Clips and Wearing Headset", Cardo Systems, Inc., http://www.cardowireless.com/clips.php, downloaded Nov. 27, 2004, pp. 1-3.
"Environmental Health Criteria 14: Ultraviolet Radiation", International Programme on Chemical Safety, World Health Organization Geneva, 1979 http://www.ichem.org., pp. 1-102.
"Exclusive Media Event Marks Debut of Oakley Thump: World's First Digital Audio Eyewear", Oakley Investor Relations, Press Release, Nov. 15, 2004, pp. 1-2.
"Eyetop", Product-Features, eyetop eyewear, eyetop belt worn, http://www.eyetop.net/products/eyetop/features.asp., downloaded Nov. 6, 2003, pp. 1-2.
"Heart Rate Monitors", http://www.healthgoods.com, downloaded Dec. 4, 2004.
"How is the UV Index Calculated", SunWise Program, U.S. Environmental Protection Agency, http://www.epa.gov/sunwise/uvcalc.html, downloaded Oct. 14, 2004, pp. 1-2.
"Industrial UV Measurements", APA Optics, Inc., http://www.apaoptics.com/uv/, downloaded Jul. 12, 2004, p. 1.
"Motorola and Oakley Introduce First Bluetooth Sunglasses—Cutting Edge RAZRWire Line Offers Consumers On-The-Go Connections", Motorola Mediacenter—Press Release, Feb. 14, 2005, pp. 1-2.
"Oakley Thump: Sunglasses Meet MP3 Player", with image, http://news.designtechnica.com/article4665.html, Jul. 13, 2004.
"Personal UV monitor," Optics.org, http://optics.org/articles/news/6/6/7/1 (downloaded Dec. 20, 2003), Jun. 9, 2000, pp. 1-2.
"SafeSun Personal Ultraviolet Light Meter", http://healthchecksystems.com/safesun.htm, downloaded Jul. 12, 2004, pp. 1-4.
"SafeSun Personal UV Meter", Introduction, Optix Tech Inc., http://www.safesun.com, downloaded Feb. 5, 2004, pp. 1-2.
SafeSun Personal UV Meter, features, Optix Tech Inc., http://www.safesun.com/features.html, downloaded May 1, 2004, pp. 1-2.
"Sharper Image—The FM Pedometer", e-Corporate Gifts.com, http://www.e-corporategifts.com/sr353.html, downloaded Jan. 22, 2005, pp. 1-2.
"Sun UV™ Personal UV Monitor", APA Optics, Inc., http://www.apaoptics.com/sunuv/uvfacts.html, downloaded Dec. 20, 2003, pp. 1-3.
"Ultraviolet Light and Sunglasses", Oberon's Frequently Asked Questions, http://www.oberoncompany.com/OBEnglish/FAQUV.html, downloaded Feb. 5, 2004, pp. 1-2.
"Ultraviolet Light Sensor", Barrett & Associates Engineering, http://www.barrettengineering.com/project_uvs.htm, downloaded Feb. 5, 2004, pp. 1-3.
"Ultraviolet Radiation (UVR)", Forum North, Ontario Ministry of Labour, http://www3.mb.sympatico.ca/~ericc/ULTRAVIOLET%20RADIATION.htm, downloaded Feb. 5, 2004, pp. 1-6.
"What Are Gripples?", Gripping Eyewear, Inc., http://www.grippingeyewear.com/whatare.html, downloaded Nov. 2, 2005.
"With Racing Heart", Skaloud et al., GPS World, Oct. 1, 2001, http://www.gpsworld.com/gpsworld/content/printContentPopup.jsp?id=1805, pp. 1-5.
Abrisa Product Information: Cold Mirrors, Abrisa, Jun. 2001, p. 1.
Abrisa Product Information: Commercial Hot Mirror, Abrisa, Jun. 2001, p. 1.
Alps Spectacle, Air Conduction Glass, Bone Conduction Glass, http://www.alps-inter.com/spec.htm, downloaded Dec. 10, 2003, pp. 1-2.
Altimeter and Compass Watches, http://store.yahoo.com/snowshack/altimeter-watches.html, downloaded May 3, 2004, pp. 1-2.
Bone Conduction Headgear HG16 Series, "Voiceducer," http://www.temco-j.co.jp/html/English/HG16.html, downloaded Dec. 10, 2003, pp. 1-3.
Carnoy, David, "The Ultimate MP3 Player for Athletes? Could be.", CNET Reviews, May 14, 2004, pp. 1-4.
Clifford, Michelle A., "Accelerometers Jump into the Consumer Goods Market", Sensors Online, http://www.sensorsmag.com, Aug. 2004.
Comfees.com, Adjustable Sports Band Style No. 1243, http://shop.store.yahoo.com/comfees/adsportbansty.html, downloaded Apr. 18, 2003, pp. 1-2.
Cool Last Minute Gift Ideas!, UltimateFatBurner Reviews and Articles, http://www.ultimatefatburner.com/gift-ideas.html, downloaded May 10, 2005, pp. 1-3.
Dickie et al. "Eye Contact Sensing Glasses for Attention—Sensitive Wearable Video Blogging," Human Media Lab, Queen's University, Kingston, on K7L 3N6, Canada, est. Apr. 2004, pp. 1-2.
Dixen, Brian, "ear-catching", Supertesten, Mobil, Apr. 2003 (estimated), pp. 37-41.
Global Solar UV Index, A Practical Guide, World Health Organization, 2002, pp. 1-28.
Grobart, Sam, "Digit-Sizing Your Computer Data", News Article, Sep. 2004, p. 1.
Life Monitor V1.1, Rhusoft Technologies Inc., http://www.rhusoft.com/lifemonitor/, Mar. 1, 2003, pp. 1-6.
Manes, Stephen, "Xtreme Cam", Forbes Magazine, Sep. 5, 2005, p. 96.
Mio, PhysiCal, http://www.gophysical.com/, downloaded Jan. 27, 2004, 5 pages.
Monitoring Athletes Performance—2002 Winter Olympic News from KSL, Jan. 23, 2002, http://2002.ksl.com/news-3885i, pp. 1-3.
Niwa, "UV Index Information", http://www.niwa.cri.nz/services/uvozone/uvi-info, downloaded Jul. 15, 2004, pp. 1-2.
NuVision 60GX Steroscopic Wireless Glasses, Product Information, NuVision by MacNaughton, c. 1997, MacNaughton, Inc., pp. 1-2.
Pärkkä, Juha, et al., "A Wireless Wellness Monitor for Personal Weight Management", VTT Information Technology, Tampere, Finland, Nov. 2000, p. 1.

(56) References Cited

OTHER PUBLICATIONS

Pedometer, Model HJ-112, Omron Instruction Manual, Omron Healthcare, Inc., 2003, pp. 1-27.
PNY Announces Executive Attaché USB 2.0 Flash Drive and Pen Series, Press Release, PNY Technologies, Las Vegas, Jan. 8, 2004, pp. 1-2.
PNY Technologies, "Executive Attaché" http://www.pny.com/products/flash/execattache.asp downloaded Nov. 16, 2005.
Polar WM41 and 42 weight management monitor, http://www.simplysports/polar/weight_management/wm41-42.htm, downloaded Jan. 28, 2004, pp. 1-3.
Questions Answers, Pedometer.com, http://www.pedometer.com, downloaded May 5, 2005.
RazrWire, copyright Motorola, Inc., Jul. 2005, 1 page.
SafeSun Personal UV Meter, Scientific Data, Optix Tech Inc., http://www.safesun.com/scientific.html, downloaded May 1, 2004, pp. 1-3.
SafeSun Sensor, User's Manual, Optix Tech Inc., Jun. 1998, 2 pages.
SafeSun, Personal UV Meter, "Technical Specif cations", Optix Tech Inc., http://www.safesun.com/technical.html, downloaded Jul. 12, 2004, pp. 1-2.
SafeSun, Personal UV Meter, Experiments, Optix Tech Inc., http://www.safesun.com/experiments.html, downloaded Feb. 5, 2004, pp. 1-2.
Shades of Fun, Blinking Light Glasses, http://www.shadesoffun.com/Nov/Novpgs-14.html, downloaded Jul. 9, 2005, pp. 1-4.
SportLine Fitness Pedometer—Model 360, UltimateFatBurner Superstore, http://www.ultimatefatburner-store.com/ac_004.html, downloaded May 10, 2005, pp. 1-2.
Steele, Bonnie G. et al., "Bodies in motion: Monitoring daily activity and exercise with motion sensors in people with chronic pulmonary disease", VA Research & Development, Journal of Rehabilitation Research & Development, vol. 40, No. 5, Sep./Oct. 2003, Supplement 2, pp. 45-58.
Stevens, Kathy, "Should I Use a Pedometer When I Walk?", Healtheon/WebMD, Apr. 14, 2000.
Sundgot, Jørgen "2nd-gen Motorola Bluetooth headset", InfoSync World, Mar. 1, 2003, http://www.infosync.no/news/2002/n/2841.html, pp. 1-2.
SunSensors, Segan Industries, Inc., http://www.segan-ind.com/sunsensor.htm, downloaded Feb. 5, 2004, pp. 1-3.
SunUV™, Personal UV Monitor User's Guide, APA Optics, Inc., 2003 pp. 1-52.
SunUV™, Personal UV Monitor, APA Optics, Inc., http://www.apaoptics.com/sunuv/models.html, downloaded Dec. 20, 2003.
Talking Pedometer, Sportline, Inc., Jun. 2001 (Possibly earlier), 1 page.
The unofficial ELSA 3D Revelator page, Dec. 30, 1999, pp. 1-15.
Top Silicon PIN Photodiode, PD93-21C, Technical Data Sheet, Everlight Electronics Co., Ltd., 2004, pp. 1-9.
UV Light Meter, UVA and UVB measurement, UV-340, Instruction Manual, Lutron, Jun. 2003 (estimated), pp. 1-5.
UV-Smart, UVA/B Monitor, Model EC-960-PW, Instruction Manual, Tanita Corporation of America, Inc., downloaded Nov. 16, 2001.
Vitaminder Personal Carb Counter, http://www.auravita.com/products/AURA/ORBU11420.asp. Downloaded Nov. 15, 2005, pp. 1-4.
Yamada et al. "Development of an eye-movement analyser possessing functions for wireless transmission and autocalibration," Med. Biol. Eng. Comput., No. 28, v.4, Jul. 28, 1990, http://link.springer.com/article/10.1007%2FBF02446149?LI=true, pp. 1-2.
Notice of Allowance for U.S. Appl. No. 16/049,120, dated Feb. 23, 2021.
Notice of Allowance for U.S. Appl. No. 16/049,120, dated Jun. 3, 2021.
Notice of Allowance for U.S. Appl. No. 16/429,181, dated Feb. 1, 2021.
Notice of Allowance for U.S. Appl. No. 16/429,181, dated Jun. 17, 2021.
Notice of Allowance for U.S. Appl. No. 16/424,018, dated Mar. 8, 2021.
Office Action for U.S. Appl. No. 16/424,018, dated May 13, 2021.

\* cited by examiner

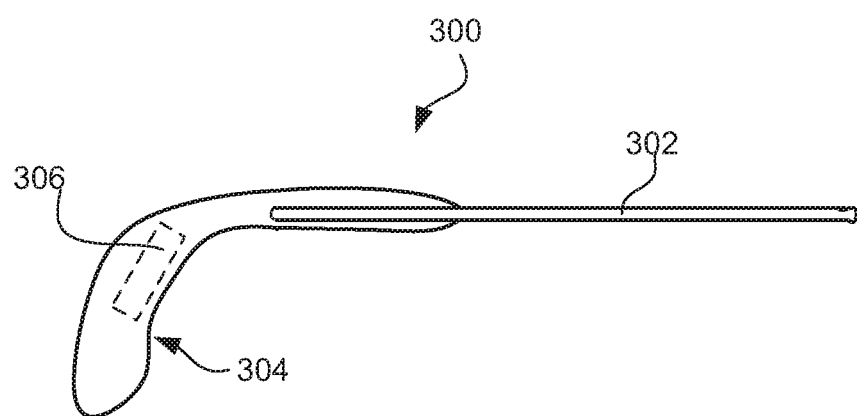
FIG. 3A
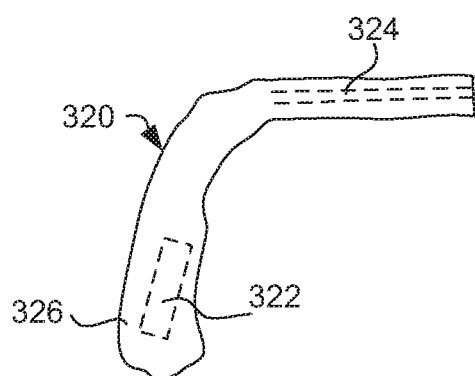 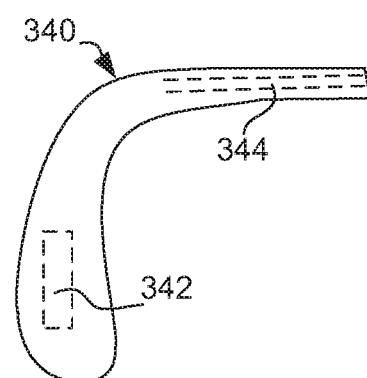
FIG. 3B  FIG. 3C

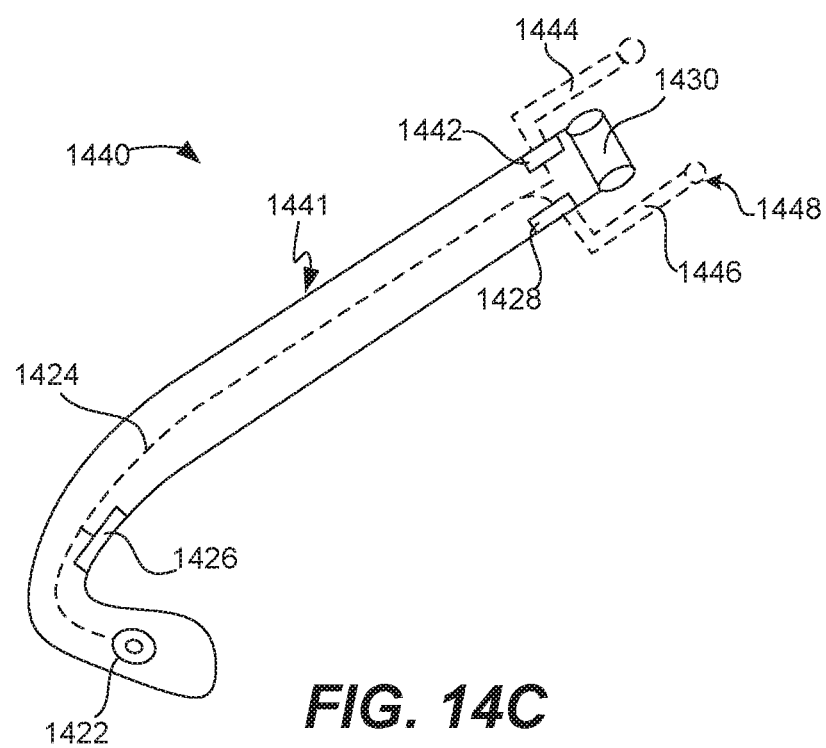
FIG. 14C
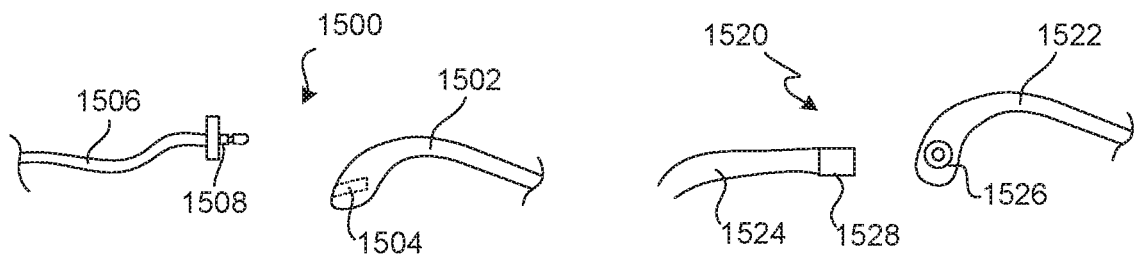
FIG. 15A
FIG. 15B
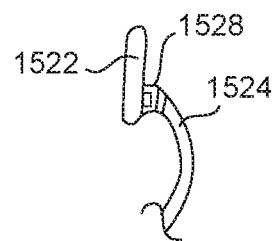
FIG. 15C

EYEWEAR SUPPORTING EMBEDDED AND TETHERED ELECTRONIC COMPONENTS

CROSS-REFERENCE TO RELATED APPLICATIONS

This application is a continuation of U.S. patent application Ser. No. 16/049,120, filed Jul. 30, 2018, and entitled "EYEWEAR SUPPORTING EMBEDDED ELECTRONIC COMPONENTS," which is hereby incorporated herein by reference, which in turn is a continuation of U.S. patent application Ser. No. 15/375,423, filed Dec. 12, 2016, and entitled "EYEWEAR SUPPORTING EMBEDDED ELECTRONIC COMPONENTS,"," now U.S. Pat. No. 10,061,144, which is hereby incorporated herein by reference, which in turn is a continuation of U.S. patent application Ser. No. 14/557,409, filed Dec. 1, 2014, and entitled "EYEWEAR SUPPORTING EMBEDDED ELECTRONIC COMPONENTS," now U.S. Pat. No. 9,547,184, which is hereby incorporated herein by reference, which in turn is a continuation of U.S. patent application Ser. No. 13/955,336, filed Jul. 31, 2013, and entitled "EYEWEAR SUPPORTING BONE CONDUCTING SPEAKER," now U.S. Pat. No. 8,905,542, which is hereby incorporated herein by reference, which in turn is a continuation of U.S. patent application Ser. No. 13/085,402, filed Apr. 12, 2011, and entitled "EYEWEAR SUPPORTING AFTER-MARKET ELECTRICAL COMPONENTS," now U.S. Pat. No. 8,500,271, which is hereby incorporated by reference, which in turn is a continuation of U.S. patent application Ser. No. 11/183,269, filed Jul. 15, 2005, and entitled "EYEWEAR SUPPORTING AFTER-MARKET ELECTRICAL COMPONENTS," now U.S. Pat. No. 7,922,321, which is hereby incorporated herein by reference, which in turn is a continuation-in-part of U.S. patent application Ser. No. 10/964,011, filed Oct. 12, 2004, and entitled "TETHERED ELECTRICAL COMPONENTS FOR EYEGLASSES," now U.S. Pat. No. 7,192,136, which is hereby incorporated herein by reference, which in turn claims priority to each of: (i) U.S. Provisional Patent Application No. 60/509,631, filed Oct. 9, 2003, and entitled "TETHERED ELECTRICAL COMPONENTS FOR EYEGLASSES," which is hereby incorporated herein by reference; (ii) U.S. Provisional Patent Application No. 60/527,565, filed Dec. 8, 2003, and entitled "ADAPTABLE COMMUNICATION TECHNIQUES FOR ELECTRONIC DEVICES," which is hereby incorporated herein by reference; (iii) U.S. Provisional Patent Application No. 60/562,798, filed Apr. 15, 2004, entitled "EYEWEAR WITH ULTRAVIOLET DETECTION SYSTEM," and which is hereby incorporated herein by reference; (iv) U.S. Provisional Patent Application No. 60/583,169, filed Jun. 26, 2004, entitled "ELECTRICAL COMPONENTS FOR USE WITH EYEWEAR, AND METHODS THEREFOR," and which is hereby incorporated herein by reference; (v) U.S. Provisional Patent Application No. 60/592,045, filed Jul. 28, 2004, entitled "EYEGLASSES WITH A CLOCK OR OTHER ELECTRICAL COMPONENT," and which is hereby incorporated herein by reference; and (vi) U.S. Provisional Patent Application No. 60/605,191, filed Aug. 28, 2004, entitled "ELECTRICAL COMPONENTS FOR USE WITH EYEWEAR, AND METHODS THEREFOR," and which is hereby incorporated herein by reference.

This application, by way of U.S. patent application Ser. No. 11/183,269, also claims priority to each of: (i) U.S. Provisional Patent Application No. 60/592,045, filed Jul. 28, 2004, entitled "EYEGLASSES WITH A CLOCK OR OTHER ELECTRICAL COMPONENT," and which is hereby incorporated herein by reference; (ii) U.S. Provisional Patent Application No. 60/605,191, filed Aug. 28, 2004, entitled "ELECTRICAL COMPONENTS FOR USE WITH EYEWEAR, AND METHODS THEREFOR," and which is hereby incorporated herein by reference; (iii) U.S. Provisional Patent Application No. 60/618,107, filed Oct. 12, 2004, and entitled "TETHERED ELECTRICAL COMPONENTS FOR EYEGLASSES," which is hereby incorporated herein by reference; (iv) U.S. Provisional Patent Application No. 60/620,238, filed Oct. 18, 2004, entitled "EYEGLASSES WITH HEARING ENHANCED AND OTHER AUDIO SIGNAL-GENERATING CAPABILITIES," and which is hereby incorporated herein by reference; (v) U.S. Provisional Patent Application No. 60/647,836, filed Jan. 31, 2005, and entitled "EYEGLASSES WITH HEART RATE MONITOR," which is hereby incorporated herein by reference; and (vi) U.S. Provisional Patent Application No. 60/647,826, filed Jan. 31, 2005, and entitled "EYEWEAR WITH ELECTRICAL COMPONENTS," which is hereby incorporated herein by reference.

In addition, this application is related to each of: (i) U.S. patent application Ser. No. 10/822,218, filed Apr. 12, 2004, and entitled "EYEGLASSES FOR WIRELESS COMMUNICATIONS," now U.S. Pat. No. 7,792,552, which is hereby incorporated herein by reference; (ii) U.S. patent application Ser. No. 10/964,011, filed Oct. 12, 2004, and entitled "TETHERED ELECTRICAL COMPONENTS FOR EYEGLASSES," now U.S. Pat. No. 7,192,136, which is hereby incorporated herein by reference; (iii) U.S. patent application Ser. No. 11/006,343, filed Dec. 7, 2004, and entitled "ADAPTABLE COMMUNICATION TECHNIQUES FOR ELECTRONIC DEVICES," now U.S. Pat. No. 7,116,976, which is hereby incorporated herein by reference; (iv) U.S. patent application Ser. No. 11/078,855, filed Mar. 11, 2005, and entitled "EYEWEAR WITH RADIATION DETECTION SYSTEM," now U.S. Pat. No. 7,500,746, which is hereby incorporated herein by reference; (v) U.S. patent application Ser. No. 11/078,857, filed Mar. 11, 2005, and entitled "RADIATION MONITORING SYSTEM," which is hereby incorporated herein by reference; (vi) U.S. patent application Ser. No. 11/183,283, filed Jul. 15, 2005, and entitled "EVENT EYEGLASSES," which is hereby incorporated herein by reference; (vii) U.S. patent application Ser. No. 11/183,262, filed Jul. 15, 2005, and entitled "EYEGLASSES WITH HEARING ENHANCED AND OTHER AUDIO SIGNAL-GENERATING CAPABILITIES," now U.S. Pat. No. 7,760,898, which is hereby incorporated herein by reference; (viii) U.S. patent application Ser. No. 11/183,256, filed Jul. 15, 2005, and entitled "EYEGLASSES WITH ELECTRICAL COMPONENTS," now U.S. Pat. No. 7,500,747, which is hereby incorporated herein by reference; (ix) U.S. patent application Ser. No. 11/183,263, filed Jul. 15, 2005, and entitled "EYEGLASSES WITH A CLOCK OR OTHER ELECTRICAL COMPONENT," now U.S. Pat. No. 7,380,936, which is hereby incorporated herein by reference; and (x) U.S. patent application Ser. No. 11/183,276, filed Jul. 15, 2005, and entitled "EYEGLASSES WITH ACTIVITY MONITORING," now U.S. Pat. No. 7,255,437, which is hereby incorporated herein by reference.

BACKGROUND OF THE INVENTION

Traditionally, eyeglasses have not contained or made any use of electrical components. In recent years, attempts to include electrical components within eyeglasses have had limited success. Even incorporating a small electrical component, such as a microphone, into an eyeglass frame may not be a simple task because, for example, of the necessary electrical connections with the electrical component. Clearly, larger scale electrical components would be more difficult to be provided in or attached to eyeglass frames. Many eyeglasses frames tend to be very compact and lightweight and thus may not have a lot of space for electrical components. Moreover, since eyeglass frames are often fashionable items whose designs are important, there are substantial design tradeoffs involved with providing or attaching electrical components to eyeglass frames.

Even if electrical components are provided in an eyeglass frame, the ability to alter or change electrical components is problematic. Conventionally, once an eyeglass frame is manufactured, electrical components embedded in the eyeglass frame may not be removed, nor can addition electrical components be added into the eyeglass frame. Attachment of electrical components to eyeglass frames has not proven to be reliable, design friendly or commercially successful.

Accordingly, there is a need for improved approaches to facilitate use of electrical components with eyeglasses.

SUMMARY

Generally speaking, the invention pertains to techniques for providing eyewear with electrical components. The electrical components can provide electrical technology to eyewear (e.g., eyeglasses) without having to substantially compromise aesthetic design principles of the eyewear. Often, the electrical components can be attached to the eyewear as an after-market enhancement. The electrical components can operate independently or together with other electrical components provided elsewhere.

The electrical components can support signal capturing, signal processing, signal transmission, signal display, signal storage and/or power provision. The signals can be, for example, analog or digital signals. The electrical components can, for example, be used to provide audio output and/or audio pick-up. The electrical components may include and/or control one or more sensors to monitor and/or signal the conditions of a user of the eyewear. The electrical components may also include and/or control one or more operation indicators to signal operational status of at least some other electrical components. In addition, the electrical components can be or pertain to a circuit board or module, which includes a plurality of electrical components.

In one embodiment, the one or more electrical components support audio capabilities allowing a user to hear audio output. In another embodiment, the one or more electrical components support communication capabilities allowing a user to communicate with a communication device in a hands-free manner.

The invention can also relate to tethered electrical components for eyeglasses. According to a number of embodiments of the invention, an apparatus having one or more external electrical components can be tethered, through a tethering mechanism, to one or more electrical components within or attached to a pair of eyeglasses. The one or more external electrical components being tethered by the tethering mechanism, such as a cable or a cord, may be referred to herein as the 'tethered electrical components.' While the one or more electrical components in or attached to the glasses can be referred to herein as 'eyeglass electrical components.'

Tethered electrical components, alone or in combination with eyeglass electrical components can be used for a variety of different applications and uses. Examples of applications and uses include a wireless communication system, a radiation monitoring system, a health monitoring system or a fitness monitoring system. In one embodiment, the tethered electrical components can support wireless communication capabilities allowing a user to communicate with a communication device in a wireless and hands-free manner. In another embodiment, the tethered electrical components can support radiation monitoring such as for monitoring ultraviolet or solar radiation for a wearer of eyeglasses. In still other embodiments, the tethered electrical components can support health or fitness monitoring for a wearer of eyeglasses.

The tethered electrical components can support signal capturing, signal processing, signal transmission, data acquisition, data processing, and/or data storage. For example, the tethered electrical components can, for example, include a power source and/or an electronic controller. The tethered electrical components may also include and/or control one or more operation indicators to signal operational status of the tethered electrical components. In addition, the tethered electrical components may also include and/or control one or more sensors to monitor and/or signal conditions of users. The invention can be implemented in numerous ways, including a method, system, device, apparatus, and a computer readable medium. Several embodiments of the invention are discussed below.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 3A is a diagram of a temple arrangement according to one embodiment of the invention.

FIG. 3B is a diagram of a temple cover that at least partially covers a temple (e.g., temple and/or temple tip) according to one embodiment of the invention.

FIG. 3C is a diagram of a fit-over temple that at least partially fits over a temple (e.g., temple and/or temple tip) according to one embodiment of the invention.

FIG. 14C is a diagram of an arrangement of an arm for a frame of a pair of eyeglasses with electrical components according to another embodiment of the invention.

FIG. 15A is a diagram of a connection arrangement of an arm and a cord according to one embodiment of the invention.

FIG. 15B is a diagram of a connection arrangement of an arm and a cord according to another embodiment of the invention.

FIG. 15C is a side view of the connection arrangement of FIG. 15B according to one embodiment of the invention when the connector and the connector are coupled together.

DETAILED DESCRIPTION OF THE INVENTION

The invention pertains to techniques for providing eyewear with electrical components. The electrical components can provide electrical technology to eyewear (e.g., eyeglasses) without having to substantially compromise aesthetic design principles of the eyewear. Often, the electrical components can be attached to the eyewear as an aftermarket enhancement. The electrical components can operate independently or together with other electrical components provided elsewhere.

One aspect of the invention relates to temple arrangements for use with eyeglasses. According to this aspect, a temple arrangement includes one or more electrical components. The one or more electrical components are attached to or at least partially embedded in the temple arrangement.

Another aspect of the invention relates to a temple adapter for use with eyeglasses. According to this aspect, a temple adapter includes one or more electrical components that are able to be mechanically (and optionally electrically) coupled to a temple (including a temple tip) of the eyeglasses.

The electrical components can support signal capturing, signal processing, signal transmission, signal display, signal storage and/or power provision. The signals can be, for example, analog or digital signals. The electrical components can, for example, be used to provide audio output and/or audio pick-up. The electrical components may include and/or control one or more sensors to monitor and/or signal the conditions of a user of the eyewear. The electrical components may also include and/or control one or more operation indicators to signal operational status of at least some other electrical components. In addition, the electrical components can be or pertain to a circuit board or module, which includes a plurality of electrical components.

In one embodiment, the one or more electrical components support audio capabilities allowing a user to hear audio output. In another embodiment, the one or more electrical components support communication capabilities allowing a user to communicate with a communication device in a hands-free manner.

Embodiments of different aspects of the invention are discussed below with reference to FIGS. 1-20. However, those skilled in the art will readily appreciate that the detailed description given herein with respect to these figures is for explanatory purposes as the invention extends beyond these limited embodiments.

Figure 1:
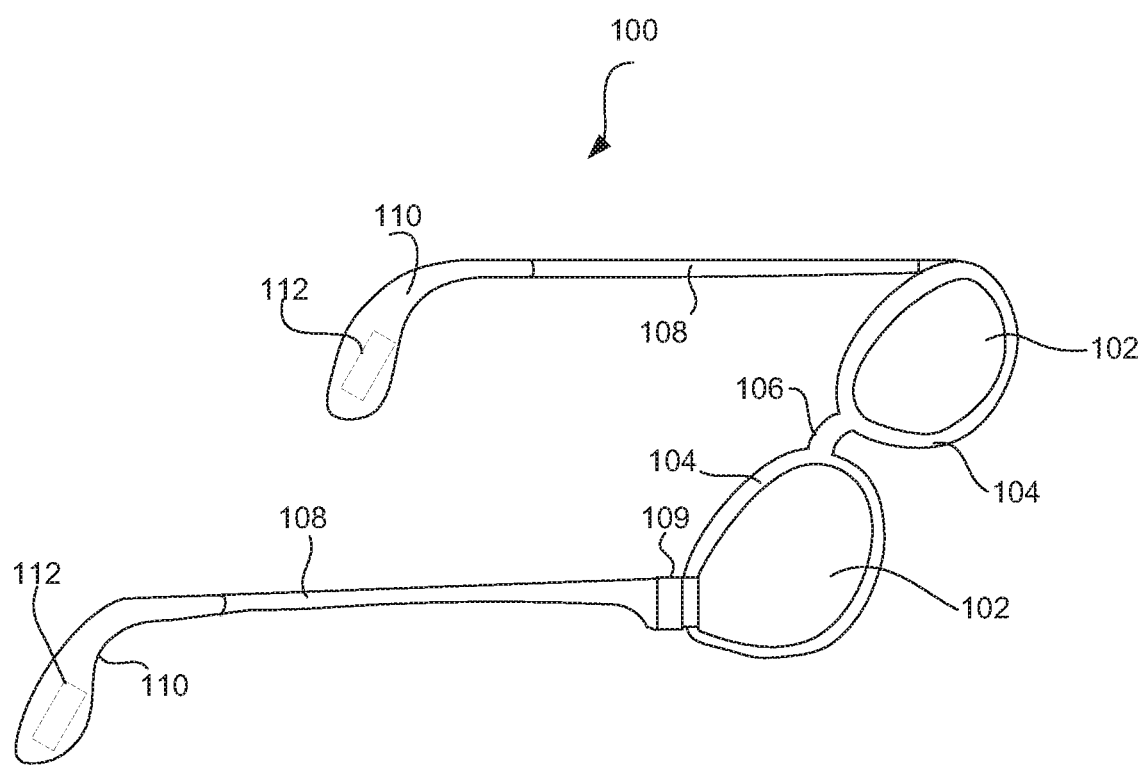
FIG. 1 is a perspective view of a pair of glasses according to one embodiment of the invention.

FIG. 1 is a perspective view of a pair of glasses 100 according to one embodiment of the invention. The glasses 100 include a frame and a pair of lenses 102. The frame has lens holders 104 that hold the lenses 102 in position. The frame also has a bridge 106. The glasses 100 further include a pair of temples (or arms) 108. The temples 108 are considered part of the frame. As shown in FIG. 1, each of the temples 108 is coupled to one of the lens holders 104 by a hinge 109. In one embodiment, the temples 108 can be removed from the frame (e.g., at the hinge 109).

In addition, temple arrangements 110 are attached to the temples 108. Here, one or both of the temples 108 can include a temple arrangement 110. A temple arrangement 110 can include one or more electrical components 112. In one embodiment, the temple arrangements 110 can be considered separate parts that can be attached to respective temples 108. Once attached, the temple arrangements 110 can be considered part of, or an extension to, the temples 108.

By having one or more electrical components 112 in one or more of the temple arrangements 110, electrical capabilities can be provided to the glasses 100 without burdensome impact to the design of other parts of the frames. Moreover, by providing electrical components in one or more of the temple arrangements 112, electrical capabilities can be added to eyeglasses in an after-market manner. Still further, by replacing temple arrangements, a user could alter the electrical capabilities of his eyeglasses.

In one embodiment, the glasses 100 do not have any other embedded electrical components, such as within the frame, except those in one or both of the temple arrangements 112. In another embodiment, the glasses 100 include one or more other electrical components embedded or attached to the frame of the glasses 100 and the components are electrically coupled to the one or more electrical components 112 in one or both of the temple arrangements 110.

In different embodiments, the glasses 100 can be, for example, a pair of sunglasses, fit-over glasses, prescription glasses, reading glasses, or safety glasses.

Figure 2:
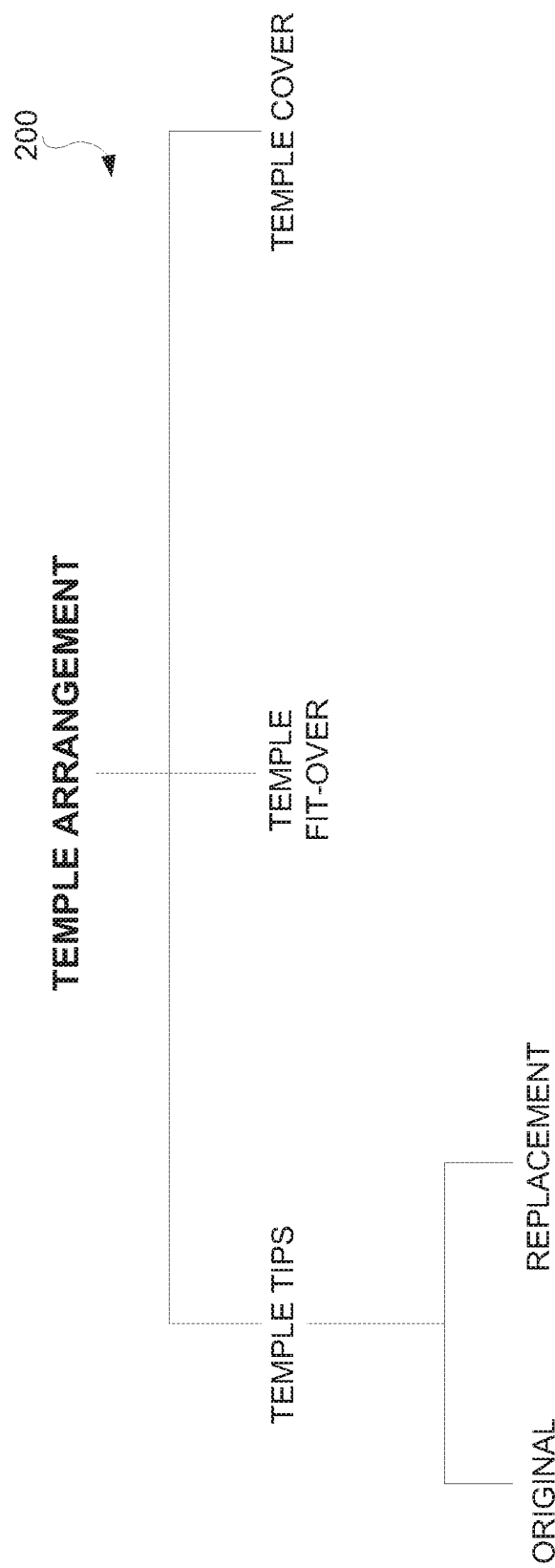
FIG. 2 illustrates a diagram of a number of different embodiments of temple arrangements according to the invention.

FIG. 2 illustrates a diagram of a number of different embodiments of temple arrangements 200 according to the invention. A temple arrangement 200 can be a temple tip, a temple fit-over, or a temple cover. In one embodiment, a temple tip is a structure that attaches to a rearward portion of a temple. In one embodiment, a temple tip can pertain to an enclosure that grabs onto a rearward portion of a temple. A temple tip is particularly common for wire frame eyeglass where the temple tip attaches to the rearward end of the temple and provides a surface suitable for positioning proximate to the user's ear. For example, FIG. 1 illustrates the temple arrangement 112 implemented as a temple tip.

In one embodiment, a temple tip is removable from its corresponding temple so that it can be replaced. The temple tip can be originally provided with the purchase of a pair of eyeglasses. Alternatively, the temple tip can be a replacement part that can be purchased separately and subsequently mounted onto a rearward portion of a temple of a pair of eyeglasses after removing any original temple tip. In another embodiment, a temple tip is permanently held onto the corresponding temple, for example, by an adhesive (e.g., epoxy, glue, etc.).

In one embodiment, a temple fit-over fits over at least a portion of the rearward end of a temple. If the rearward end of the temple has a temple tip, at least a portion of the temple tip can be fitted over by the temple fit-over. In one embodiment, a temple cover slides over and at least partially covers a portion of the rearward end of a temple. If the rearward end of the temple has a temple tip, at least a portion of the temple tip can be covered by the temple cover.

A temple cover is typically made of a material that is more flexible than a temple fit-over. For example, a temple cover can be made of a fabric or other materials, such as a sock or sleeve; while a temple fit-over can be made of plastic.

A temple arrangement 200 can be made of the same or different materials than the temple or other parts of the frame of the pair of eyeglasses. To illustrate, a pair of glasses with a metal frame can have non-metallic temple tips. A temple arrangement 200 can be of a color that is the same as, or similar to, or different from, that of the temple.

A temple arrangement 200 can be held onto a temple by frictional force. For example, if the temple arrangement 200 is a temple fit-over, it can be held onto an existing temple or temple tip by frictional force. Here, the temple fit-over is often removable. In another embodiment, the temple arrangement 200 can be permanently held onto its corresponding temple or temple tip. For example, the temple arrangement can be permanently held onto the corresponding temple or temple tip, for example, by an adhesive (e.g., epoxy, glue, etc.).

Depending on applications, a temple arrangement can be of different shapes. The shape can depend on the type of glasses. For example, a temple arrangement for fit-over glasses can be bigger than a temple arrangement for prescription glasses. The shape of the temple arrangement can also depend on applications for the electronic component(s) that are fully or partially embedded in the temple arrangement. Of course, aesthetic reasons can also influence shape (e.g., design, size, style) of a temple arrangement.

In one embodiment, the temple arrangement is a structure that has at least one electrical component attached thereto or at least partially embedded therein. In another embodiment, all of the electrical components to be provided with the temple arrangement are at least partially embedded in the temple arrangement.

FIG. 3A is a diagram of a portion 300 of a pair of eyeglasses according to one embodiment of the invention. The portion 300 includes a temple 302 that is associated with a pair of eyeglasses. Over the end of the temple 302 that is opposite the associated lens holder, a temple tip 304 is provided. The temple tip 304 can, for example, be held to the temple 302 by frictional forces and/or adhesive. The temple tip 304 includes at least one electrical component 306 that is at least partially embedded therein. A wide range of functionalities can be provided by the at least one electrical component 306. The temple tip 304 can be considered separate from or part of the temple 302. For example, when the temple tip 304 is not attached to the temple 302, the temple tip 304 is considered a separate part. As another example, when the temple tip 304 is attached to the temple 302, the temple tip 304 can be considered separate from or part of the temple 302.

The temple tip 304 can be manufactured and delivered to resellers or retailers and thereafter sold attached to eyeglasses. Alternatively, the temple tip 304 can be separately provided as an optional replacement temple tip for an original temple tip. Hence, after or during purchasing a pair of eyeglasses, upgrade of the eyeglasses can be had by replacing an existing temple tip with a replacement temple tip. The colors and shapes of the temple tip 304 can vary widely. In the after manufacturing environment, the reseller or retailer can be provided with a range of different colors and shapes so that a user can receive a replacement temple tip that reasonably matches the color and shape of the temple or that provides an altered appearance as desired by the user.

A number of embodiments have been described regarding one or more electrical components at least partially embedded in a pair of glasses. In one embodiment, one or more electrical components are at least partially embedded in a temple tip of a pair of glasses. Temple tips are relatively common for wire or metal frames which have wire or metal temples. The pair of glasses has a first and a second lens holders for receiving lenses. Each of the lens holders has a first side and a second side. The pair of glasses has a bridge element that couples the first side of the first lens holder to the second side of the second lens holder. The pair of glasses also includes a first temple and a second temple. The first temple is pivotally secured to the second side of the first lens holder through a joint, while the second temple is pivotally secured to the first side of the second lens holder through another joint. A temple typically has two ends, a first end and a second end. The first end can be the end that is pivotally secured to a lens holder through a joint, and the second end can be the other end of the temple. It is not uncommon that a temple includes a main body and an enclosure that grabs onto the main body of the temple. The second end is typically where the enclosure grabs onto the main body. The enclosure can be made of a different material than the main body of the temple. In one embodiment, such an enclosure is a temple tip, and there is an electrical component, partially or fully, embedded in the temple tip. There can also be a connector at the temple tip. In another embodiment, the temple tip can include a female connector. In still another embodiment, as a temple tip grabs onto the main body of the temple, a connector at the temple tip (such as a female connector) can make electrical contact with another connector (such as a male connector) at the main body of the temple. Typically, particularly before a pair of glasses has been extensively worn, the temple tip can be removed and re-inserted back on to the main body of the temple without much difficulty. Such a temple tip can be an after-market component, with different temple tips having different electrical components to serve different functions.

Besides a temple tip such as illustrated in FIG. 3A, a temple tip can also be effectively modified by a fit-over temple or temple cover.

FIG. 3B is a diagram of a temple cover 320 that at least partially covers a temple (e.g., temple and/or temple tip) according to one embodiment of the invention. As an example, the temple cover 320 can be made of a fabric or other material, such as a sock or sleeve, that slides over and at least partially covers a temple or a temple tip. The temple cover 320 can include at least one electrical component 322 that is either attached thereto or at least partially embedded therein. The temple cover 320 can also include an opening 324 so as to receive a temple or a temple tip. In one embodiment, the temple cover 320 is placed over a substantial portion of a temple tip, and the opening 324 can extend to a far end 326 so as to receive all or a substantial part of the temple tip. The temple cover 320 can, for example, be held to a temple or a temple tip by frictional forces and/or adhesive.

FIG. 3C is a diagram of a fit-over temple 340 that at least partially fits over a temple (e.g., temple and/or temple tip) according to one embodiment of the invention. For example, the fit-over temple 340 can at least partially fit-over a temple tip. The fit-over temple 340 includes at least one electrical component 342 that is either attached thereto or at least partially embedded therein. The fit-over temple 340 can also include an opening 344 so as to receive a temple or a temple tip. The depth and/or width of the opening 344 within the fit-over temple 340 can vary depending on the extent to which it is being fit over a temple or a temple tip. The fit-over temple 340 can, for example, be held to a temple or temple tip by frictional forces and/or adhesive. As an example, the fit-over temple 340 can be plastic or other material. The colors and shapes of the fit-over temple 340 can have a lot of variations.

A wide range of functionalities can be provided by the at least one electrical component (e.g., electrical component 322 and 342). In the after manufacturing environment, the reseller or retailer can be provided with a range of different colors and shapes so that a user can receive a replacement temple cover or fit-over temple that reasonably matches the color and shape of the temple or that provides an altered appearance as desired by the user.

Figure 3D:
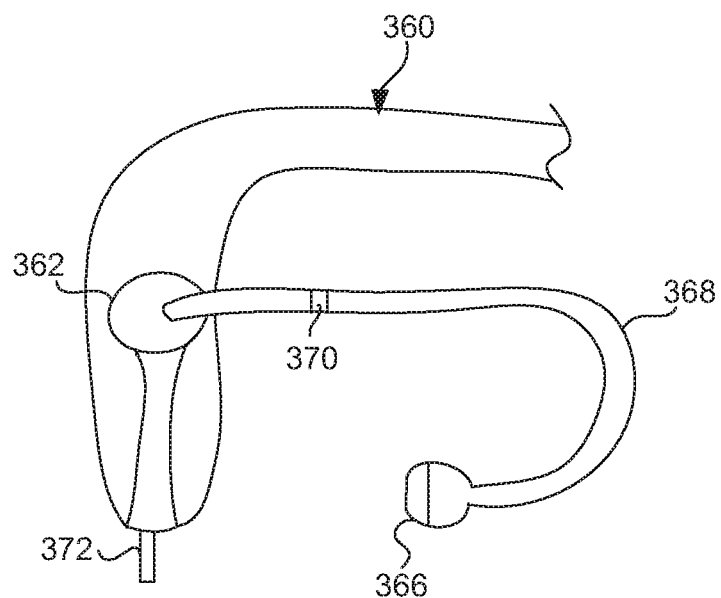
FIGS. 3D and 3E are diagrams of a temple arrangement according to another embodiment of the invention.
Figure 3E:
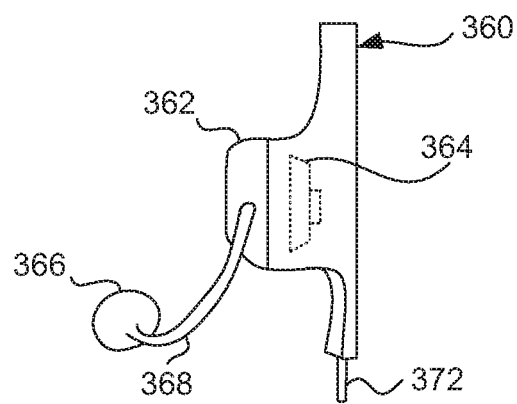

FIGS. 3D and 3E are diagrams of a temple arrangement 360 according to another embodiment of the invention. FIG. 3D is a side view of the temple arrangement 360, and FIG. 3E is a front view of the temple arrangement 360. In this embodiment, the temple arrangement 360 is a temple tip that can be attached to a temple (e.g., temple body) of a pair of eyeglasses. The temple arrangement 360 includes a speaker housing 362 allowing a speaker 364 to be at least partially embedded within the temple arrangement 360. An audio sound output by the speaker 364 is coupled to an ear plug 366 by way of the speaker housing 362 and a tube 368. Typically, the tube 368 is a flexible tube, such as a flexible plastic tube. A user of the eyeglasses having the temple arrangement 360 can place the ear plug 366 within her ear to facilitate coupling of the audio sound from the speaker 364 to the ear. The tube 368 can have a disconnection region 370 whereby at least a section of the tube 368 and the attached ear plug 366 can be removed from the temple arrangement 360, such as when audio output is not being listened to. The tube 368 and/or the speaker housing 362 can also be capable of rotating with respect to the temple arrangement 360 to facilitate ease of use. Still further, the temple arrangement 360 can include a connector 372, such as a male audio connector (e.g., 2.5 mm, stereo mini-phone connector). The connector 372 provides a means to electrically connect an external audio source to the speaker 364 within the temple arrangement 360. For example, at least one wire (not shown) that is internal to the temple arrangement 360 can be used to electrically connect the speaker 364 to the connector 372.

In one embodiment, an electrical component is a component of an electrical circuit or system, and the electrical circuit or system is for performing at least a desired, intended or predetermined function.

In one embodiment, a temple tip, fit-over temple or temple cover according to the invention can further include a connector or cable to facilitate electrical connection with the at least one electrical component that is either attached to a temple or a temple tip or at least partially embedded therein.

Figure 4:
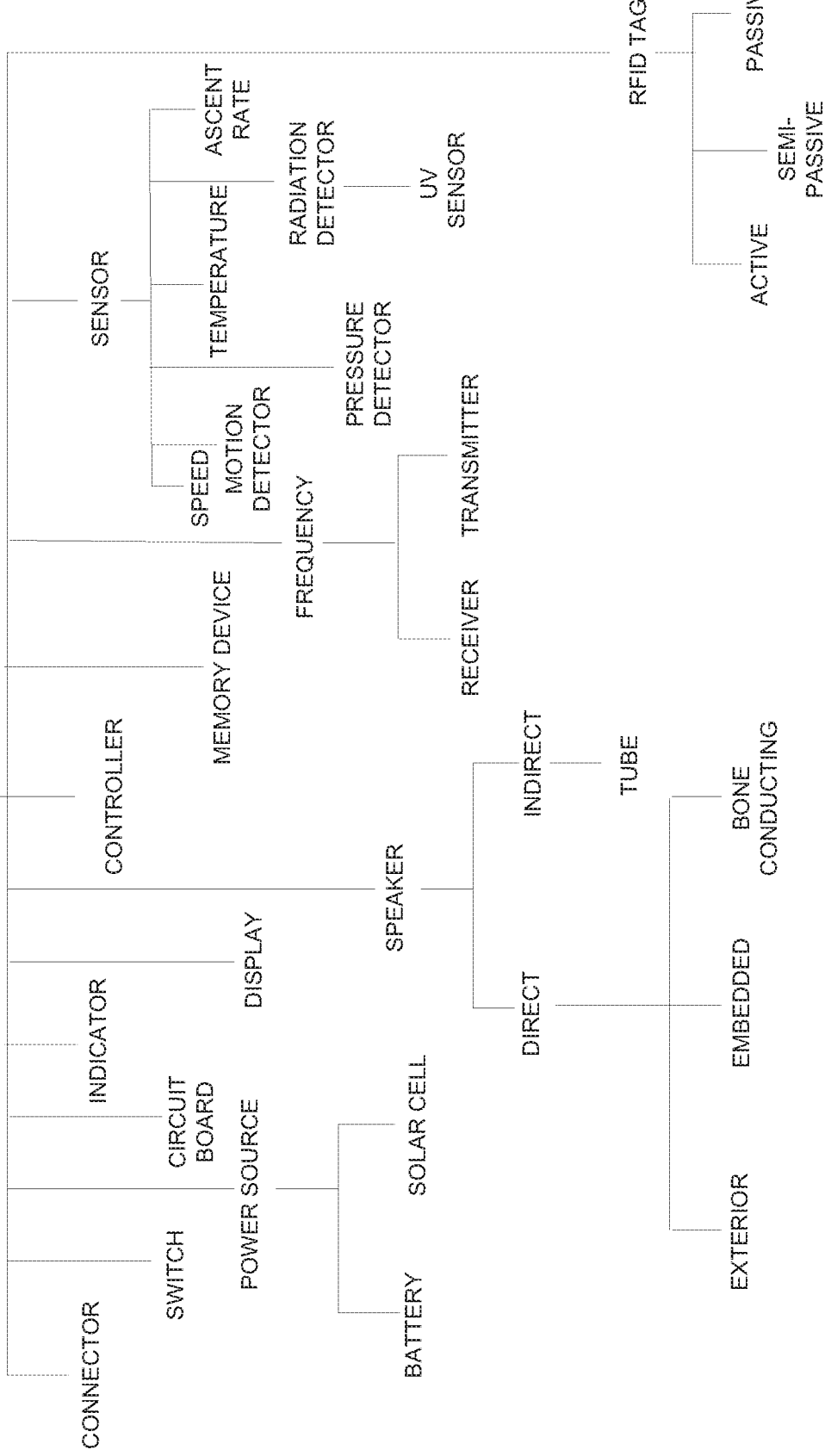
FIG. 4 shows examples of different electrical components according to the invention.

FIG. 4 shows examples of different electrical components according to the present invention. Different embodiments of temple arrangements or temple adapters according to the invention can use one or more of these different electrical components.

In one embodiment, the electrical component is an electrical connector. The connector can be a male connector located at a temple tip. In another embodiment, the connector can be a female connector at a temple tip. For example, as a temple tip grabs onto the main body of its corresponding temple, a female connector at the temple tip can make electrical contact with a male connector at the temple. Examples of different types of connectors have previously been described in the related patent applications, which have been incorporated by reference.

In one embodiment, the embedded electrical component is an electrical switch, such as one or more of those previously described in the related patent applications, which have been incorporated by reference. In still yet another embodiment, the "being worn" sensor can be implemented as a switch. For example, the switch can utilize optical, magnetic or mechanical means. In one embodiment, the switch can be positioned at the temple of the eyewear, such as a forward end of the temple proximate to a corresponding lens holder. Different embodiments of such sensors is also described in U.S. Provisional Patent Application No. 60/583,169, filed Jun. 26, 2004, entitled "ELECTRICAL COMPONENTS FOR USE WITH EYEWEAR, AND METHODS THEREFOR," which has been incorporated herein by reference, see, e.g., section entitled "EYEGLASSES WITH USER INPUT CAPABILITY."

In one embodiment, one electrical component can be a power source. The power source can be a battery, a solar cell or other type of power source.

In one embodiment, one electrical component can include a circuit board. The circuit board can be a rigid or a flexible circuit board.

In one embodiment, one electrical component can be an indicator. The indicator can be audio, visual, or physical (e.g., vibration). For example, the indicator can signal an event or condition to a user of the glasses.

In one embodiment, one electrical component can be a display, such as a LCD display.

In one embodiment, one electrical component can be a speaker. The speaker can provide an audio output for the benefit of the wearer of the glasses. The speaker can directly transmit sound to a user, such as a speaker mounted on an exterior surface of an eyeglass frame, or partially or fully embedded in an eyeglass frame, or a bone conducting type of speaker. Alternatively, the speaker can indirectly transmit sound to a user, such as through the use of a tube to deliver audio output proximate to a user's ear.

In one embodiment, one electrical component can be a controller. The controller can, for example, be a microprocessor.

In one embodiment, one electrical component can be a memory device. The memory device can be non-volatile memory, such as FLASH memory. The data stored in the memory device can be user data or data provided by other electrical components.

In one embodiment, one electrical component is a frequency receiver or a frequency transmitter. They can be in the radio frequency range.

In one embodiment, one electrical component can be a sensor. The sensor can be a temperature sensor. The temperature sensor can be used to sense the temperature of the wearer. In one embodiment, such a temperature sensor is in a temple tip. In measuring the temperature, the user can further press the temple tip towards his head to ensure better connection. One can also put the temple under one's tongue to measure body temperature.

In other different embodiments, one electrical component can be a motion detector, a speed sensor, a rate of ascent (or descent) detector, a pressure detector, or a detector for radiation, such as an ultraviolet (UV) detector.

In one embodiment, one electrical component is a radio frequency identification (RFID) tag. A RFID tag typically includes a memory chip and a radio antenna. The memory chip usually has a small storage capacity and thus does not include a large amount of information. A portion of such information can provide identifying information for the glasses. The memory chip may only have a few kilobytes, sufficient to encode information, such as a serial number, where and when the product (such as eyeglasses) was manufactured, and other relevant information.

The RFID tags can come in a number of configurations. For example, an active tag uses a battery-powered transponder to constantly emit signals which can carry information programmed into the memory chip. Active tags are more applicable to situations where readers are not close to the tags. A semi-passive tag likewise has a battery, but may not be activated until it receives a signal from a reader. They are more applicable to situations that do not need continuous connection and accessing. A passive tag has no battery; its antenna extracts power from a reader's radio wave signal to transmit the identifying information. Passive tags are typically relatively inexpensive, but may have to be within a few feet of a reader to extract power. The electrical component can be a passive RFID tag, or some other type of tag.

In one embodiment, one electrical component can be for locating the corresponding glasses. For example, the electrical component can produce a beeping tone when it receives a specific radio signal. A handheld device (such as a key chain accessory, can generate the specific radio signal (e.g., when a button is pushed). Through the beeping tone, one can locate the glasses.

Figure 5:
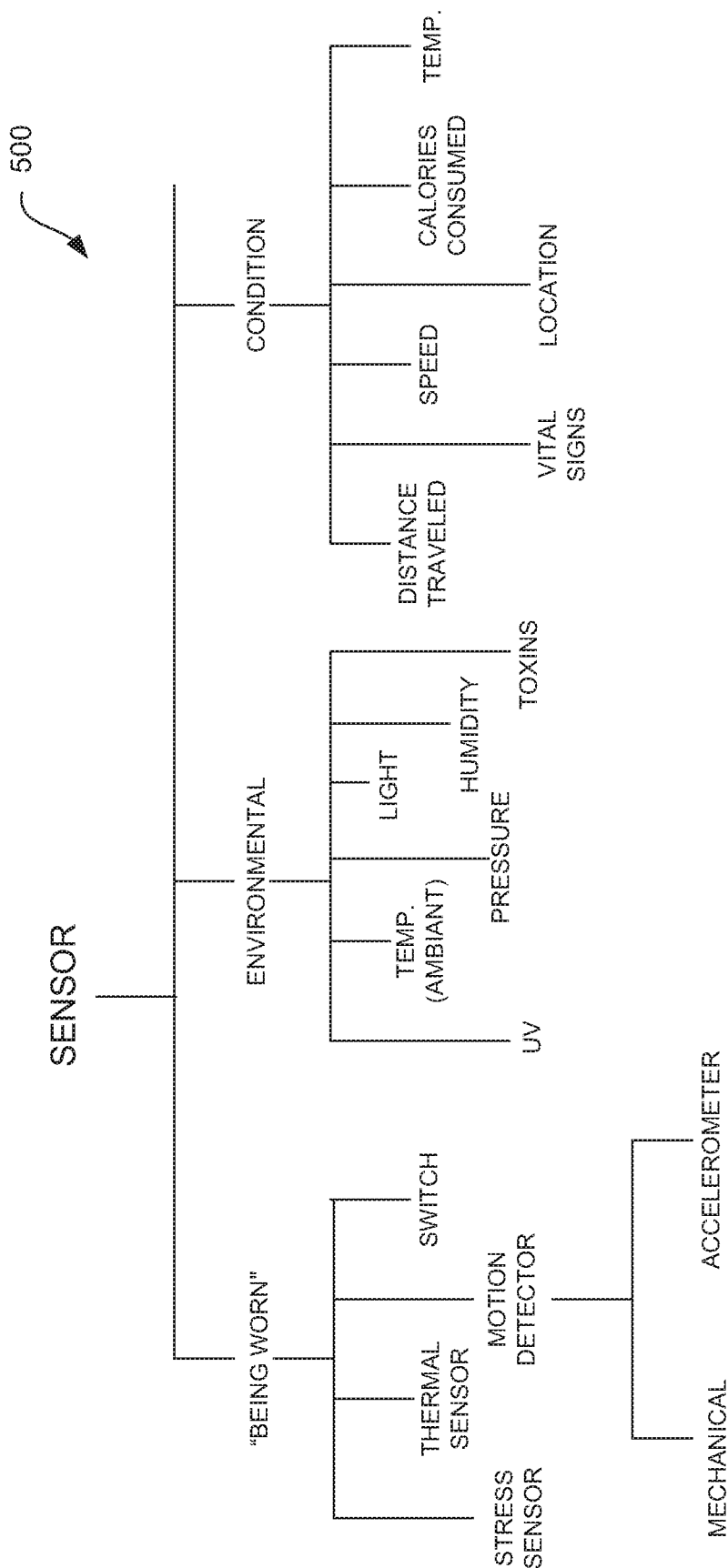
FIG. 5 is a chart that depicts examples of sensors suitable for use according to the invention.

As noted above, in one embodiment, the electrical component can be a sensor. More generally, a pair of glasses can include one or more sensors that can be used individually or in combination. FIG. 5 is a chart 500 that depicts examples of sensors suitable for use in or attached to the glasses.

In one embodiment, the sensor is a "being worn" sensor. The "being worn" sensor indicates whether the glasses are being worn by its user. The "being worn" operation can be performed using, for example, a thermal sensor, a motion detector, a stress sensor or a switch.

In one embodiment, a motion detector is used as a "being worn" sensor. A threshold can be set, such that if the amount of motion exceeds the threshold, the glasses are assumed to be worn. The motion detector can, for example, be achieved by a mechanical mechanism or an accelerometer.

In another embodiment, the "being worn" sensor includes two thermal sensors. One sensor can be at approximately the middle of a temple, such as in a region that touches the head of the user wearing the glasses. The other sensor can be at one end of the temple, the end that is close to its hinge. If the temperature differential between the two sensors is beyond a certain preset value, the glasses would be assumed to be worn. The differential is presumed to be caused by a person wearing the pair of glasses.

In yet another embodiment, the "being worn" sensor includes a stress sensor at the hinge of the temple. The assumption is that when the eyewear is worn, the hinge is typically slightly stretched because typically, the width of the head of the user is slightly wider than the width between the temples when the two temples are in the extended positions. If the value of the stress sensor is beyond a certain preset value, the glasses would be assumed to be worn.

In a further embodiment, the "being worn" sensor can be a switch. For example, at the hinge between a temple and its corresponding lens holder, there is a switch. When that temple is in its extended position, i.e., fully extended outwards, the switch is turned on. The switch can be a pin-type switch. When the temple is fully extended outwards, the pin is pressed. When both temples are fully extended outwards, in one embodiment, the glasses would be assumed to be worn by the user.

The switch in the glasses can have different attributes. It can be activated by different type of forces, including mechanical, radiation, magnetic, electrical, and temperature. The switch can also be activated remotely by a remote device. The switch can be based on one or more detectors. The switch can have different degrees or ranges of control, such as binary, multiple discrete steps or incremental control. The switch can be placed at different position on the glasses, such as on the side or top surface of a temple or at a joint. The control can take perception into consideration, such as based on texture, height and lateral position of multiple switches.

In one embodiment, another type of sensor is an environmental sensor. The environmental sensor can sense environmental conditions, such as one or more of radiation (e.g., ultraviolet radiation or light), temperature (e.g., ambient temperature), pressure, humidity and toxins (e.g., chemicals, etc.).

In another embodiment, another type of sensor is a condition sensor. The condition sensor can sense the conditions of the user of the glasses. Examples of condition sensors include sensing one or more of distance traveled, location, speed, calories consumed, temperature and vital signs associated with the user of the glasses. The distance traveled could represent the horizontal distance traveled or the vertical distance (i.e., elevation) traveled. The speed can be the rate of movement along the horizontal distance traveled and/or the vertical distance. In yet another embodiment, the condition sensor can indirectly sense emotional conditions of the user of the glasses.

The sensors can be provided in a redundant or fault-tolerant manner. For example, sensors can come in pairs in the glasses. When one malfunctions, the other one will take over its operation. In another embodiment, the sensor information can be processed in a differential manner to examine changes to the sensor information. The differential can be based on time. The sensors can by powered by a battery, solar energy, or kinetic energy. For reduced power consumption, the sensors can remain in a low-power state unless data is being acquired by the sensors. In yet another embodiment, two or more of the sensors can communicate with one another (wired or wirelessly) to exchange data or control information.

Figure 6:
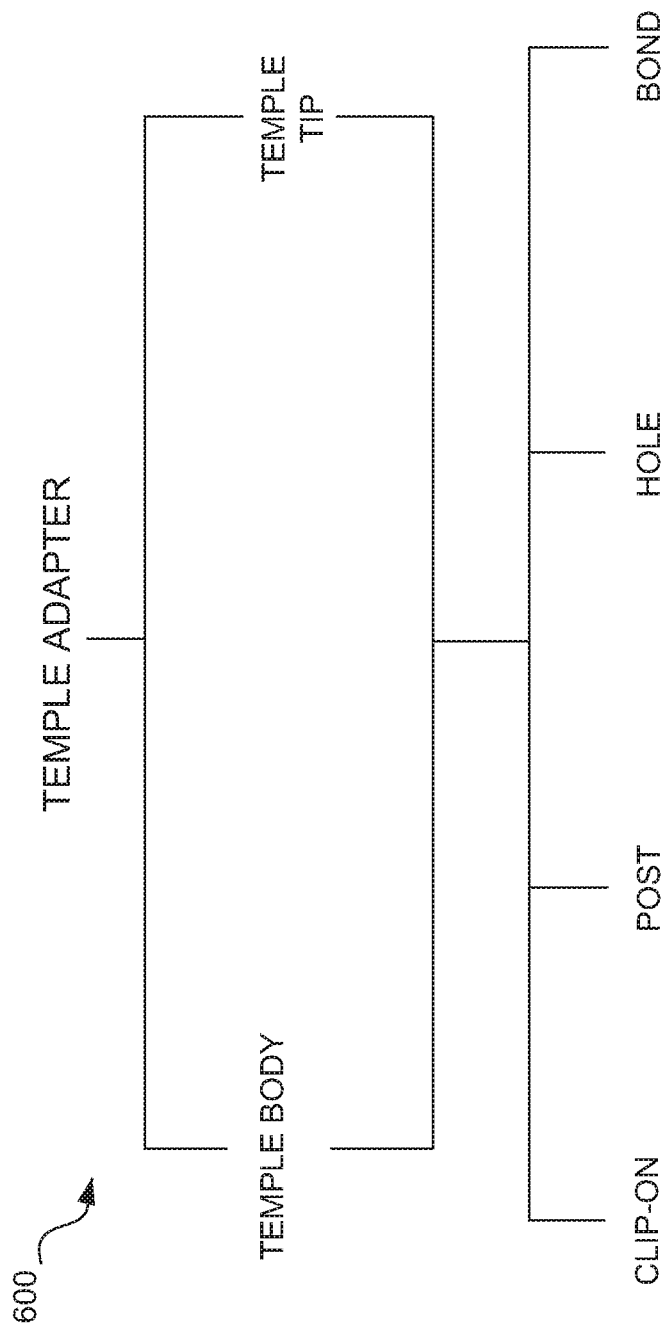
FIG. 6 illustrates a diagram of a number of different embodiments of temple adapters according to the invention.

FIG. 6 illustrates a diagram of a number of different embodiments of temple adapters 600 according to the invention. The temple adapters 600 serve to adapt a temple (i.e., a temple body or temple tip) of a pair of eyeglasses to provide for at least one electrical component. In one embodiment, a temple adapter can clip onto a temple body or a temple tip. In another embodiment, a temple adapter can mount to a post provided on a temple body or a temple tip. In still another embodiment, a temple adapter can mount to a hole provided in a temple body or a temple tip. In yet another embodiment, a temple adapter can be bonded (or adhered) to a temple body or a temple tip.

The temple adapter is particularly well suited to adapt a pair of eyeglasses with communication components, such as a speaker and/or a microphone. As an example, a standard pair of eyeglasses can be transformed into an operational headset by attaching a temple adapter to a temple body or temple tip of the pair of eyeglasses, wherein the temple adapter includes at least one speaker and at least one microphone.

The temple adapter can be rigid or malleable. The benefit of being malleable is that the particular geometric arrangement/assembly of the temple adapter can be altered by its user for better user comfort or operation.

In one embodiment, the temple adapter is a structure that has at least one electrical component attached thereto or at least partially embedded therein. In another embodiment, all of the electrical components to be provided with the temple adapter are at least partially embedded in the temple adapter.

Figure 7A:
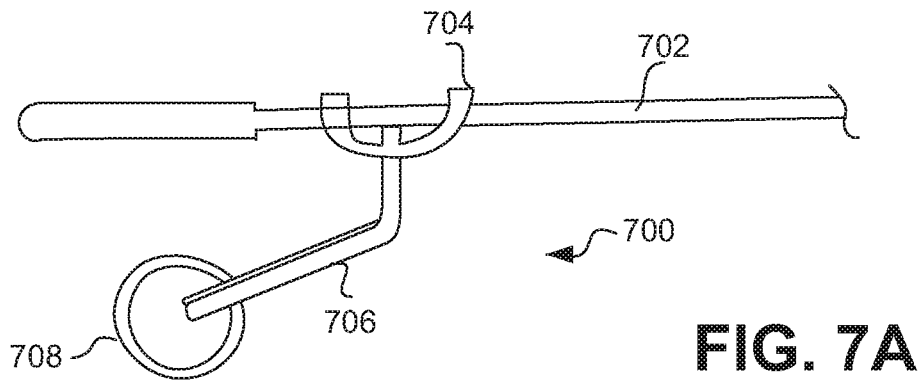
FIG. 7A is a diagram of a temple adapter according to one embodiment of the invention.

FIG. 7A is a diagram of a temple adapter 700 according to one embodiment of the invention. The temple adapter 700 attaches to a temple 702 (including any temple tip using a clip 704. The clip 704 can use force, such as an interference fit force or spring-induced force, to attach the temple adapter 700 to the temple 702. Besides the clip 704, the temple adapter 700 includes an angled arm 706 and an ear bud 708. The angled arm 706 can be malleable. When a pair of eyeglasses associated with the temple 702 is being worn by a user, the ear bud 708 can be placed in or near the user's ear canal. The ear bud 708 contains a speaker and receives electrical signals via a wire, such wire can be provided internal or external to the temple adapter 700 and can originate at the temple 702 or external to the temple 702.

Figure 7B:
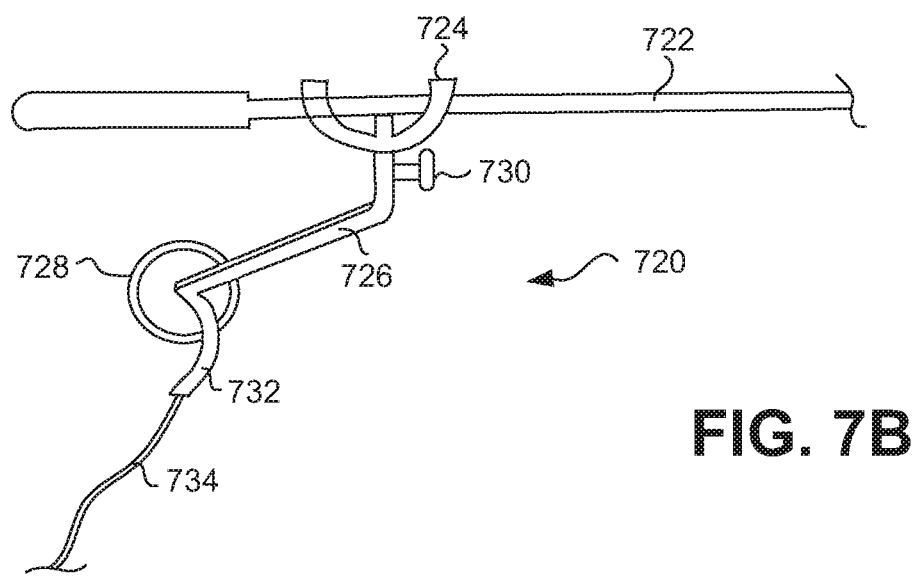
FIG. 7B is a diagram of a temple adapter according to another embodiment of the invention.

FIG. 7B is a diagram of a temple adapter 720 according to another embodiment of the invention. The temple adapter 720 attaches to a temple 722 (including any temple tip) using a clip 724. The clip 724 can use force, such as an interference fit force or spring-induced force, to hold the temple adapter 720 to the temple 722. Besides the clip 724, the temple adapter 720 includes an angled arm 726, an ear bud 728, a microphone 730, an extension arm 732 and a cord 734. In this embodiment, the cord 734 includes a wire that connects to the speaker within the ear bud 728 and another wire that connects to the microphone 730. There can be one or more conductors inside a given wire. For example, a wire might have one conductor serving as a signal line and another conductor serving as ground. Such wires can be provided internal to the extension arm 732 and the angled arm 726. The arm 732 can serve to guide the cord 734 away from the user's ear or rearward. The angled arm 726 can be malleable. The placement or position of the microphone 730 can vary with implementation. As shown in FIG. 7B, the microphone 730 is directed forward to a user's front when a pair of eyeglasses associated with the temple 722 are being worn. Alternatively, the microphone 730 could be directed outward away from the user's head when the pair of eyeglasses are being worn. When a pair of eyeglasses associated with the temple 722 is being worn by a user, the ear bud 728 can be placed in or near the user's ear canal. The ear bud 728 contains a speaker and receives electrical signals via a wire of the cord 734. The cord 734 can have another end (not shown) with a connector for coupling with an audio output device (e.g., radio, MP3 player) or a communication device (e.g., mobile phone).

Figure 8A:
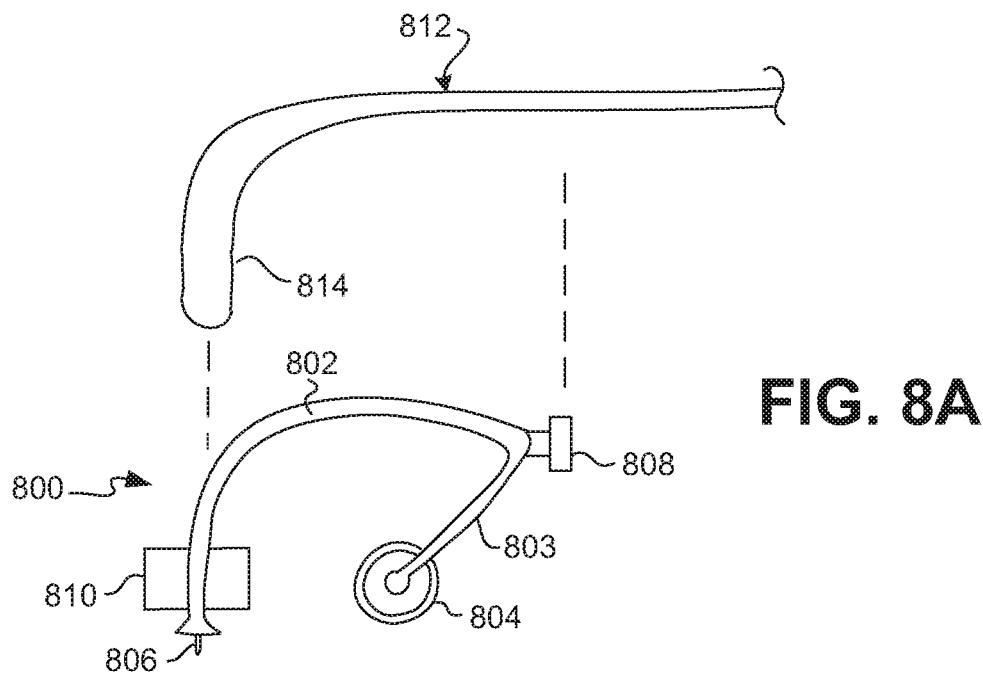
FIGS. 8A and 8B are diagrams of a temple adapter according to another embodiment of the invention.
Figure 8B:
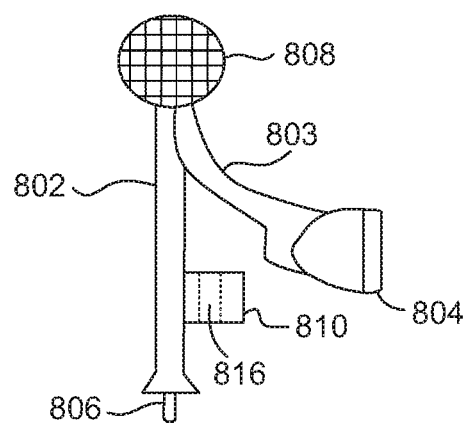

FIGS. 8A and 8B are diagrams of a temple adapter 800 according to another embodiment of the invention. FIG. 8A is a side view of the temple adapter 800, and FIG. 8B is a front view of the temple adapter 800. The temple adapter 800 has a support body 802 which has a support arm 803. An ear bud 804 is attached to an end of the support arm 803. A connector 806, such as a male audio connector, is attached to one end of the support body 802. A microphone 808 can be optionally provided and attached to the support body 802 or the support arm 803. Additionally, an elastic member 810 can be provided to facilitate attachment of the support body 802 to a temple 812 of a pair of eyeglasses. The temple 812 can have a tip region 814, which can be referred to as a temple tip. When the temple adapter 800 is attached to the tip region 814 of the temple 812, the tip region 814 is placed in or through an opening 816 in the elastic member 810, as shown, for example, in FIG. 8B. The temple adapter 800 is thereby held in place relative to the tip region 814. Additionally, although not shown, the support body 802 would carry a first internal wire from the connector 806 to the microphone 808, and the support body 802 and the support arm 803 would carry a second internal wire from the connector 806 to the ear bud 804.

Figure 9A:
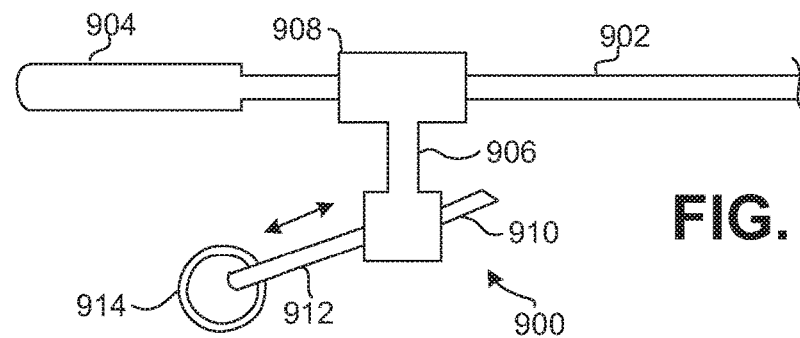
FIG. 9A is a diagram of a temple adapter according to one embodiment of the invention.

FIG. 9A is a diagram of a temple adapter 900 according to another embodiment of the invention. In FIG. 9A, a side-view of the temple adapter 900 is depicted. The temple adapter 900 attaches to a temple 902 of a pair of eyeglasses. The temple 902 can have a tip region 904, which can be referred to as a temple tip. The temple adapter 900 has a support member 906. A first end 908 of the support member 906 couples to the temple 902 of a pair of eyeglasses. In one embodiment, the first end 908 serves to attach the temple adapter 900 to the temple 902. For example, the first end 908 can provide a clip, clamp, post, or hole to provide or assist with the attachment. As another example, the first end 908 can alternatively or additionally use an adhesive, bonding or fastener (e.g., hook and loop system, e.g., Velcro) to provide or assist with the attachment. A second end 910 of the support member 906 provides an opening through which an arm 912 extends. One end of the arm 912 has an ear bud 914 attached thereto. The arm 912 can be angled and/or malleable. When a pair of eyeglasses associated with the temple 902 is being worn by a user, the ear bud 914 can be placed in or near the user's ear canal. The ear bud 914 contains a speaker and receives electrical signals via a wire, such wire can be provided internal or external to the temple adapter 900 and can originate at the temple 902 or external to the temple 902.

Figure 9B:
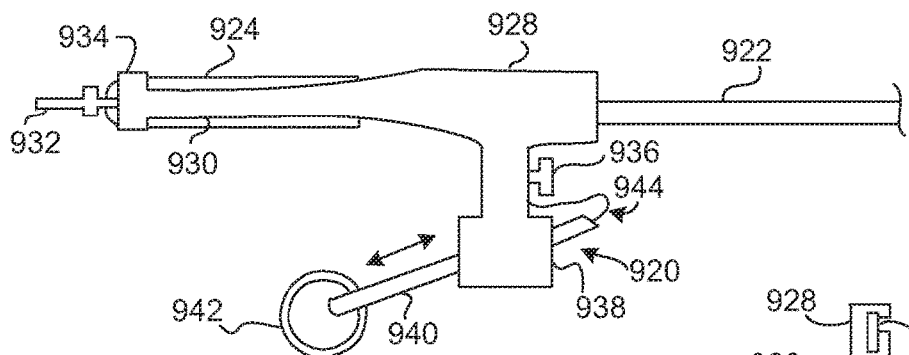
FIGS. 9B and 9C are diagrams of a temple adapter according to another embodiment of the invention.
Figure 9C:
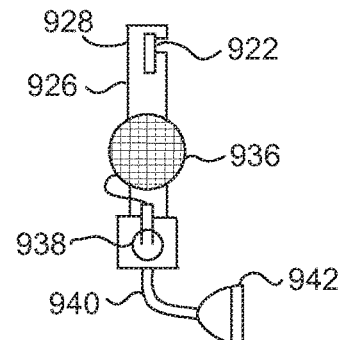

FIGS. 9B and 9C are diagrams of a temple adapter 920 according to still another embodiment of the invention. FIG. 9B is a side view of the temple adapter 920, and FIG. 9C is a front view of the temple adapter 920. The temple adapter 920 attaches to a temple 922 of a pair of eyeglasses. The temple 922 can have a tip region 924, which can be referred to as a temple tip. The temple adapter 920 has a support member 926. A first end 928 of the support member 926 couples to the temple 922 of a pair of eyeglasses. In one embodiment, the first end 928 serves to attach the temple adapter 920 to the temple 922. For example, the first end 928 can provide a clip, clamp, post, or hole to provide or assist with the attachment. As another example, the first end 928 can alternatively or additionally use an adhesive, bonding or fastener (e.g., hook and loop system, e.g., Velcro) to provide or assist with the attachment. The first end 928 also has a bracket 930 having a connector 932 at one end, and an elastic member 934 for coupling about the tip region 924. The connector 932, such as a male audio connector, is attached to one end of the bracket 930. A microphone 936 can be optionally provided and, for example, attached to the support body 926.

A second end 938 of the support member 926 provides an opening through which an arm 940 extends. One end of the arm 940 has an ear bud 942 attached thereto. The arm 940 can be angled and/or malleable. The arm 940 is also repositionable within the opening at the second end 938 so as to permit user adjustment. When a pair of eyeglasses associated with the temple 922 is being worn by a user, the ear bud 942 can be placed in or near the user's ear canal. The ear bud 942 contains a speaker and receives electrical signals via a wire, such wire can be provided internal or external to the temple adapter 920 and can originate at the temple 902 or external to the temple 902. In this embodiment, a wire 944 is shown as passing through the arm 940 to provide signals to the speaker within the ear bud 942. More particularly, in one embodiment, although not shown in FIGS. 9B and 9C, a first wire would connect the speaker within the ear bud 942 to the connector 932 (e.g., wire 944), and a second wire would connect the microphone 936 to the connector 932. Such wires can be internal or external, or partially internal and partially external, to the temple adapter 920.

Figure 9D:
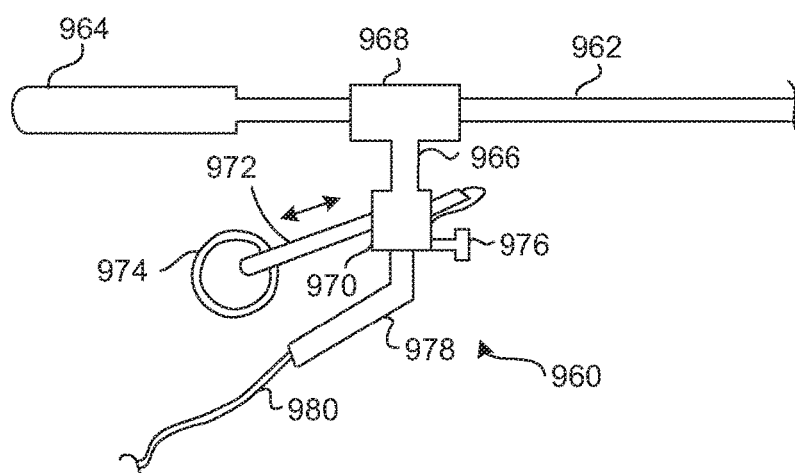
FIG. 9D is a diagram of a temple adapter according to still another embodiment of the invention.

FIG. 9D is a diagram of a temple adapter 960 according to still another embodiment of the invention. In FIG. 9D, a side-view of the temple adapter 960 is depicted. The temple adapter 960 attaches to a temple 962 of a pair of eyeglasses. The temple 962 can have a tip region 964, which can be referred to as a temple tip. The temple adapter 900 has a support member 966. A first end 968 of the support member 966 couples to the temple 962 of a pair of eyeglasses. In one embodiment, the first end 968 serves to attach the temple adapter 960 to the temple 962. For example, the first end 968 can provide a clip, clamp, post, or hole to provide or assist with the attachment. As another example, the first end 968 can alternatively or additionally use an adhesive, bonding or fastener (e.g., hook and loop system, e.g., Velcro) to provide or assist with the attachment. A second end 970 of the support member 906 provides an opening through which an arm 972 extends. One end of the arm 972 has an ear bud 974 attached thereto. The arm 972 can be angled and/or malleable. When a pair of eyeglasses associated with the temple 962 is being worn by a user, the ear bud 974 can be placed in or near the user's ear canal. The ear bud 974 contains a speaker and receives electrical signals via a wire, such wire can be provided internal or external to the temple adapter 960 and can originate at the temple 962 or external to the temple 962. Further, the temple adapter 960 can include a microphone 976. In this embodiment, the microphone 976 is attached to the support member 966. In addition, an arm 978 is used to support an end of a cable 980 that is coupled to the arm 978. The cable 980 can include at least one wire for the microphone 976 and one wire for the speaker within the ear bud 974.

To the extent that any of the embodiments of the temple adapters discussed above use a microphone, a tube can be optionally attached to the microphone to facilitate voice pick-up of the user. One end of the tube can be placed over the microphone, and the other end of the tube is then positioned closer to the user's mouth than is the microphone. With a temple adapter on both temples, each providing a microphone and speaker to a pair of eyeglasses, only one temple adapter would typically make use of such a tube. Alternatively, the tube and the microphone could be replaced by a boom microphone.

Figure 10A:
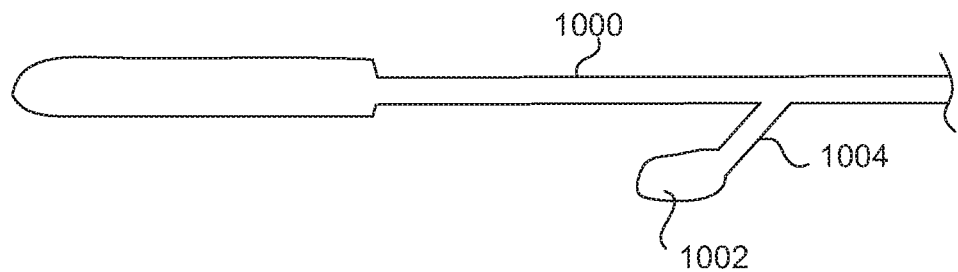
FIGS. 10A-10C are diagrams of a temple having a bone conducting element according to still other embodiments of the invention.
Figure 10B:
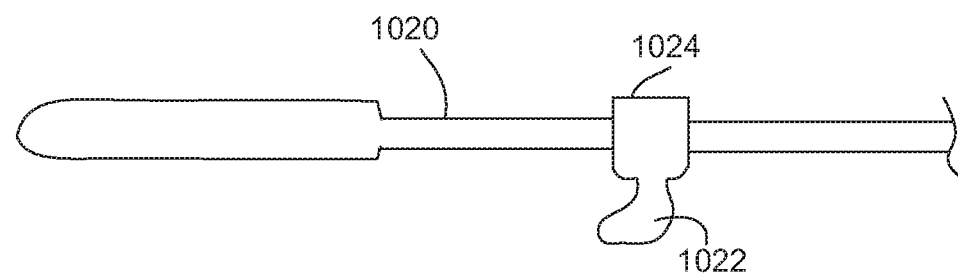
Figure 10C:
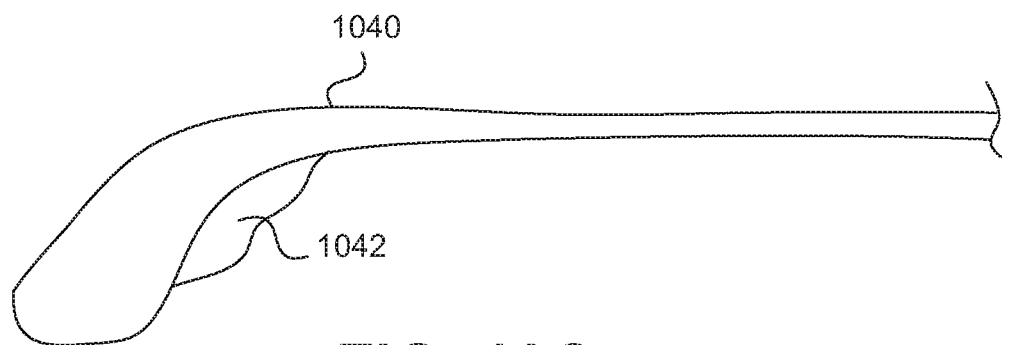

FIG. 10A-10C are diagrams of a temple having a bone conducting element according to still other embodiments of the invention. The bone conducting elements can replace a traditional speaker to provide audio output to a user. Although not shown, electrical signals would be internally or externally supplied to the bone conducting element.

FIG. 10A illustrates a temple 1000 for a pair of eyeglasses. The temple 1000 includes a bone conducting element 1002 that can provide audio sound to a user by coupling vibrations to at least one bone of the user's face. The bone conducting element 1002 is held relative to the temple 1000 by an arm 1004. Hence, in this embodiment, the temple 1000, the arm 1004 and the bone conducting element 1002 can all be integrally formed.

FIG. 10B illustrates a temple 1020 for a pair of eyeglasses. The temple 1020 includes a bone conducting element 1022 that can provide audio sound to a user by coupling vibrations to at least one bone of the user's face. The bone conducting element 1022 is held relative to the temple 1020 by a support 1024 that removably attaches to the temple 1020.

FIG. 10C illustrates a temple 1040 for a pair of eyeglasses. The temple 1040 includes a bone conducting element 1042 that can provide audio sound to a user by coupling vibrations to at least one bone of the user's head. In this embodiment, the bone conducting element 1042 is positioned in the vicinity of the user's ear, such as behind the user's ear. The placement of the bone conducting element 1042 in this embodiment can reduce impact to the design of the eyeglasses.

In one embodiment, the electrical components associated with a temple arrangement or a temple adapter is for enhancing the hearing of the person wearing the corresponding pair of glasses. There can be at least a microphone and a speaker in a temple arrangement or a temple adapter. The microphone can be close to an ear of the user when the glasses are worn by the user, and can be a directional microphone. The microphones can be a microphone in a temple adapter, such as the microphone 730 in FIG. 7B, 808 in FIG. 8A, 936 in FIG. 9B, or 976 in FIG. 9D. The microphones can be in a temple arrangement. The microphone in a temple arrangement can be attached to a temple tip, a temple fit-over or a temple cover. The microphones can be positioned to be in front of the user's ears so that the microphones will not be affected by the shadowing effect of the ears. The speaker can be inserted into the ear, as in some of the speakers previously described.

In another embodiment, there are two sets of microphones and speakers, such as in two temple arrangements or temple adapters. In the vicinity of each ear, there is a temple arrangement or temple adapter with its corresponding microphone and speaker. The microphones again can be directional, one pointing generally outwards in a position close to the left ear, and one pointing generally outwards in a position close to the right ear. Alternatively, the microphones can point forward.

The microphone and the speaker close to an ear do not have to be in very close proximity to each other, as in many hearing aids existing nowadays. They can be spaced apart by, such as, one to several inches, with the microphone being directional and pointing to the front and to either the left or the right of the user, and with the speaker pointing toward or inserted into the corresponding ear of the user. Such a distance apart can significantly reduce feedback effect of existing hearing aids. Another advantage of such a hearing enhancement device is that users may not need to be fitted into ears with ear molds. In any case, additional details on hearing enhancement are further described in the related applications that have been incorporated herein by reference, such as U.S. Provisional Patent Application No. 60/620,238, filed Oct. 18, 2004, and entitled "EYEGLASSES WITH HEARING ENHANCED AND OTHER AUDIO SIGNAL-GENERATING CAPABILITIES."

The various embodiments of the invention noted above, whether temple arrangement or temple adapter, can have a cable or cord attached or attachable thereto. The cable or cord has one or more conductors. The cable or cord can serve to provide electrical signals to or receive electrical signals from the temple arrangement or the temple adapter. In one embodiment, one end of a cable or cord attaches to a temple arrangement or temple adapter (either permanently or via a connector) and the other end of the cable or cord attaches (either permanently or via a connector) to an electronic device. As an example, the electronic device can be an audio output device (e.g., audio player) or a communication device (e.g., mobile telephone). In a first example, the cable or cord could provide a male audio (stereo) connector at one end, and a pair of female audio connectors at the opposite end, each being for use with a different temple. In a second example, the cable or cord could provide a set of connectors, such as a male mini-phone connector (2.5 mm) and a male audio (stereo) connector, at one end, and one or a pair of female phone connectors at the opposite end.

In one embodiment, the cable or cord can also have a switch coupled thereto so as to permit a user to switch modes. For example, if the temple arrangement or temple adapter provides a speaker and microphone to a pair of eyeglasses, a switch on a cable or cord that connects the temple arrangement or temple adapter to an electronic device could provide different switch positions for different electronic devices or different functional modes of operation of a single electronic device. As an example, if the electronic device is (or operates as) an audio player, a first switch position could be used. Alternatively, if the electronic device is (or operates as) a mobile telephone, a second switch position could be used. Additional discussion of suitable cables and cords is provided in the related applications that have been incorporated herein by reference.

Electrical components can form an electronic module. The electronic module can provide radiation monitoring, wireless communication, enhanced hearing, etc. A radiation monitoring system can be partially or fully contained in a temple arrangement or temple adapter associated with a temple of a pair of glasses. Typically, the temple arrangement or temple adapter can be removable from the temple.

In another embodiment, an electronic component in a temple arrangement or temple adapter interacts with another electronic component in another part (e.g., frame) of the glasses or in a device tethered to the glasses. For example, a temple of a pair of glasses holds one portion of an electronic circuit. That portion can include generic parts, such as a battery, that are applicable to different applications. Another portion of the electronic circuit is in a temple arrangement or temple adapter. This portion can be application specific, such as an electronic clock without a battery, or a temperature sensor.

In yet another embodiment, the electrical components can provide audio player capabilities. In such an embodiment, the electrical components can include audio file storage, an audio player and a battery. The electrical components may or may not include wireless communication circuitry.

Further, in an alternative embodiment, the output of an operation indicator can be audio. The audio output can be from one or more speakers associated with the frame of the eyeglasses. Such audio output can signal the user using natural language, voice synthesis, pre-recorded messages, etc.

In another embodiment, the electrical components can include a memory module. The memory module provides non-volatile data storage. For example, the memory module can be a portable (or removable) memory device (e.g., memory card). The memory module can, for example, store sensor information (which can be over an extended period of time). Such memory module can be remotely interrogated using wireless communication circuitry, or can be accessed through a wired connection with a tethered device.

In one embodiment, the electrical connection(s) can alternatively be used to allow information stored in the electrical components to be accessed or queried by a device. For example, when the electrical components include a memory module, the memory module can be accessed to read data (e.g., status information) stored therein.

As previously noted, the electrical components associated with a temple arrangement and/or a temple adapter can pertain to radiation monitoring circuitry. In such case, the electrical components within the temple arrangement or temple adapter alone or together with eyeglass electrical components can implement a radiation monitoring system. The radiation being monitored can, for example, pertain to one or more of UV, infrared and gamma radiation. In one embodiment, sunlight is considered as a type of radiation. In any case, additional details on radiation monitoring are further described in the related applications that have been incorporated herein by reference.

Also, the electrical components can pertain to health or fitness monitoring circuitry. In such case, the electrical components within the temple arrangement or the temple adapter alone or together with eyeglass electrical components can implement a health or fitness monitoring system. Additional details on health or fitness monitoring are further described in the related applications that have been incorporated herein by reference.

In yet another embodiment, an electronic component in a temple arrangement or a temple adapter of a frame of eyeglasses interacts with an electronic component of an apparatus tethered to the eyeglasses to perform an operation. For example, a temple arrangement or a temple adapter of a pair of eyeglasses holds one portion of an electronic system, and a tethered apparatus that tethers to the pair of eyeglasses includes another portion of the electronic system.

Power (e.g., external power source) can be coupled to the glasses through a connector. In one embodiment, a power source is embedded inside or inserted into the glasses. Different types of power sources are applicable. For example, the power source can be a battery, a fuel cell, a solar cell, or a rechargeable battery. The rechargeable battery can be charged through a connector at the glasses.

Depending on the embodiment, electrical components of a camera can be in a pair of glasses, and/or a base tethered to the glasses, and/or a portable device tethered to the glasses or to the base. For example, memory can be in the base tethered to the glasses. The location of a lens can vary depending on the embodiment. In one embodiment, one location is at the bridge of the glasses, with the lens of the camera facing forward. In this situation, what the user sees is substantially what the captured image would be. In other words, in a general sense, what the user sees is what the user gets. With such an embodiment, it is relatively easy for a user to take pictures, hands-free. In another embodiment, another location for the lens are at a side portion adjacent to a lens holder, before the joint of the corresponding temple. Again, the lens of the camera faces forward. Some of the electrical components of the camera can be in that location, and other components in the temple. These components can be electrically connected through one of the joints, such as with a flexible pc board. In yet another embodiment, the lens can face sideways and outwards in a temple of a pair of glasses, towards the left or right side of the user.

Still further, the invention can provide a new approach to marketing accessories, namely, electrical accessories, for eyewear. According to one method for providing temple arrangements and/or temple adapters for use with a pair of glasses, the method can initially provide a plurality of temple arrangements and/or temple adapters for a customer. This enables the customer to browse and select at least one temple arrangement or temple adapter. Each of the temple arrangements or temple adapters can have one or more electrical components at least partially embedded therein, with different temple arrangements or temple adapters providing different electrical capabilities. Once a temple arrangement or temple adapters has been selected, the selected temple arrangement or temple adapters can be coupled to one of the corresponding temples of the eyewear (e.g., a pair of glasses). In the case where the selected temple arrangement is a temple tip, the selected temple tip is inserted onto (e.g., slid over) an end of the corresponding temple (after removing any previously installed temple tip if there was one). In the case where the selected temple adapter is to be coupled, the selected temple adapter can be attached to the corresponding temple. Thereafter, the customer can make use of the eyewear with its associated electrical capabilities provided by the temple arrangement or temple adapters.

In one embodiment, once a temple arrangement and/or a temple adapter is provided to a customer, the customer can test the electrical capabilities of the pair of glasses. If the customer does not like the current selected temple arrangement or temple adapter, the customer can repeat the process by selecting and testing another temple arrangement or temple adapter. Before providing the eyewear with the temple arrangement or temple adapter, the customer can be required to pay a purchase (or rental) price for at least the temple arrangement or the temple adapter. Thereafter, the customer can be permitted to return and replace the temple arrangement or temple adapter with another temple arrangement or temple adapter. Such returns or replacements can be available only for a limited period of time following their purchase.

Regarding printed-circuit boards, there can be one or more circuit boards in the glasses. For example, there can be a circuit board in one of the temples of the glasses. Or, the circuits can be divided into two circuit boards, one in each temple of the glasses. The circuit boards can carry additional electrical components to be described below. In one embodiment, the circuit boards are rigid. In another embodiment, the circuit boards are made of flexible materials, such as a polyimide sheet, like Kapton®. In one embodiment, the circuit board is configured or adapts to the shape of the temple in which it resides.

A number of embodiments have been described regarding electrical components in the temples of glasses. The locations selected are for illustration purposes. In other embodiments, some of the components are embedded fully or partially in other areas of the glasses, such as the lens holders or the bridges of the glasses. For example, there are glasses where there are shields at the edges of the lens holders of the glasses. These shields can wrap around, or better conform to the profile of, the face of the wearer. There can be transparent or translucent windows on these shields also. The shields are not limited to be in primary frames. They can be in, for example, fit-over glasses, auxiliary frames or safety glasses. To illustrate, in fit-over glasses, such shields can go over or cover at least a portion of the primary frames. One or more electrical components can be in such shields.

The eyewear can contain lenses, either vision corrective lenses or non-corrective lenses. Examples of eyewear using corrective lenses include, for example, prescription glasses, bi-focal glasses, reading glasses, driving glasses, and progressive glasses. Examples of eyewear, using corrective or non-corrective lenses, are sunglasses, fit-over glasses, safety glasses, sports glasses, swim masks or goggles and ski goggles. The eyewear can also include wrap-around glasses (with wrap-around lenses), fit-over glasses, or auxiliary frames (which attach to existing frames). Still further, the eyewear can include a strap for glasses, such as a strap to hold glasses on one's head. The strap can include some or all of the components for monitoring radiation, such components can be attached or at least partially embedded in the strap.

The invention can also relate to tethered electrical components for eyeglasses. According to a number of embodiments of the invention, an apparatus having one or more external electrical components can be tethered, through a tethering mechanism, to one or more electrical components within or attached to a pair of eyeglasses. The one or more external electrical components being tethered by the tethering mechanism, such as a cable or a cord, may be referred to herein as the 'tethered electrical components.' While the one or more electrical components in or attached to the glasses can be referred to herein as 'eyeglass electrical components.'

Tethered electrical components, alone or in combination with eyeglass electrical components can be used for a variety of different applications and uses. Examples of applications and uses include a wireless communication system, a radiation monitoring system, a health monitoring system or a fitness monitoring system. In one embodiment, the tethered electrical components can support wireless communication capabilities allowing a user to communicate with a communication device in a wireless and hands-free manner. In another embodiment, the tethered electrical components can support radiation monitoring such as for monitoring ultraviolet or solar radiation for a wearer of eyeglasses. In still other embodiments, the tethered electrical components can support health or fitness monitoring for a wearer of eyeglasses.

The tethered electrical components can support signal capturing, signal processing, signal transmission, data acquisition, data processing, and/or data storage. For example, the tethered electrical components can, for example, include a power source and/or an electronic controller. The tethered electrical components may also include and/or control one or more operation indicators to signal operational status of the tethered electrical components. In addition, the tethered electrical components may also include and/or control one or more sensors to monitor and/or signal conditions of users.

Figure 11:
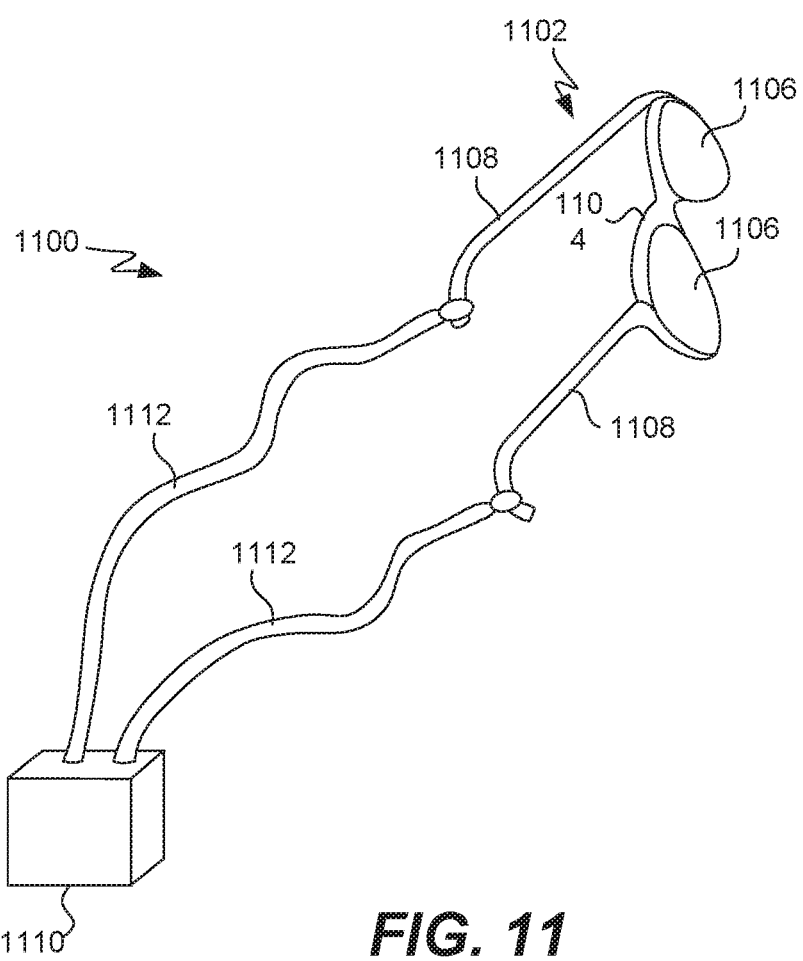
FIG. 11 is perspective diagram of an apparatus having tethered electrical components according to one embodiment of the invention.

FIG. 11 is a perspective diagram of an apparatus 1100 having tethered electrical components according to one embodiment of the invention. The apparatus 1100 is capable of affixing to a pair of eyeglasses 1102. The eyeglasses 1102 have a frame 1104 that supports a pair of lenses 1106. The frame 1104 typically also includes a pair of arms 1108. The arms 1108 are also known as temples. When the eyeglasses 1102 are being worn by a user, the arms 1108 are placed about the user's head and supported by the user's ears so as to stably hold the eyeglasses 1102 on the user's head.

In one embodiment, the apparatus 1100 include a base 1110 and at least one pair of cords 1112. Typically, there is a pair of cords 1112. The base 1110 contains electrical components. The cords 1112 can couple to the base 1110 and can also couple to the arms 1108 of the eyeglasses 1102. With the cords 1112 coupled to the arms 1108 of the glasses 1102, the cords 1112 can also permit the eyeglasses 1102 to dangle about the user's neck. At least one of the cords 1112 contains an electrical conductor to carry electrical signals from the base 1110 and through the at least one of the cords 1112. As shown in FIG. 11, the cords 1112 can connect to the arms 1108 of the eyeglasses 1102; hence, the electrical conductor can carry electrical signals between the base 1110 and at least one of the arms 1108 of the glasses 1102. The electrical conductor could be a shielded conductive wire provided internal to at least one of the cords 1112.

When referring to the cords 1112, it should be understood that the cords can be (i) two separate cords that each extends from the base 1110 to one of the arms 1108 of the eyeglasses 1102 (see FIG. 11), or (ii) a single cord that extends from the base 1110 and then separates into two ends that couple to the arms 1108 of the eyeglasses 1102. The cords 1112 can be made of a variety of different materials and may contain at least one electrical conductor. For example, the cords 1112 can be made of plastic, string, fabric, wire, etc.

In one embodiment, instead of two separate pieces, the cords are connected together and form a continuous piece. The continuous piece can be a strap, like an electric strap. One example of a strap is a sports strap that snugly attaches eyeglasses to a user's head, often for sport activities. The two ends of the strap are coupled to the arms of the glasses. The coupling can be based on mechanical connectors (e.g., snaps, clips), part of which may be integral with the arms of the glasses, and the other part integral with the straps. The coupling can be on the temples, and located close to their corresponding lens holders.

In general, the cord(s) can also be referred to as a lanyard. In one embodiment, the base is removably attached to the cord(s). In another embodiment, the base can be integral with the cord(s).

The electrical components within the base 1110 can vary in different embodiments. In one embodiment, the electrical components pertain to wireless communication circuitry, an antenna and/or a battery. In another embodiment, the electrical component pertains to radiation monitoring circuitry. In still another embodiment, the electrical component pertains to health or fitness monitoring.

Figure 12A:
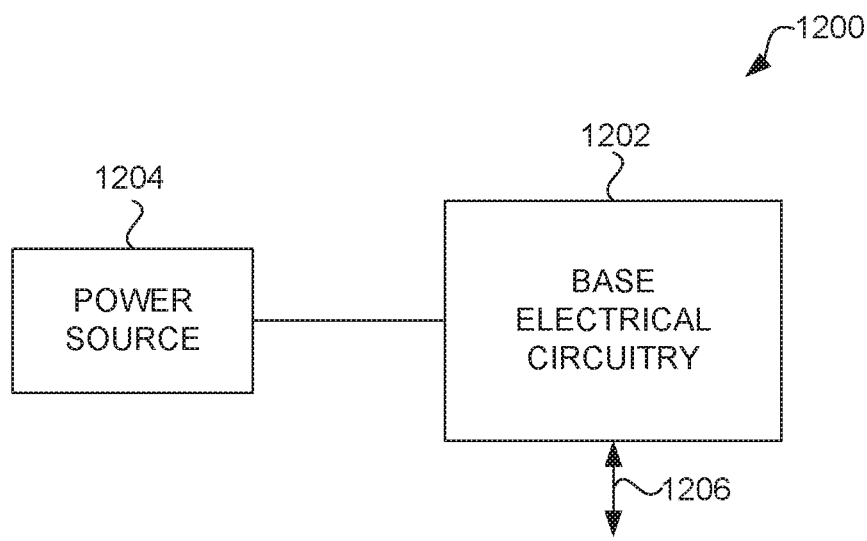
FIG. 12A is a block diagram of electrical components to be tethered to a pair of eyeglasses according to one embodiment of the invention.

FIG. 12A is a block diagram of electrical components 1200 according to one embodiment of the invention. The electrical components 1200 are, for example, suitable for use as the electrical components for the base 1110 of FIG. 11. The electrical components 1200 include base electrical circuitry 1202 and a power source 1204. The power source 1204 can, for example, be at least one battery (rechargeable or non-rechargeable) and/or at least one solar cell. In another embodiment, the power source is not in the base but instead in at least one of the cords, the eyeglass frame, or other electronic device that can electrically couple to the base. The base electrical circuitry 1202 varies with application and/or implementation. For example, the base electrical circuitry 1202 can include one or more of: controller, memory, communication interface, I/O port, sensor, output device (e.g., display), switch, and connector port.

The base electrical circuitry 1202 can also provide a link 1206 to other electrical circuitry in a wired or wireless manner. The wired interaction can utilize a cord coupled to an eyeglass frame, or can use a cable coupled to a portable electronic device. The wireless interaction can utilize different types of frequencies, such as radio frequencies, infrared frequencies or optical frequencies. The other electrical circuitry can, for example, be (i) within an eyeglass frame (e.g., coupled via a cord), (ii) worn by a user, (iii) within a portable electronic device (e.g., mobile telephone, media player, camera), or (iv) within a remote control device.

Figure 12B:
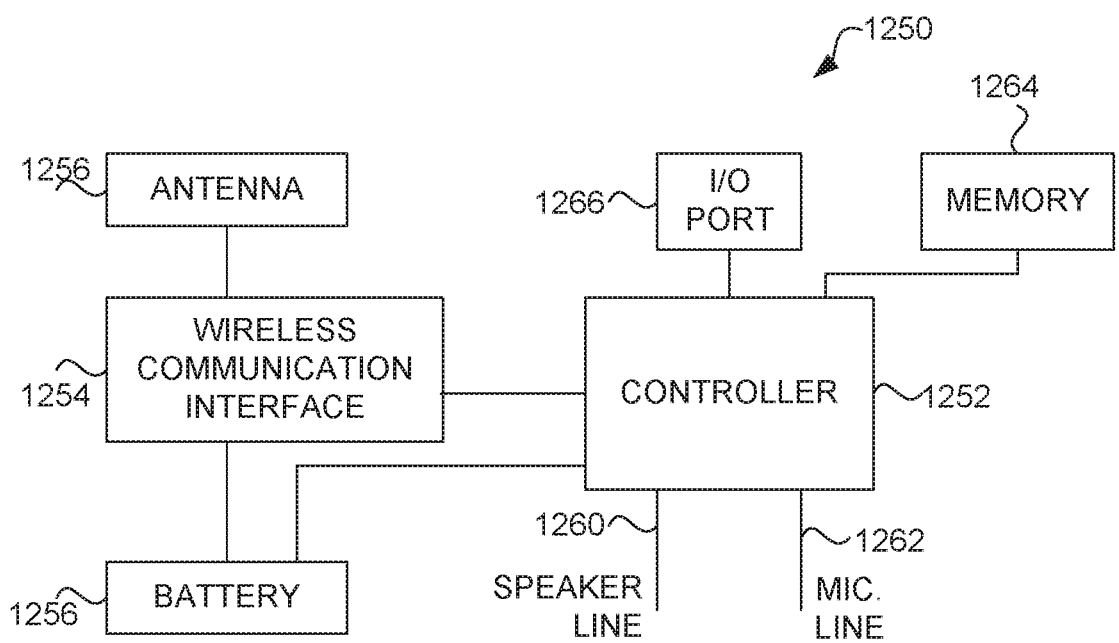
FIG. 12B is a block diagram of electrical components to be tethered to a pair of eyeglasses according to one embodiment of the invention.

FIG. 12B is a block diagram of electrical components 1250 according to one embodiment of the invention. The electrical components 1250 are, for example, suitable for use as the electrical components for the base 1110 of FIG. 11. The electrical components 1250 can also represent one representative, more specific embodiment of the electrical components 1200 shown in FIG. 12A wherein wireless communication is to be supported. The electrical components 1250 include a controller 1252, a wireless communication interface 1254, an antenna 1256, and a battery 1258. The controller 1252 can manage the overall operation of the electrical components 1250 and can output a speaker line 1260 and receive a microphone line 1262. The speaker line 1260 and the microphone line 1262 can be provided through at least one of the cords 1112. In one embodiment, at least one of the cords 1112 has a first electrical conductor that electrically connects to the speaker line 1260, and a second electrical conductor that electrically connects to the microphone line 1262.

The electrical components 1250 can further include a memory 1264 and an Input/Output (I/O) port 1266. The memory 1264 can store data for various purposes, such as programs, user preferences, and other data. The memory 1264 can provide volatile (e.g., random access memory) or non-volatile (e.g., read-only memory, FLASH, etc.) data storage. The memory 1264 can be implemented as semiconductor chips or a disk drive. The memory 1264 can also be portable from the base 1110, such as a memory card or removable disk drive. The I/O port 1266 enables the base to receive or send additional signals to/from the base. The additional signals can be sent or received in a wireless manner (e.g., infrared, radio frequency) or a wired manner (e.g., with the assistance of a conductor within at least one of the cords). These additional signals can be from a user or from other electrical devices. As one example, a switch or sensor could send data to the I/O port 1266. The switch can be user activated and, more generally, pertains to a user input. The switch, for example, could be provided to enable the user to signal other electrical components. As another example, a remote control can wirelessly send data to the I/O port 1266 (e.g., to control some operation of at least some of the electrical components). As still another example, the I/O port 1266 can send data to an output device, such as a light source, display device, etc.

At least one of the cords can be just a piece of flexible conductor encapsulated by a flexible insulator. Typically, a cord includes a number of electrical wires or conductors. There can be one or more electrical components in the base, and there can also be one or more electrical components in the cords. The different types of connectors in different embodiments can be located in the base. In one embodiment, a power source is an electrical component in the base tethered to a pair of glasses. In another embodiment, the glasses are tethered to a base that has a connector. The connector is connected to and draws power from an external electronic device. In this embodiment, electrical components in the glasses draw power from the external electronic device.

Figure 12C:
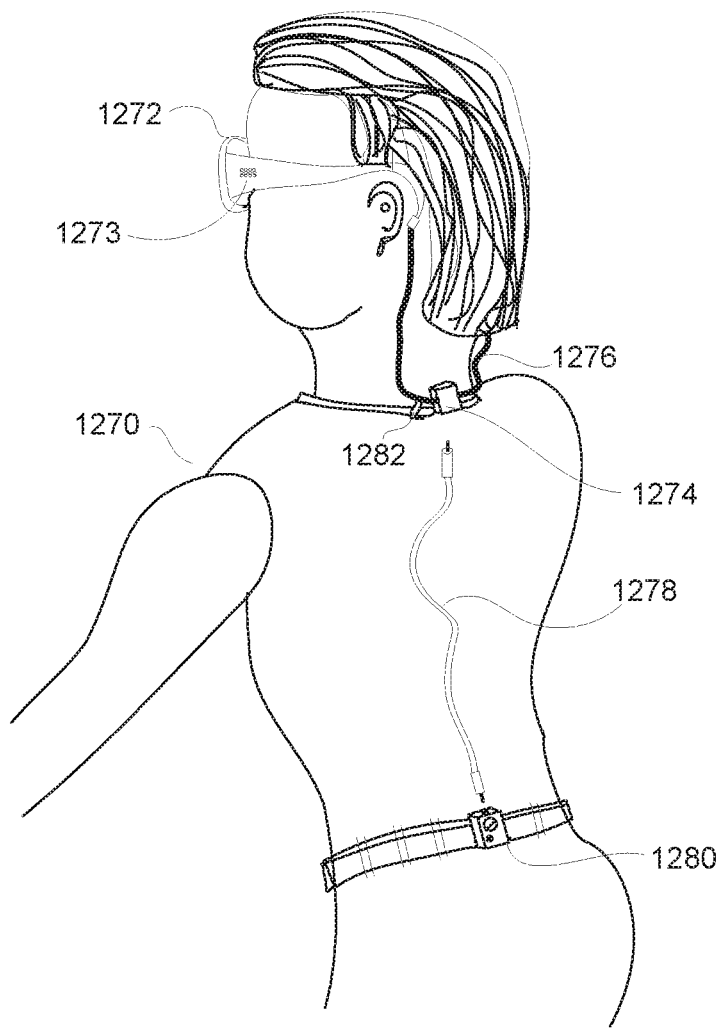
FIG. 12C shows an embodiment of the invention where a user is wearing a pair of glasses, which include electrical components, such as a speaker.

FIG. 12C shows an embodiment where a user 1270 is wearing a pair of glasses 1272, which include electrical components, such as a speaker 1273. There are also tethered electrical components in a base 1274, which is connected to the glasses 1272 through a cord 1276. In addition, there is a wire 1278 (or cable) connected between a connector at the base 1274 and a connector at a portable electronic device 1280. The portable device 1280 can be (a) a multimedia device, such as a MP3 player/recorder or a minidisk player, (b) a wireless communication device, such as a cell phone, or (c) a personal digital assistant, or other types of portable devices with computation, entertainment and/or communication capabilities.

In one embodiment, an attachment device 1282 is used to support the base 1274, the electrical components in the base 1274 and/or the cord 1276. For example, the attachment device 1282 can be a pin, clip or Velcro®, or other suitable mechanisms. The attachment device 1282 attaches at least a part of the base 1274 and/or the cord 1276 to the user's clothing. Alternatively or additionally, a similar attachment device can also serve to attach the wire 1278 to the user's clothing.

The cords 1112 as shown in FIG. 11 can couple to the frame 1104 of the eyeglasses 1102 in a variety of different ways. Additionally, one or more electrical components can be attached to or provided within the frame 1104 of the eyeglasses 1102—the eyeglass electrical components. In one embodiment, the eyeglass electrical components include a speaker and/or a microphone. In another embodiment, the eyeglass electrical components include a display device and/or a sensor.

FIGS. 13A-13D are diagrams of arrangements of a speaker and a microphone attached to an arm (i.e., temple) of a frame of a pair of eyeglasses according to a number of embodiments. In these arrangements, electrical components are attached to the eyeglasses so that the eyeglasses need not embed or otherwise include electrical components.

Figure 13A:
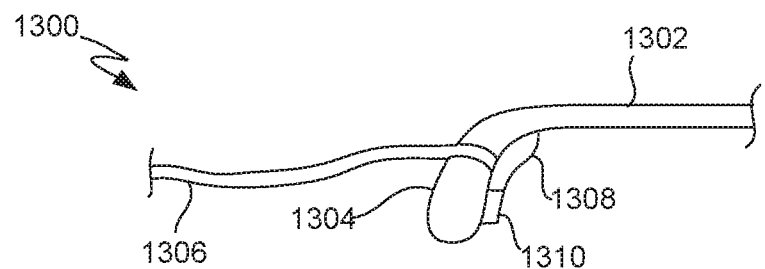
FIGS. 13A-13D are diagrams of arrangements of a speaker and a microphone provided proximate to an arm of a frame of a pair of eyeglasses according to different embodiments of the invention.

FIG. 13A is a diagram of an arrangement 1300 of a cord 1306 and eyeglass electrical components according to one embodiment. The cord 1306 couples to an end portion 1304 of an arm 1302 of a pair of eyeglasses. In one embodiment, the end portion 1304 can pertain to a temple tip or some portion thereof. One end of the cord 1306 is electrically and mechanically coupled to eyeglass electrical components, such as a speaker 1308 and a microphone 1310. The speaker 1308 and the microphone 1310 are also coupled to the end portion 1304 of the arm 1302. When the cord 1306 is coupled to the end portion 1304 of the arm 1302, the speaker 1308 and the microphone 1310 are also coupled against the end portion 1304 of the arm 1302.

Figure 13B:
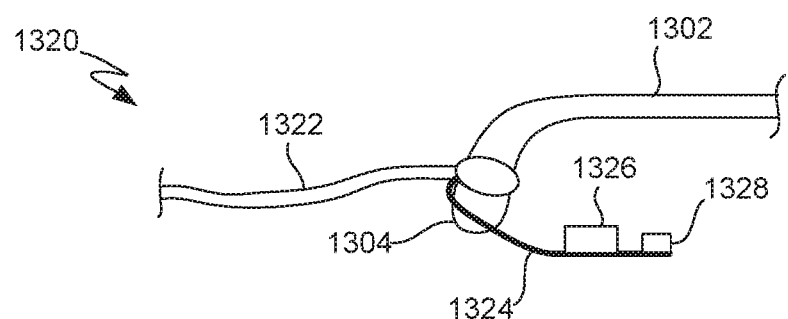

FIG. 13B is a diagram of an arrangement 1320 of a cord 1322 and eyeglass electrical components according to one embodiment. The cord 1322 couples to the end portion 1304 of the arm 1302 of a pair of eyeglasses. The end portion of the cord 1322 is coupled to eyeglass electrical components via an extension 1324. The eyeglass electrical components carried by the extension 1324 include, for example, a speaker 1326 and a microphone 1328. The extension 1324 facilitates positioning of the speaker 1326 and the microphone 1328 relative to the pair of eyeglasses or its user.

Figure 13C:
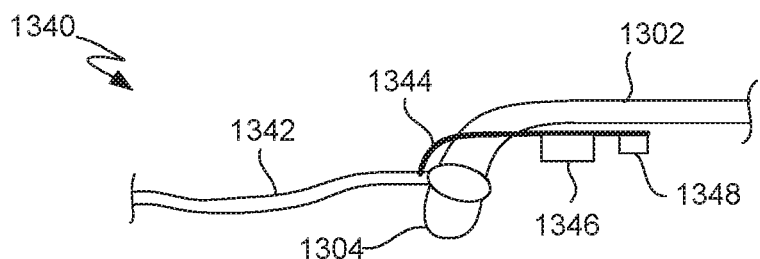

FIG. 13C is a diagram of an arrangement 1340 of a cord 1342 and eyeglass electrical components according to one embodiment. The cord 1342 couples to the end portion 1304 of the arm 1302 of a pair of eyeglasses. The end portion of the cord 1322 is coupled to eyeglass electrical components via an extension 1344. The eyeglass electrical components carried by the extension 1344 include, for example, a speaker 1346 and a microphone 1348. The extension 1344 facilitates positioning of the speaker 1346 and the microphone 1348 relative to the pair of eyeglasses or its user.

The arrangement 1340 is similar to the arrangement 1320 but the extension 1344 is positioned differently than the extension 1324. It should be noted that that the extension 1324 illustrated in FIG. 13B and/or the extension 1344 illustrated in FIG. 13C can be rotatably attached to the end portion of the cord 1322. In one embodiment, the extension 1324 illustrated in FIG. 13B can rotate into the position of the extension 1344 illustrated in FIG. 13C and vice versa.

Figure 13D:
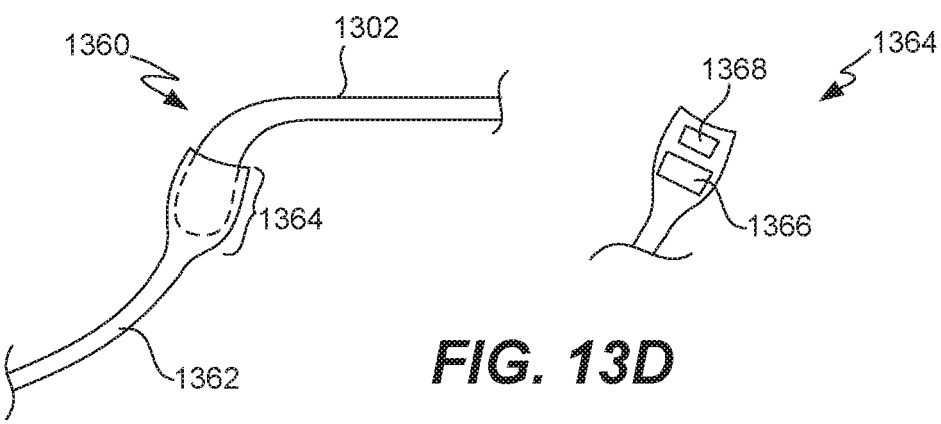

FIG. 13D is a diagram of an arrangement 1360 of a cord 1362 of eyeglass electrical components according to one embodiment. The cord 1362 has an elastic end 1364 that slides on an end portion of an arm 1302 of a pair of eyeglasses. Eyeglass electrical components, such as a speaker 1366 and a microphone 1368, can be affixed or integral to the elastic end 1364.

Figure 13E:
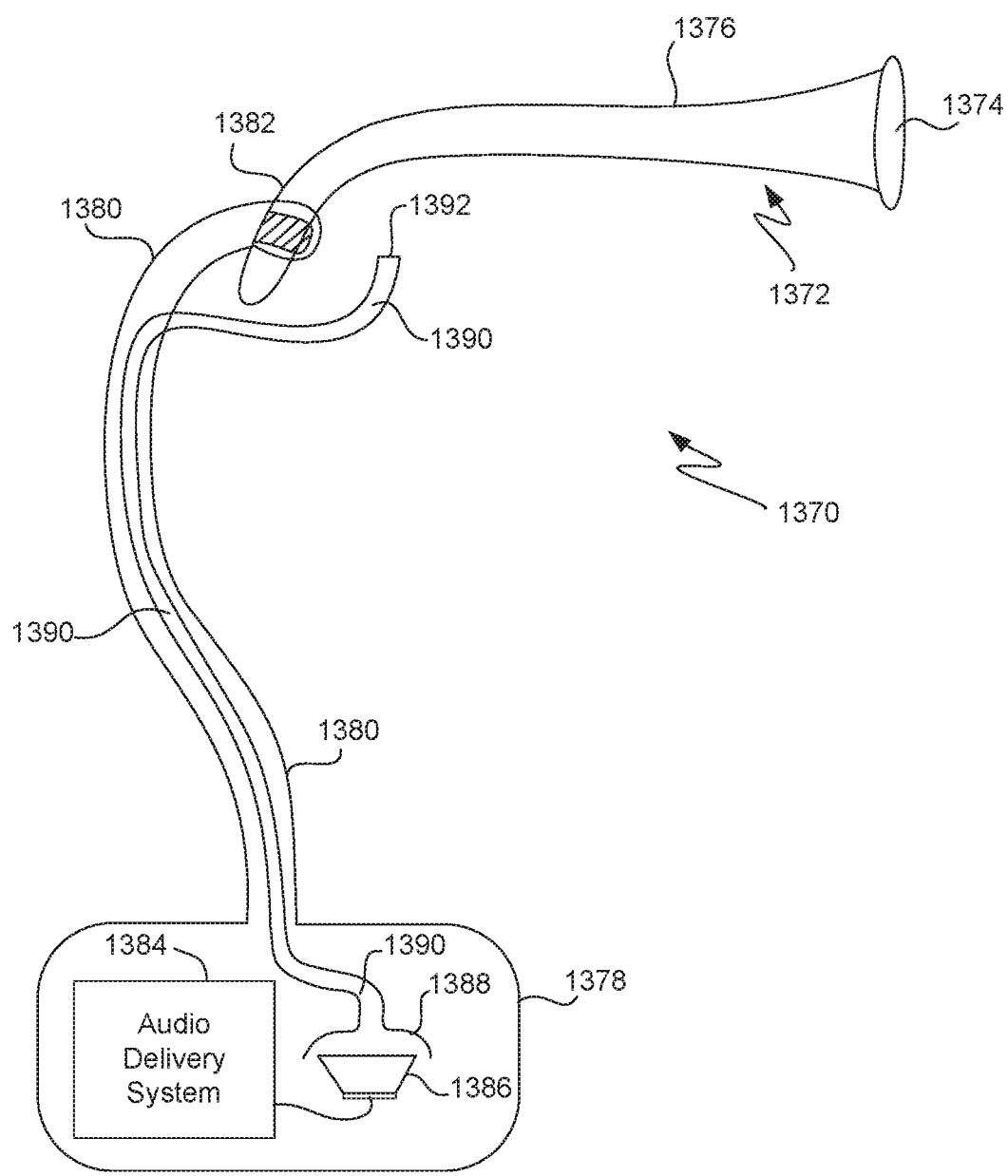
FIG. 13E is a diagram of an arrangement of a speaker in a base that provides audio output in the vicinity of an arm of a frame of a pair of eyeglasses according to another embodiment of the invention.

FIG. 13E is a diagram of an arrangement 1370 of a speaker in a base that provides audio output in the vicinity of an arm of a frame of a pair of eyeglasses according to another embodiment. In particular, the arrangement 1370 illustrates a pair of eyeglasses 1372 having at least one lens 1374 and at least one arm 1376. A base 1378 couples to the eyeglasses 1372 by way of a cord 1380. The cord 1380 can be integral with the base 1378 or attachable to the base 1378. The cord 1380 can attach to an end portion 1382 of the arm 1376. The base 1378 includes an audio delivery system 1384. The audio delivery system 1384 can, for example, pertain to a MP3 player, a RF receiver (e.g., a radio), or a mini-compact disc player. The audio delivery system 1384 outputs audio signals to a speaker 1386 which provides an audio output. The audio output from the speaker 1386 is directed by a funnel 1388 into a tube 1390 that extends from the funnel 1388 through the cord 1380. At an end 1392 of the tube 1390, the audio output is presented—namely, to a user of the eyeglasses 1372. Note the tube 1390 exits the cord 1380 in the vicinity of its end that attached to the eyeglasses 1372. As an example, the tube 1390 can be a plastic tube. At least the portion of the tube 1390 that is external to the cord 1380 can be malleable to allow user adjustment relative to the user's ear.

Figure 14A:
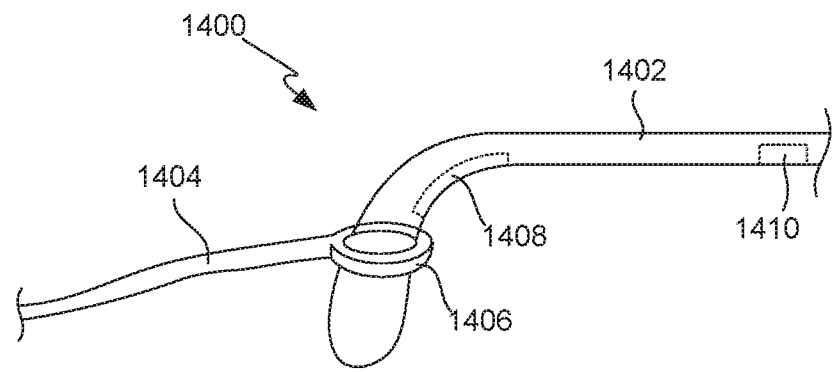
FIG. 14A is a diagram of an arrangement of an arm of a frame of a pair of eyeglasses and a cord of an apparatus having tethered electrical components according to one embodiment of the invention.

FIG. 14A is a diagram of an arrangement 1400 of an arm 1402 of a frame of a pair of eyeglasses and a cord 1404 of an apparatus having tethered electrical components according to one embodiment. The cord 1404 has a loop 1406. The loop 1406 can be used to secure the cord 1404 to the arm 1402. For example, the loop 1406 can be elastic. The arm 1402 includes eyeglass electrical components, such as a speaker 1408 and a microphone 1410, which are integral with the arm 1402. In one embodiment, the speaker 1408 and the microphone 1410 are housed within the arm 1402.

The cord 1404 contains at least one electrical conductor and the arm 1402 contains at least one electrical conductor. The securing of the cord 1404 to the arm 1402 not only physically secures the cord 1404 to the arm 1402 but also electrically connects the at least one electrical conductor within the cord 1404 to the at least one electrical conductor within the arm 1402. In this manner, electrical components within a base (e.g., base 1110) coupled to the cord 1404 can provide electrical signals to the speaker 1408 and the microphone 1410 within the arm 1402.

Figure 14B:
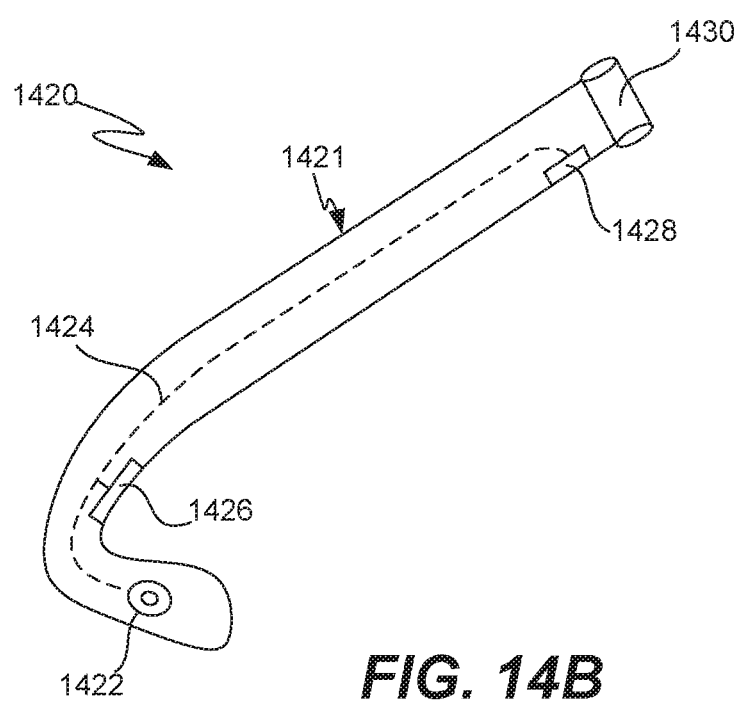
FIG. 14B is a diagram of an arrangement of an arm for a frame of a pair of eyeglasses with electrical components according to one embodiment of the invention.

FIG. 14B is a diagram of an arrangement 1420 of an arm 1421 for a frame of a pair of eyeglasses according to one embodiment. According to this arrangement 1420, the arm 1421 includes a connector port 1422, a conductor 1424 (e.g., wire), a speaker 1426, and a microphone 1428. The speaker 1426 and the microphone 1428 are eyeglass electrical components. In the present invention, a conductor is not considered an electrical component if the conductor's sole intended function is to provide electrical connections to two or more electrical components. As such, the conductor 1424 is not considered an electrical component. In one embodiment, a connector is also not considered an electrical component. The conductor 1424 is internal to the arm 1412, and the speaker 1426 and the microphone 1428 may also be internal to the arm 1412. The connector port 1422 can receive a counterpart connector connected to a cord (e.g., cord 1112), thereby electrically coupling a conductor within the cord to the conductor 1424 within the arm 1421. The arm 1421 can be used as a replacement arm so as to convert a standard pair of eyeglasses into a pair of eyeglasses that can exploit tethered electrical components, such as for wireless communications. In one implementation, the arm 1421 has a hinge portion 1430 to couple the arm 1421 to a frame of a pair of eyeglasses.

FIG. 14C is a diagram of an arrangement 1440 of an arm 1441 for a frame of a pair of eyeglasses according to one embodiment. The arm 1441 is generally similar to the arm 1421 shown in FIG. 14B, but further includes additional eyeglass electrical components, such as a light source 1442. The light source 1442 can, for example, be a Light Emitting Diode (LED). The light source 1442 can provide ornamental lighting to the frame or can serve as an indicator light. The indicator light can provide various indications, such as, in use, operational status of electrical components, user's mood, user's health condition, etc. Optionally, the arrangement 1440 of the arm 1441 can also include an extension 1444 and/or an extension 1446. The extension 1444 can be used to direct light from the light source 1442 to a different location. The extension 1444 can be rotatable, malleable or retractable (e.g., folding out). In one embodiment, the extension 1444 can be a light pipe. The extension 1446 (e.g., a boom arm) can move the microphone 1428 to an end 1448 of the extension 1446, thereby closer to the mouth of the user. In another embodiment, the same extension 1444 or 1446 can include the light from the light source 1442 and the microphone 1428.

FIG. 15A is a diagram of a connection arrangement 1500 of an arm 1502 of a pair of eyeglasses and a cord 1506 according to one embodiment. The cord 1506 is used to tether electrical components to the eyeglasses. The arm 1502 includes a receptacle 1504 (i.e., counterpart connector) for receiving a connector 1508 connected to the cord 1506. When the connector 1508 is engaged within the receptacle 1504, the cord 1506 is physically and/or electrically connected to the arm 1502. Alternatively, the cord 1506 can include the receptacle 1504 and the arm 1502 can include the connector 1508.

FIG. 15B is a diagram of a connection arrangement 1520 of an arm 1522 of a pair of eyeglasses and a cord 1524 according to another embodiment. The cord 1524 is used to tether electrical components to the eyeglasses. The arm 1522 has a connector 1526 at an end region. The cord 1524 contains a connector 1528 at an end. The connectors 1526 and 1528 can couple together (i.e., connector pair) to provide physical and/or electrical connections between the arm 1522 and the cord 1524. In one implementation, the connector pair (connectors 1526 and 1528) provide rotatable coupling of the cord 1524 to the arm 1522. In one particular implementation, the connector pair can be a BNC or coaxial type connector.

FIG. 15C is a side view of the connection arrangement 1520 of FIG. 15B when the connector 1526 and the connector 1528 are coupled together. As a result, a conductor in the cord 1524 can be electrically coupled to an electrical component within the arm 1522. In one implementation, the connector 1528 couples to the cord 1524 in a flexible or rotatable manner, so as to permit relative movement between the cord 1514 and the arm 1522 once the connector 1526 and the connector 1528 are coupled together. For example, the flexible or rotatable coupling can be achieved by a swivel joint at or near the connectors 1526 and 1528.

Figure 16:
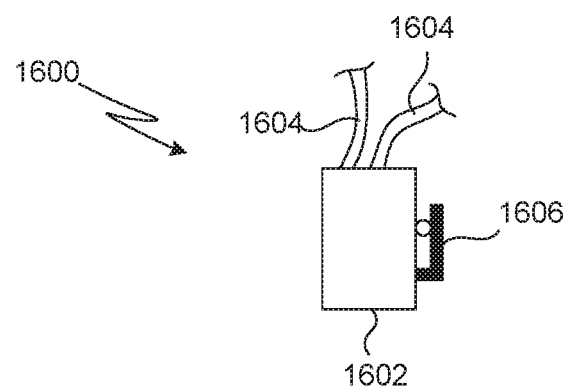
FIG. 16 is a side view of an apparatus having electrical components tethered to another device according to one embodiment of the invention.

FIG. 16 is a side view of an apparatus 1600 having electrical components tethered to another device (i.e., tethered electrical components) according to one embodiment of the invention. The apparatus 1600 has a base 1602, a pair of cords 1604, and a clip 1606. The clip 1606 is affixed to the base 1602. The base 1602 and the cords 1604 can represent any of the embodiments of the invention described herein. The clip 1606 is one embodiment of the attachment device 1282 discussed above with reference to FIG. 12C.

The apparatus 1600 having the clip 1606, as an example, can be used to hold the base 1602 against an article of clothing worn by the user. For instance, the article of clothing can be a shirt, sweater or jacket worn by the user. More specifically, the clip 1606 can hold the base 1602 to the collar of a shirt, sweater or jacket worn by the user. Alternatively, instead of a clip, the base 1602 can be held against an article of clothing by hook and loop technology (e.g., Velcro®), a pin, tape, a pocket, etc.

Figure 17:
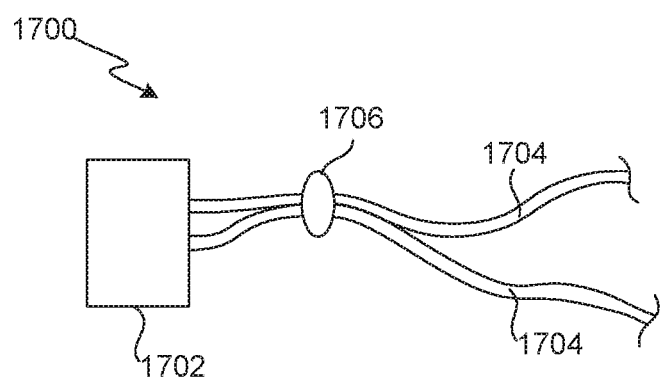
FIG. 17 is a side view of an apparatus having tethered electrical components according to another embodiment of the invention.

FIG. 17 is a side view of an apparatus 1700 having electrical components tethered to another device (i.e., tethered electrical components) according to another embodiment of the invention. The apparatus 1700 include a base 1702, a pair of cords 1704, and a ring 1706. At least one of the cords 1704 can include at least one electrical connector. The ring 1706 can be used by a user of the apparatus 1700 to tighten the cords 1704 about the head of the user when the apparatus 1700 is attached to a pair of eyeglasses being worn by the user. The base 1702 and the cords 1704 can represent any of the embodiments described herein. In one embodiment, the base 1702 is integrally formed with the ring 1706. In this embodiment, the base 1702 tends to be placed at the end of the cords 1704. However, the base 1702 need not be positioned at the end of the cords 1704. In still another embodiment, the base 1702 can include or connect to a ring, such that the base 1702 can slide along the cords 1704 as does a ring while maintaining connection with the at least one electrical connector of at least one of the cords 1704.

Figure 18:
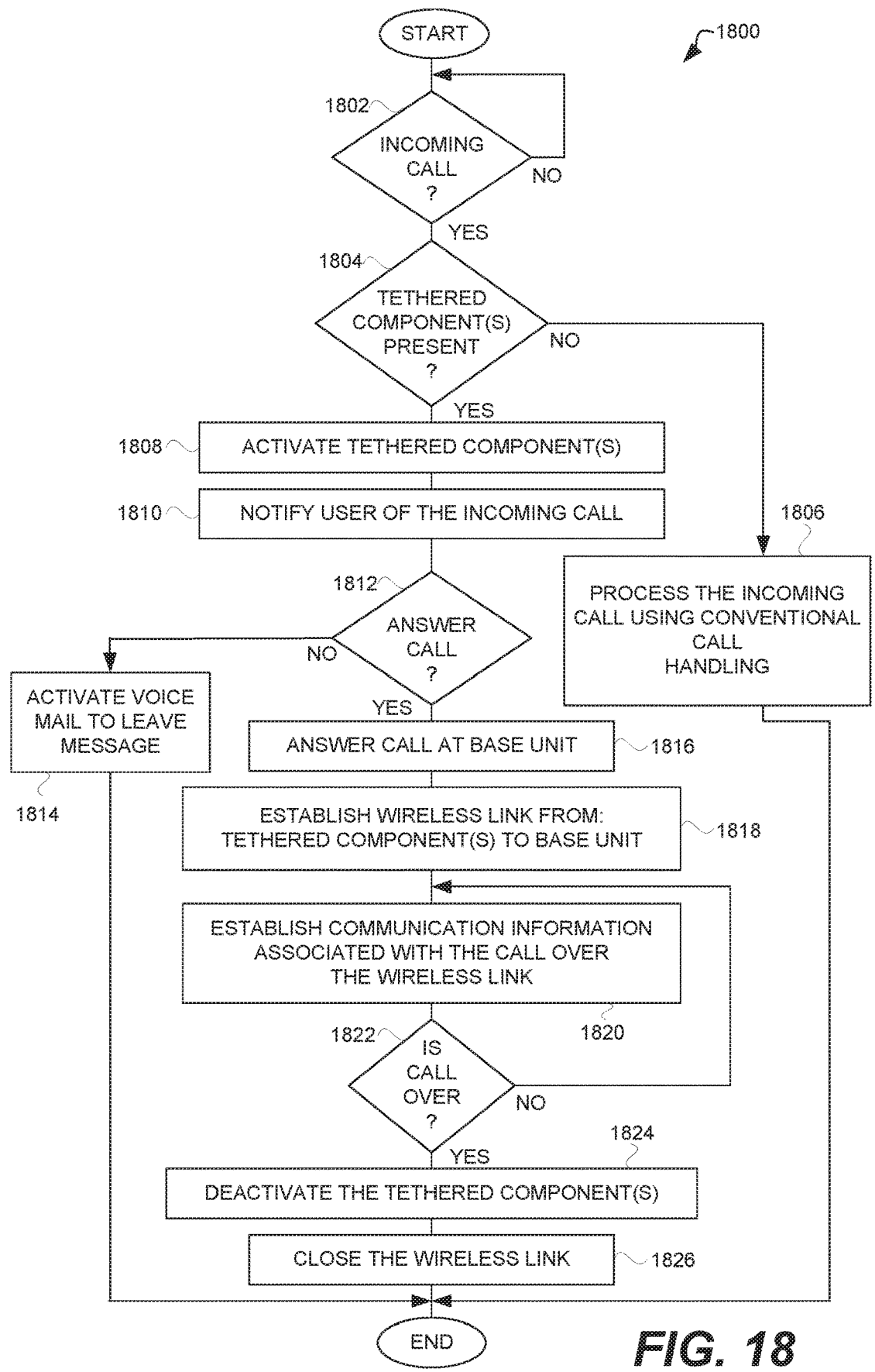
FIG. 18 is a flow diagram of call processing using tethered wireless communication components according to one embodiment of the invention.

FIG. 18 is a flow diagram of call processing 1800 using tethered wireless communication components according to one embodiment of the invention. The tethered wireless communication components interact with a communication device. The tethered wireless communication components can be the components within the base 1110 shown in FIG. 11, such as the electrical components 1250 shown in FIG. 12B. In this embodiment, the communication unit supports two-way communication, such as an audio conversation between two persons. For example, the communication unit can be a mobile telephone (e.g., cellular phone), a computer (desktop or portable), a cordless phone, a speaker phone, a voice-activated device, etc.

The call processing 1800 begins with a decision 1802 that determines whether a call is incoming. When the decision 1802 determines that a call is not incoming, then the call processing 1800 waits for such a call. Once the decision 1802 determines that a call is incoming, the decision 1804 determines whether tethered wireless communication components are present. When the decision 1804 determines that tethered wireless communication components are not present, then the incoming call is processed 1806 using conventional call handling. In this case, since tethered wireless communication components are not present, the communication unit proceeds to handle the call in a conventional manner without the benefit of tethered wireless communication components.

On the other hand, when the decision 1804 determines that tethered wireless communication components are present, then the tethered wireless communication components (tethered components) are activated 1808. Here, the wireless communications capability of the tethered components is activated (e.g., powered-up, enabled, or woken-up). The user of the tethered components is then notified 1810 of the incoming call. In one embodiment, the notification to the user of the incoming call can be achieved by an audio sound produced by the tethered components and output by a speaker. The speaker is electrically coupled to the tethered components, e.g., such as in the various embodiments noted above. Alternatively, the user of the communication unit could be notified by a vibration of the tethered components, vibration of the frame of the eyeglasses or a base tethered to the glasses, or a visual (e.g., light) indication provided by the eyeglasses or the tethered components. Alternatively, the communication unit could include a ringer that provides audio sound and/or vibration indication to signal an incoming call. Still another alternative is that the tethered components or the frame of the eyeglasses could provide a tactile action to the user so as to notify the user.

Next, a decision 1812 determines whether the incoming call has been answered. When the decision 1812 determines that the incoming call has not been answered, the communication unit can activate 1814 a voice message informing the caller to leave a message or instructing the caller as to the unavailability of the recipient.

On the other hand, when the decision 1812 determines that the incoming call is to be answered, the call can be answered 1816 at the communication unit. Then, a wireless link is established 1818 from the wireless tethered components to the communication unit. The wireless link is, for example, a radio communication link such as utilized with Bluetooth or WiFi networks. Thereafter, communication information associated with the call can be exchanged 1820 over the wireless link. Here, the communication unit receives the incoming call, and communicates wirelessly with the tethered components such that communication information is provided to the user via the tethered components. The user is accordingly able to communicate with the caller by way of the tethered components and, thus, in a hands-free manner.

A decision 1822 then determines whether the call is over (completed). When the decision 1822 determines that the call is not over, the call processing 1800 returns to repeat the operation 1820 and subsequent operations so that the call can continue. On the other hand, when the decision 1822 determines that the call is over, then the tethered components are deactivated 1824, and the wireless link and the call are ended 1826. The deactivation 1824 of the tethered components can place the tethered components in a reduced-power mode. For example, the deactivation 1824 can power-down, disable, or sleep the wireless communication capabilities (e.g., circuitry) of the tethered components. Following the operation 1826, as well as following the operations 1806 and 1814, the call processing 1800 for the particular call ends.

Although the communication unit utilized with the call processing performs two-way communications, other embodiments of the invention can utilize one-way communications (or at least substantially one-way communications). For example, a communication unit might produce, receive or play audio content such that the audio content is transmitted to the tethered components in a wireless manner. The tethered components then serve as a receiver for the audio content transmitted from the communication unit.

In one embodiment, the communication unit can be a communication device with which tethered components can communicate. The communication unit outputs audio to the tethered components in a wireless manner.

In another embodiment, the communication unit can also be incorporated into the tethered communication components. For example, the tethered components can functionally operate as a two-way communication device (e.g., a mobile telephone). Such tethered components (e.g., communication components) can then, for example, operate as a mobile telephone, and may operate through use of voice-activated commands.

Figure 19:
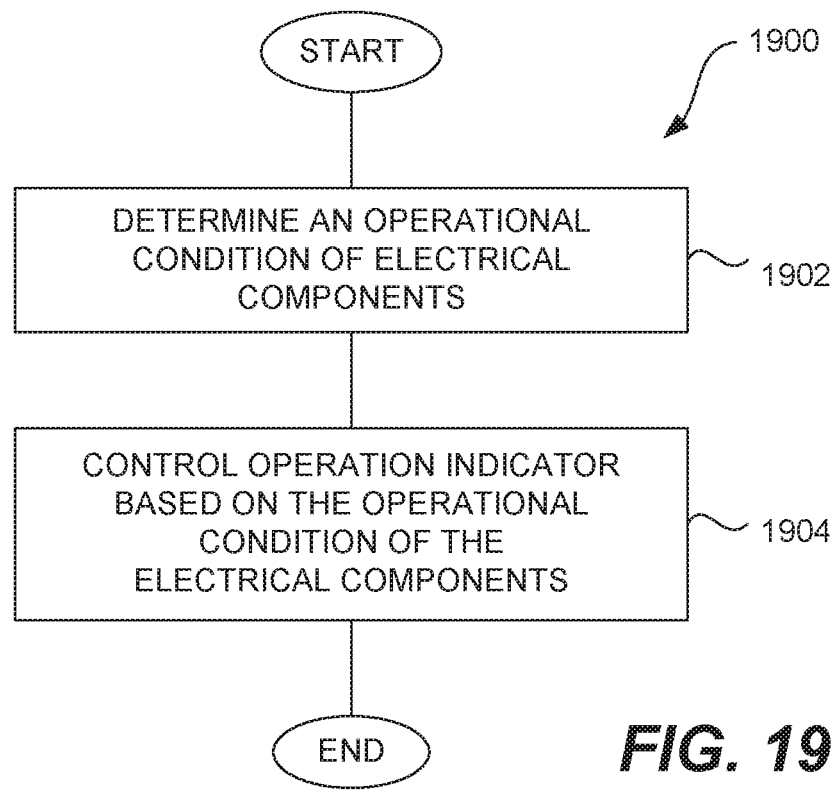
FIG. 19 is a flow diagram of operational condition processing using tethered electrical components according to one embodiment of the invention.

FIG. 19 is a flow diagram of operational condition processing 1900 according to one embodiment of the invention. The operational condition processing 1900 can, for example, be performed by an apparatus having at least one operation indicator as well as tethered electrical components and/or eyeglass electrical components for a pair of eyeglasses.

The operational condition processing 1900 initially determines 1902 an operational condition of the electrical components (e.g., tethered electrical components and/or the corresponding eyeglass electrical components). The operational condition can, for example, indicate whether a call is incoming, whether a call is ongoing, or whether the electrical component is in use. Next, at least one operation indicator of the electrical components is controlled 1904 based on the determined operational condition. The operation indicator can, for example, be a light source (e.g., light emitting diode). The at least one operation indicator can be positioned at a variety of different places of the eyeglasses or the tethered electrical components. In one embodiment, the tethered electrical components are tethered wireless communication components, and the operation indicator serves as an indicator to others that the user of the tethered electrical components is engaged in a call. In another embodiment, the indicator can signal to the wearer of the tethered electrical components that a call is incoming. Following the operation 1904, the operational condition processing 1900 is complete and ends.

Figure 20:
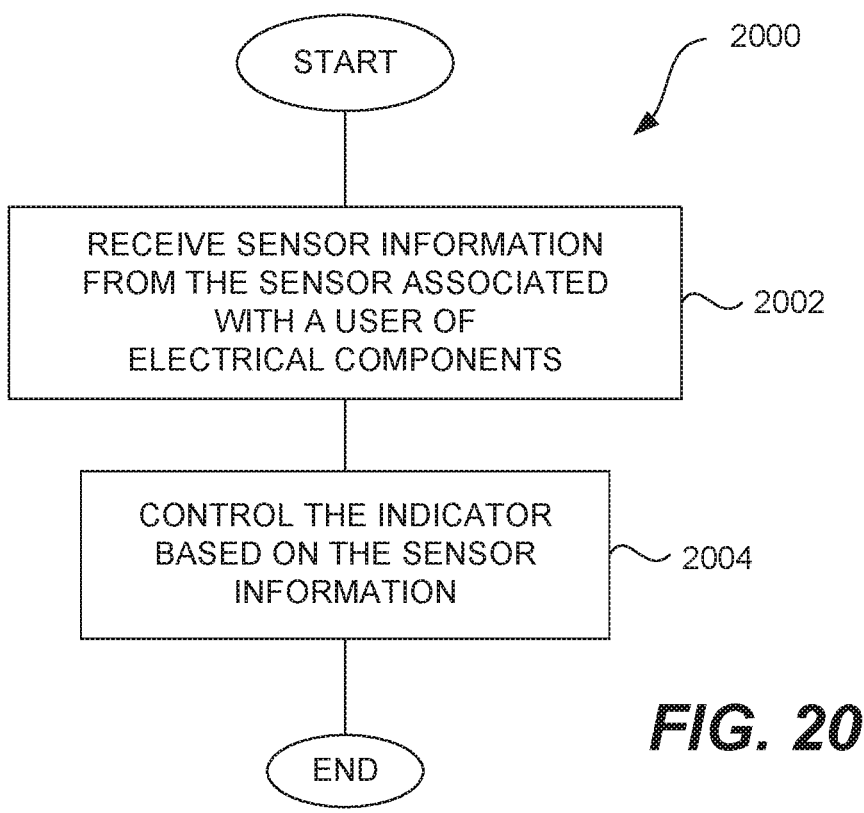
FIG. 20 is a flow diagram of sensor processing using tethered electrical components according to one embodiment of the invention.

FIG. 20 is a flow diagram of sensor processing 2000 according to one embodiment of the invention. The sensor processing 2000 can, for example, be performed by an apparatus having at least one sensor as well as tethered electrical components and/or eyeglass electrical components for a pair of eyeglasses. Optionally, the electrical components further include at least one operation indicator.

The sensor processing 2000 initially receives 2002 sensor information from the sensor. The sensor information is typically associated with the user of the eyeglasses. There can be different types of sensors. The sensors can be considered either eyeglass electrical components or tethered electrical components. For example, the sensor can be a temperature sensor configured to sense the temperature of the user. The sensor can be a humidity sensor configured to sense how much the user has been perspiring. The sensor can sense whether at least one of the user's eyes is open or not. The sensor can sense if the user is crying. The sensor can sense the direction the user is looking. In a general sense, the sensor information can, for example, pertain to physical and/or emotional conditions of the user.

At least one indicator can then be controlled 2004 based on the sensor information. The indicator can be considered either eyeglass electrical components or tethered electrical components. The indicator can, for example, be a light source or a liquid crystal display. Following the operation 2004, the sensor processing 2000 is complete and ends.

The indication provided by the indicator can serve various other purposes. As an example, the indication can represent physical or emotional status of the user of the eyeglasses or the tethered electrical components. For example, the indication can provide an indication of the health or mood of the user of the eyeglasses or the tethered electrical components (e.g., by use of different colored light).

Although the at least one sensor for acquiring the sensor information can be an eyeglass electrical component or a tethered electrical component, it should be noted that the sensor could also be remotely located from the eyeglasses or tethered electrical components, and could also communicate therewith in a wired or wireless manner. Wireless sensors can increase the type of sensor information that can be acquired and utilized.

In one embodiment, the sensor can be a position sensor that provides position information. The position sensor can, for example, be a GPS receiver that is able to fully or partially determine the position of the eyeglasses or its user. The position sensor can be integral with the tethered electrical components and thus, for example, provided in a base portion (e.g., base 1110). Alternatively, the position sensor can be provided within the frame (e.g., arm) of the eyeglasses as an eyeglass electrical component.

In one embodiment, the cord is a strap, such as an elastic strap. The strap can include or support one or more electrical components, such as a speaker or a microphone. In another embodiment, all of the electrical components are in or supported by the strap. In yet another embodiment, the strap includes at least one electrical connector to allow electrical components in or supported by the strap to couple to additional electrical components, such as in a base.

In another embodiment, the tethered electrical components can further include a memory module. The memory module can provide non-volatile data storage. For example, the memory module can be a portable (or removable) memory device (e.g., memory card). In one implementation, a base portion (e.g., base 1110) of a tethered apparatus can receive the memory module through, for example, a connector at the tethered apparatus. The memory module can, for example, store the sensor information, which can be over an extended period of time. Such memory module can be remotely interrogated using wireless communication circuitry, or can be accessed through a wired connection with tethered electrical components.

In yet another embodiment, tethered electrical components can further provide audio player capabilities. In such an embodiment, a base portion (e.g., base 1110) of a tethered apparatus can include an audio player and a battery. The base portion may or may not include wireless communication circuitry. The base portion can also include an audio file storage. The base can couple to one or more speakers through at least one cord.

Further, in an alternative embodiment, the output of an operation indicator (e.g., used with the sensor processing 2000) can be audio that is output to the one or more speakers associated with the tethered apparatus. Such audio output can signal the user using natural language, voice synthesis, pre-recorded messages, one or more audio beeps, etc.

In another embodiment, one or more electrical connections on a base portion (e.g., base 1110) of the tethered apparatus facilitate electrical connection with a battery charger. For example, when the power source for the tethered apparatus is a rechargeable battery, the ability to charge the battery without removing the battery from the base portion of the tethered apparatus is advantageous. Hence, in one embodiment, the base portion of the tethered apparatus includes at least one connector or conductive element (e.g., terminal, pin, pad, trace, etc.) so that electrical coupling between the rechargeable battery and the charger can be achieved. In this regard, the electrical connector or conductive element is provided on the base portion of the tethered apparatus and is electrically connected to the battery. In one embodiment, the placement of the electrical connector or conductive element on the base portion serves to allow the tethered apparatus to be placed within a charger and consequently have the electrical connector or conductive element be in electrical contact with a counterpart or corresponding electrical connector or conductive element of the charger. In another embodiment, the base portion can have a port that can couple (e.g., via a cable) with an Input/Output (I/O) port (e.g., USB port) of a computing device (e.g., computer) so as to provide power to charge the battery.

In still another embodiment, the charger can be considered a docking station, upon which the tethered apparatus or the eyeglasses is docked so that the battery within the tethered apparatus or the eyeglasses is able to be charged. Hence, the housing of the tethered apparatus or the eyeglasses can likewise include an electrical connector or conductive element that facilitates electrical connection to the docking station when docked.

In one embodiment, the electrical connection(s) can alternatively be used to allow information stored in the tethered electrical components or eyeglasses to be accessed or queried by a device. For example, when the tethered electrical components include a memory module, the memory module can be accessed to read data (e.g., status information) stored therein.

In yet still another embodiment, a base portion (e.g., base 1110) of the tethered apparatus can serve merely as a battery source for eyeglass electrical components. In other words, in this embodiment, the base need not include other types of circuitries such as wireless communication circuitry. In such an embodiment, the size of the base can be largely dependent on the battery size.

The tethered apparatus may be provided with an illuminated or transparent appearance. For example, at least a portion of the base and/or cords can be illuminated or substantially transparent. This can provide not only a unique design appearance but can also facilitate lighting of the tethered apparatus. For example, operation indicators that are light sources, can be completely internal to the base and/or cords and produce light in complex shapes, patterns, etc. through light pipes, fiber optics, LEDs, etc. Further, the tethered electrical components and/or eyeglass electrical components can have numerous light sources to display patterns, and the patterns can coordinate or be synchronous with audio sounds, etc.

In one embodiment the tethered apparatus can further include a solar panel. The solar panel has one or more solar cells that convert light into energy so as to power the electrical components and/or charge the battery for the tethered apparatus or the glasses.

In one embodiment, the eyeglass electrical components can include a switch or a Radio Frequency Identifier (RFID) element.

As previously noted, a base portion (e.g., base 1110) of the tethered apparatus can have electrical components pertaining to radiation monitoring circuitry. In such case, the electrical components within the base portion alone or together with eyeglass electrical components can implement a radiation monitoring system. The radiation being monitored can, for example, pertain to one or more of UV, infrared and gamma radiation. In one embodiment, sunlight is considered as a type of radiation. In any case, additional details on radiation monitoring are further described in the related applications that have been incorporated herein by reference.

Also, as previously noted, a base portion (e.g., base 1110) of the tethered apparatus can include electrical components pertaining to health or fitness monitoring circuitry. In such case, the electrical components within the base portion alone or together with eyeglass electrical components can implement a health or fitness monitoring system. Additional details on health or fitness monitoring are further described in the related applications that have been incorporated herein by reference.

In yet another embodiment, an electronic component in a temple arrangement of a frame of eyeglasses interacts with an electronic component of a tethered apparatus. For example, a temple arrangement of a pair of eyeglasses holds one portion of an electronic system, and a tethered apparatus that tethers to the pair of eyeglasses includes another portion of the electronic system. In one embodiment, a temple arrangement can be a temple tip, which is usually an enclosure that grabs onto the temple. In another embodiment, a temple arrangement is a temple cover or a temple fit-over. A temple cover slides over and at least partially covers a portion of a temple. If the end of the temple has a temple tip, at least a portion of the temple tip can be covered by the temple cover. A temple fit-over fits over at least a portion of the end of a temple. If the end of the temple has a temple tip, at least a portion of the temple tip is fitted over by the temple fit-over. A temple cover is typically made of a material that is more flexible than a temple fit-over. For example, a temple cover can be a fabric or other materials, such as a sock or sleeve; while a temple fit-over can be made of plastic.

For some glasses, particularly when a pair of glasses has not been extensively worn, a temple arrangement, such as a temple tip, can be relatively easily removed and re-inserted into the glasses. This implies that temple arrangements of different color and/or shape and/or having different electronic components can be applied to the same frame of a pair of glasses. Retailers or distributors can then provide after-market modification or enhancement to a pair of glasses, at the preference of their consumers. This, for example, can be done by replacing existing temple tips with replacement temple tips. Or, a consumer can identify the preferred temple arrangements to be purchased with the glasses.

The various aspects, embodiments, implementations and features of the invention noted above can be combined in various ways or used separately. Those skilled in the art will understand from the description that the invention can be equally applied to or used in other various different settings with respect to various combinations, aspects, embodiments, implementations or features provided in the description herein.

Certain aspects of the invention can be implemented in software, hardware or a combination of hardware and software. Certain aspects of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that electrical components can be provided integral with or attached to a temple arrangement or a temple adapter for use with a pair of eyeglasses. Another advantage of the invention is that after-market changes to electrical capabilities of eyeglasses can be relatively easily achieved Another advantage of the invention is that communication, computation, information capturing or sensing, and/or operational capabilities can be provided for eyeglasses without substantial interference to style or design choices of the glasses. Still another advantage of the invention is that wireless communications, radiation monitoring, fitness monitoring and/or health monitoring can be supported by the electrical components. Yet another advantage of the invention is the ability to provide hands-free wireless communications capability. Moreover, another advantage of the invention is that electrical components can be separated into two areas, one integral or attached to a pair of eyeglasses, and the other tethered to the pair of eyeglasses. Different components can be positioned in different areas depending on applications and/or aesthetical reasons. For example, power sources can be placed away from but tethered to the eyeglasses to reduce the weight of the eyeglasses. Another advantage of the invention is that additional functionality can be added to eyewear that a user already owns. Another advantage is that additional functionality can be added to eyewear when desired. Another advantage of the invention is the ability to provide hands-free wireless communications capability. Yet another advantage of the invention is that wireless communications, radiation monitoring, fitness monitoring and/or health monitoring can be supported by tethered electrical components. Still another advantage of the invention is that communication, computation, information capturing or sensing, and/or operational capabilities can be provided for eyeglasses without substantial interference to style or design choices, and thus without being apparent that the eyeglasses support such capabilities. Yet another advantage of the invention is that one or more operation indicators can be provided (as tethered electrical components or on or with eyeglasses) for functional reasons (e.g., to indicate operational condition of circuitry or to indicate condition of user), and/or for ornamental purposes also, such as light patterns. Still yet another advantage of the invention is that tethered electrical components for eyeglasses can also include one or more sensors, and can provide storage capabilities for sensor information.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An eyewear system, comprising:
    an eyewear frame configured to be worn on the head of a user, the eyewear frame including at least:
        a front structure;
        at least one side structure coupled to the front structure;
        a circuit board at least partially embedded in the at least one side structure or the front structure, the circuit board having at least one integrated circuit coupled thereto; and
        a plurality of sensors embedded in the eyewear frame and operatively connected to the at least one integrated circuit;
    a cord including at least one electrical wire; and
    a supporting electronic device configured to be proximate to the user, the supporting electronic device being separate from the eyewear frame but configured to electronically communicate with the eyewear frame at least via the cord, the supporting electronic device including at least:
        a battery that is provided to supply power to at least the eyewear frame via the cord, provided that the cord is electrically coupled between the eyewear frame and the supporting electronic device;
        a controller configured to provide processing capabilities; and
        a memory operatively connected to the controller to store data.

2. An eyewear system as recited in claim 1, wherein the supporting electronic device is configured to be carried or worn by the user.

3. An eyewear system as recited in claim 2, wherein the at least one integrated circuit is a controller coupled to the circuit board, and wherein at least one of the sensors is operatively connected to the at least one integrated circuit via the circuit board.

4. An eyewear system as recited in claim 1, wherein at least one of the sensors comprises an accelerometer.

5. An eyewear system as recited in claim 1, wherein sensor data obtained from one or more of the sensors at the eyewear frame is sent to the supporting electronic device, and wherein the sensor data is processed at least in part by the controller of the supporting electronic device to produce processed data.

6. An eyewear system as recited in claim 5, wherein the processed data is stored to the memory of the supporting electronic device.

7. An eyewear system as recited in claim 6, wherein at least a portion of the processed data is sent from the supporting electronic device to the eyewear frame via the cord.

8. An eyewear system as recited in claim 7, wherein the eyewear frame comprises:
    a visual indicator configured to signal, to a person, information concerning at least an operational status pertaining to an electrical component of the eyewear frame.

9. An eyewear system as recited in claim 1, wherein the eyewear frame comprises:
    an eyewear battery embedded in the eyewear frame; and
    an electrical circuit electrically connected to the eyewear battery, the electrical circuit being embedded in the eyewear frame.

10. An eyewear system as recited in claim 9, wherein the eyewear frame comprises:
    a connector port that is electrically connected with the electrical circuit, the connector port being at least partially embedded in the eyewear frame, the connector port being configured to electrically connect to the cord.

11. An eyewear system as recited in claim 1, wherein the eyewear frame comprises:
    a visual indicator configured to signal, to a person, information concerning at least an operational status pertaining to an electrical component of the eyewear frame.

12. An eyewear system as recited in claim 1, wherein the eyewear frame comprises a magnetically-assisted switch for facilitating electrical connection.

13. An eyewear system as recited in claim 1, wherein the front structure of the eyewear frame includes one or more lens holders to hold one or more lens, the one or more lens permit the user whom wears the eyewear frame to view its environment through the one or more lens.

14. An eyewear system as recited in claim 1, wherein the eyewear frame comprises:

communication circuitry embedded in the eyewear frame, the communication circuitry being coupled to the circuit board and electrically connected to the at least one integrated circuit; and a memory device configured to store data, the memory device being coupled to the circuit board and electrically connected to the at least one integrated circuit.

15. An eyewear system as recited in claim 14, wherein the battery in the supporting electronic device powers at least in part the at least one integrated circuit in the eyewear frame.

16. An eyewear system, comprising:
an eyewear frame configured to be worn on the head of a user, the eyewear frame including at least:
a front structure;
at least one side structure coupled to the front structure;
a circuit board at least partially embedded in the at least one side structure or the front structure, the circuit board having at least one integrated circuit coupled thereto; and
a plurality of sensors embedded in the eyewear frame and operatively connected to the at least one integrated circuit; and
a supporting electronic device configured to be proximate to the user, the supporting electronic device being separate from the eyewear frame but configured to electronically communicate with the eyewear frame at least via a wireless interface, the supporting electronic device including at least:
a battery that is provided to supply power;
a controller configured to provide processing capabilities; and
a memory operatively connected to the controller to store data.

17. An eyewear system as recited in claim 16, wherein the supporting electronic device is configured to be carried or worn by the user.

18. An eyewear system as recited in claim 16, wherein the supporting electronic device comprises a wireless communication device.

19. An eyewear system as recited in claim 16, wherein the supporting electronic device comprises a mobile phone.

20. An eyewear system as recited in claim 16, wherein the at least one integrated circuit is a controller coupled to the circuit board.

21. An eyewear system as recited in claim 16, wherein at least one of the sensors is operatively connected to the at least one integrated circuit via the circuit board.

22. An eyewear system as recited in claim 16, wherein at least one of the sensors comprises an accelerometer.

23. An eyewear system as recited in claim 16, wherein the wireless interface supports wireless communication via a Bluetooth network or a WiFi network.

24. An eyewear system as recited in claim 16, wherein sensor data obtained from one or more of the sensors at the eyewear frame is sent to the supporting electronic device, and wherein the sensor data is processed at least in part by the controller of the supporting electronic device to produce processed data.

25. An eyewear system as recited in claim 24, wherein the processed data is stored to the memory of the supporting electronic device.

26. An eyewear system as recited in claim 25, wherein at least a portion of the processed data is sent from the supporting electronic device to the eyewear frame via a wireless link supported by the wireless interface.

27. An eyewear system as recited in claim 24, wherein the eyewear frame comprises:

a visual indicator configured to signal, to a person, information concerning at least an operational status pertaining to an electrical component of the eyewear frame.

28. An eyewear system as recited in claim 24, wherein the eyewear frame comprises:
an eyewear battery embedded in the eyewear frame; and
an electrical circuit electrically connected to the eyewear battery, the electrical circuit being embedded in the eyewear frame.

29. An eyewear system as recited in claim 23, wherein the eyewear frame comprises:
a connector port that is electrically connected with the electrical circuit, the connector port being at least partially embedded in the eyewear frame.

30. An eyewear system as recited in claim 16, wherein the eyewear frame comprises:
an eyewear battery;
an electrical circuit electrically connected to the eyewear battery, the electrical circuit being embedded in the eyewear frame;
a visual indicator configured to signal, to a person, information concerning at least an operational status pertaining to an electrical component of the eyewear frame, and
a connector port that is electrically connected with the electrical circuit, the connector port being at least partially embedded in the eyewear frame.

31. An eyewear system as recited in claim 16, wherein the eyewear frame comprises a magnetically-assisted electrical component for facilitating electrical connection.

32. An eyewear system as recited in claim 16, wherein the front structure of the eyewear frame includes one or more lens holders to hold one or more lens, the one or more lens permit the user whom wears the eyewear frame to view its environment through the one or more lens.

33. An eyewear system as recited in claim 16, wherein the eyewear frame comprises:
communication circuitry embedded in the eyewear frame, the communication circuitry being coupled to the circuit board and electrically connected to the at least one integrated circuit; and
a memory device configured to store data, the memory device being coupled to the circuit board and electrically connected to the at least one integrated circuit.

34. An eyewear frame configured to wired or wirelessly couple a supporting electronic device, the supporting electronic device being associated with a user of the eyewear frame, the supporting electronic device being separate from the eyewear frame but configured to electronically communicate with the eyewear frame at least via a wired or wireless interface, the supporting electronic device including at least a battery that is provided to supply power, a controller configured to provide processing capabilities, and a memory operatively connected to the controller to store data, the eyewear frame being configured to be worn on the head of the user, and the eyewear frame comprising:
a front structure;
at least one side structure coupled to the front structure;
a circuit board at least partially embedded in the at least one side structure or the front structure, the circuit board having at least one integrated circuit coupled thereto; and
a plurality of sensors embedded in the eyewear frame and operatively connected to the at least one integrated circuit, wherein the eyewear frame is configured to electronically communicate with the supporting electronic device at least via the wired or wireless interface, such that the eyewear frame is able to electrically communicate with the supporting electronic device to obtain processing capabilities to process data acquired via the eyewear frame.

35. An eyewear frame as recited in claim 34, wherein the data acquired via the eyewear frame includes including at least data from at least one of the sensors.

36. An eyewear frame as recited in claim 34, wherein the eyewear frame comprises:
a visual indicator configured to signal, to a person, information concerning at least an operational status pertaining to an electrical component of the eyewear frame.

37. An eyewear frame as recited in claim 34, wherein the eyewear frame comprises a magnetically-assisted electrical component for facilitating electrical connection.

38. An eyewear frame as recited in claim 34, wherein the front structure of the eyewear frame includes one or more lens holders to hold one or more lens, the one or more lens permit the user whom wears the eyewear frame to view its environment through the one or more lens.

39. An eyewear apparatus, comprising:
an eyewear frame configured to be worn on the head of a user, the eyewear frame including at least:
a front structure; and
a front circuit board internal to the front structure, the front circuit board having at least a first integrated circuit coupled thereto; and
a base electronic unit configured to be worn on the head of the user, the base electronic unit being physically and electrically connected to the eyewear frame, the base electronic unit including at least:
a battery that is provided to supply power to at least a portion of the eyewear apparatus; and
a base circuit board internal to the base electronic unit, the base circuit board having at least a second integrated circuit coupled thereto.

40. An eyewear apparatus as recited in claim 39, wherein the base electronic unit comprises:
wireless communication circuitry that supports wireless communication; and
an antenna, operatively connected to the wireless communication circuitry, for use in providing the wireless communication.

41. An eyewear apparatus as recited in claim 39, wherein the base electronic unit comprises:
wireless communication circuitry that supports wireless communication via a Bluetooth network or a WiFi network.

42. An eyewear apparatus as recited in claim 39, wherein the base electronic unit comprises:
electrical circuitry electrically connected to the battery, the electrical circuitry being at least partially internal to the base electronic unit.

43. An eyewear system as recited in claim 42, wherein the base electronic unit comprises:
a connector port that is electrically connected with the electrical circuitry, the connector port being at least partially internal to the base electronic unit.

44. An eyewear apparatus as recited in claim 43, wherein the eyewear frame comprises:
a display device configured to present information visible to the user.

45. An eyewear apparatus as recited in claim 44, wherein the front structure of the eyewear frame includes at least one lens, the at least one lens permits the user who wears the eyewear frame to view its environment through at least a portion of the at least one lens.

46. An eyewear apparatus as recited in claim 39, wherein the front structure of the eyewear frame includes at least one lens, the at least one lens permits the user who wears the eyewear frame to view its environment through at least a portion of the at least one lens.

47. An eyewear apparatus as recited in claim 44, wherein the eyewear frame comprises:
a plurality of microphones;
at least one sensor configured to detect infrared radiation; and
at least one camera.

48. An eyewear apparatus as recited in claim 44, wherein the eyewear apparatus comprises:
an accelerometer configured to sense movement of the eyewear apparatus; and
a location detector configured to determine a position of the eyewear apparatus.

49. An eyewear apparatus as recited in claim 39, wherein the eyewear apparatus comprises:
a left arm structure coupled between a left side of the eyewear frame and the base electronic unit; and
a right arm structure coupled between a right side of the eyewear frame and the base electronic unit.

50. An eyewear apparatus as recited in claim 49,
wherein the left arm structure includes at least a first speaker, the first speaker being at least partially embedded in the left arm structure, and
wherein the right arm structure includes at least a second speaker, the second speaker being at least partially embedded in the right arm structure.

51. An eyewear apparatus as recited in claim 50, wherein the eyewear frame comprises:
a plurality of microphones;
at least one sensor configured to detect infrared radiation; and
at least one camera.

52. An eyewear apparatus as recited in claim 51, the base electronic unit comprises:
electrical circuitry electrically connected to the battery, the electrical circuitry being internal to the base electronic unit.

53. An eyewear system as recited in claim 52, wherein the base electronic unit comprises:
a connector port that is electrically connected with the electrical circuitry, the connector port being at least partially internal to the base electronic unit.

54. An eyewear apparatus as recited in claim 53, wherein the base electronic unit comprises:
wireless communication circuitry that supports wireless communication; and
an antenna, operatively connected to the wireless communication circuitry, for use in providing the wireless communication.

55. An eyewear apparatus as recited in claim 54, wherein the eyewear apparatus comprises:
an accelerometer configured to sense movement of at least a portion of the eyewear apparatus; and
a location detector configured to determine a position of the eyewear apparatus.

56. An eyewear apparatus as recited in claim 55, wherein the eyewear apparatus includes a mechanism to secure the eyewear apparatus to the head of the user.

57. An eyewear apparatus as recited in claim 54, wherein the eyewear frame comprises:
a display device configured to present information visible to the user.

58. An eyewear apparatus as recited in claim 39, wherein the battery in the base electronic unit powers at least in part the first integrated circuit coupled to the front circuit board in the eyewear frame.

59. An eyewear apparatus as recited in claim 39, wherein the eyewear apparatus comprises:
an accelerometer internal to the front structure and operatively connected to the front circuit board.

60. An eyewear apparatus as recited in claim 39, wherein the eyewear frame is configured to fit over a pair of prescription glasses worn on the head of the user.

61. An eyewear apparatus as recited in claim 39, wherein the eyewear apparatus is a goggle.

62. An eyewear apparatus as recited in claim 39, wherein the eyewear apparatus includes a mechanism to secure the eyewear to the head of the user.

63. An eyewear apparatus, comprising:
an eyewear front frame configured to be worn on the head of a user, the eyewear front frame including at least:
a front structure;
a front circuit board internal to the front structure, the front circuit board having at least a first integrated circuit coupled thereto;
at least one lens, the at least one lens permits the user who wears the eyewear front frame to view its environment through at least a portion of the at least one lens;
a plurality of microphones;
at least one sensor configured to detect infrared radiation; and
at least one camera;
a base electronic unit configured to be worn on the head of the user, the base electronic unit being electrically connected to the eyewear front frame, the base electronic unit including at least:
a battery that is provided to supply power to at least a portion of the eyewear apparatus; and
a base circuit board internal to the base electronic unit, the base circuit board having at least a second integrated circuit coupled thereto;
wireless communication circuitry that supports wireless communication;
an antenna, operatively connected to the wireless communication circuitry, for use in providing the wireless communication;
electrical circuitry electrically connected to the battery, the electrical circuit being at least partially internal to the base electronic unit; and
a connector port that is electrically connected with the electrical circuitry, the connector port being at least partially internal to the base electronic unit;
a left arm structure coupled between a left side of the eyewear front frame and the base electronic unit, the left arm structure includes at least a first speaker, the first speaker being at least partially embedded in the left arm structure; and
a right arm structure coupled between a right side of the eyewear front frame and the base electronic unit, the right arm structure includes at least a second speaker, the second speaker being at least partially embedded in the right arm structure.

64. An eyewear apparatus as recited in claim 63, wherein the eyewear apparatus comprises:
an accelerometer configured to sense movement of at least a portion of the eyewear apparatus, and
wherein the eyewear front frame comprises:
a display device configured to present information visible to the user.

65. An eyewear apparatus as recited in claim 64, wherein the wireless communication circuitry supports wireless communication via both a Bluetooth network and a WiFi network.

66. An eyewear apparatus as recited in claim 64, wherein the battery in the base electronic unit powers at least in part the first integrated circuit coupled to the front circuit board in the eyewear front frame.

67. An eyewear apparatus as recited in claim 64, wherein the eyewear front frame is configured to fit over a pair of prescription glasses worn on the head of the user.

* * * * *